United States Patent
Twitchell, Jr. et al.

(10) Patent No.: US 9,060,023 B2
(45) Date of Patent: *Jun. 16, 2015

(54) NETWORK WATERMARK

(71) Applicant: Robert W. Twitchell, Jr., Cumming, GA (US)

(72) Inventors: Robert W. Twitchell, Jr., Cumming, GA (US); Delia J. Smith, Morris Township, NJ (US)

(73) Assignee: Robert W. Twitchell, Jr., Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,716

(22) Filed: Jan. 6, 2014

(65) Prior Publication Data

US 2014/0123227 A1 May 1, 2014

Related U.S. Application Data

(63) Continuation of application No. 13/195,435, filed on Aug. 1, 2011, now Pat. No. 8,625,574, which is a continuation of application No. 12/473,266, filed on May 27, 2009, now Pat. No. 7,990,947, which is a continuation-in-part of application No. 12/135,144, filed on Jun. 7, 2008, now abandoned, said application No. 12/473,266 is a continuation-in-part of application No. 12/348,397, filed on Jan. 5, 2009, now abandoned, which is a continuation of application No. 12/234,644, filed on Sep. 20, 2008, now abandoned, which is a continuation-in-part of application No. 12/135,144, filed on Jun. 7, 2008, now abandoned.

(60) Provisional application No. 60/943,551, filed on Jun. 12, 2007.

(51) Int. Cl.
*H04L 12/28* (2006.01)
*H04L 29/06* (2006.01)
*H04W 12/10* (2009.01)
*H04W 48/08* (2009.01)
*H04W 48/16* (2009.01)
*H04W 84/18* (2009.01)

(52) U.S. Cl.
CPC ............. *H04L 63/162* (2013.01); *H04L 63/105* (2013.01); *H04L 63/12* (2013.01); *H04W 12/10* (2013.01); *H04W 48/08* (2013.01); *H04W 48/16* (2013.01); *H04W 84/18* (2013.01)

(58) Field of Classification Search
CPC ....................................................... H04L 29/06
See application file for complete search history.

(56) References Cited

U.S. PATENT DOCUMENTS 6,026,444 A * 2/2000 Quattromani et al. ........ 709/232
7,171,018 B2 1/2007 Rhoads (Continued)

*Primary Examiner* — Dang Ton
*Assistant Examiner* — Nourali Mansoury
(74) *Attorney, Agent, or Firm* — Tillman Wright, PLLC; Chad D. Tillman; Jeremy C. Doerre

(57) ABSTRACT

A network communications method utilizing a network watermark for providing security in the communications includes creating a verifiable network communications path of nodes through a network for the transfer of information from a first end node to a second end node; verifying the network communications path of nodes, by the first end node, before communicating by the first end node information intended for receipt by the second end node; and once the network communications path of nodes is verified by the first end node, communicating by the first end node, via the verified communications path of nodes, the information intended for receipt by the second end node; wherein the network watermark represents the verifiable network communications path of nodes.

20 Claims, 36 Drawing Sheets

(56) References Cited

U.S. PATENT DOCUMENTS

| | | |
|---|---|---|
| 7,200,132 B2 | 4/2007 | Twitchell |
| 7,990,947 B2 | 8/2011 | Twitchell |
| 8,181,262 B2 | 5/2012 | Cooper |
| 8,625,574 B2 | 1/2014 | Twitchell |
| 2004/0025018 A1 | 2/2004 | Haas |
| 2004/0068729 A1* | 4/2004 | Simon et al. ............... 718/102 |
| 2007/0087756 A1* | 4/2007 | Hoffberg ..................... 455/450 |
| 2007/0198656 A1* | 8/2007 | Mazzaferri et al. ......... 709/218 |
| 2009/0316682 A1 | 12/2009 | Twitchell |
| 2011/0289320 A1 | 11/2011 | Twitchell |

* cited by examiner

14

| $X_1$ | $X_2$ | $X_3$ |
|---|---|---|
| G | $X_4$ | |
| $X_5$ | $X_6$ | $X_7$ |

RANGE $X_6$ = {$X_4$, $X_5$, $X_7$} t = t₄

RANGE X$_2$ = {X$_1$,X$_3$,X$_4$}

$t = t_5$

RANGE $X_1$ = {$X_2$, G}

RANGE $X_3$ = {$X_2$}

_14_

16

| $X_{1/4}$ | $X_{2/3}$ | $X_{3/4}$ |
|---|---|---|
| G | $X_{4/2}$ | |
| $X_{5/2}$ | $X_{6/1}$ | $X_{7/0}$ |

TABLE 1: INDIVIDUAL LINK QUALITY

| Link | Link Quality (Percentage Packets Successfully Transmitted/Not Dropped) |
|---|---|
| G-X1 | 90% |
| G-X4 | 90% |
| G-X5 | 30% |
| X1-X2 | 70% |
| X2-X3 | 90% |
| X2-X4 | 90% |
| X4-X6 | 90% |
| X5-X6 | 90% |
| X6-X7 | 30% |

FIG. 9

TABLE 2: PATHWAY & OVERALL LINK QUALITY

| PATHWAY | OVERALL LINK QUALITY |
|---|---|
| //G/X1 | 90% |
| //G/X1/X2 | 63% |
| //G/X1/X2/X3 | 56.7% |
| //G/X1/X2/X4 | 56.7% |
| //G/X1/X2/X4/X6 | 51% |
| //G/X1/X2/X4/X6/X5 | 45.9% |
| //G/X1/X2/X4/X6/X7 | 15.3% |
| //G/X4 | 90% |
| //G/X4/X2 | 81% |
| //G/X4/X2/X1 | 56.7% |
| //G/X4/X2/X3 | 72.9% |
| //G/X4/X6 | 81% |
| //G/X4/X6/X7 | 24.3% |
| //G/X5 | 30% |
| //G/X5/X6 | 27% |
| //G/X5/X6/X4 | 24.3% |
| //G/X5/X6/X4/X2 | 21.9 |
| //G/X5/X6/X4/X2/X1 | 15.3% |
| //G/X5/X6/X4/X2/X3 | 19.7 |
| //G/X5/X6/X7 | 8.1% |

FIG. 10

TABLE 3: INDIVIDUAL LINK QUALITY
KNOWN BY GATEWAY SERVER AT t=t$_5$

| Link | Link Quality (Percentage Packets Successfully Transmitted/Not Dropped) |
|---|---|
| G-X1 | 90% |
| G-X4 | 90% |
| G-X5 | 30% |
| X1-X2 | 70% |
| X2-X4 | 90% |
| X4-X6 | 90% |
| X5-X6 | 90% |
| X6-X7 | 30% |

FIG. 11

TABLE 4: PATHWAY & OVERALL LINK QUALITY
KNOWN BY GATEWAY SERVER AT t=t$_5$

| PATHWAY | OVERALL LINK QUALITY |
|---|---|
| //G/X1 | 90% |
| //G/X1/X2 | 63% |
| //G/X1/X2/X4 | 56.7% |
| //G/X1/X2/X4/X6 | 51% |
| //G/X1/X2/X4/X6/X5 | 45.9% |
| //G/X1/X2/X4/X6/X7 | 15.3% |
| //G/X4 | 90% |
| //G/X4/X2 | 81% |
| //G/X4/X2/X1 | 56.7% |
| //G/X4/X6 | 81% |
| //G/X4/X6/X7 | 24.3% |
| //G/X5 | 30% |
| //G/X5/X6 | 27% |
| //G/X5/X6/X4 | 24.3% |
| //G/X5/X6/X4/X2 | 21.9 |
| //G/X5/X6/X4/X2/X1 | 15.3% |
| //G/X5/X6/X7 | 8.1% |

|   | X₁ | Y₁ | X₂ |   | X₃ |   |
|---|----|----|----|---|----|---|
|   |    |    |    | Y₂|    |   |
|   | G  |    | X₄ |   |    |   |
| 17| Y₃ |    |    |   |    |   |
|   | X₅ |    | X₆ |   | X₇ |   |
|   | Y₄ |    | Y₅ |   |    |   | t = t₁₀

| $X_1$ | $Y_1$ | $X_2$ |  | $X_3$ |  |
|---|---|---|---|---|---|
|  |  |  | $Y_2$ |  |  |
| G |  | $X_4$ |  |  |  |
| $Y_3$ |  |  |  |  |  |
| $X_5$ |  | $X_6$ |  | $X_7$ |  |
| $Y_4$ |  | $Y_5$ |  |  |  |

Network watermarks provide interlayer verification of the link at time of transfer.

1.) Deterministic Hopping over trusted nodes

2.) Non-Deterministic Hopping over trusted nodes

3.) Non-Deterministic "Direct Connect" over trusted nodes

Node to Node Communication

NETWORK WATERMARK

CROSS-REFERENCE TO RELATED APPLICATIONS

The present application is a continuation of, and claims priority under 35 U.S.C. §120 to, U.S. patent application Ser. No. 13/195,435, filed Aug. 1, 2011, which '435 application published as U.S. patent application publication no. 2011/0289320 and issued as U.S. Pat. No. 8,625,574 on Jan. 7, 2014, and which '435 application is a continuation of, and claims priority under 35 U.S.C. §120 to, U.S. patent application Ser. No. 12/473,266, filed May 27, 2009, which '266 application published as U.S. patent application publication no. 2009/0316682 and issued as U.S. Pat. No. 7,990,947 on Aug. 2, 2011, and which '266 application is a continuation-in-part of, and claims priority under 35 U.S.C. §120 to, each of:

(a) U.S. patent application Ser. No. 12/135,144, filed Jun. 7, 2008, which '144 application is a nonprovisional of U.S. provisional patent application No. 60/943,551, filed Jun. 12, 2007; and (b) U.S. patent application Ser. No. 12/348,397, filed Jan. 5, 2009, which '397 application is a continuation of U.S. patent application Ser. No. 12/234,644, filed Sep. 20, 2008, which '644 application is a continuation-in-part of U.S. patent application Ser. No. 12/135,144, filed Jun. 7, 2008, which '144 application is a nonprovisional of U.S. provisional patent application No. 60/943,551, filed Jun. 12, 2007.

Each of these patent applications and patent application publications are hereby incorporated by reference herein.

Additionally, each of the following patent application publications and patents is hereby incorporated herein by reference for purposes of disclosure of background technologies, including class-based network technology, wake-up technology, and networks that utilize such technologies (such as those of TeraHop Networks, Inc. of Alpharetta, Ga.), and systems employing such technologies including, inter alia, systems for container tracking and monitoring: USPA Publ. 2008/0112378; USPA Publ. 20080112377; USPA Publ. 20080111692; USPA Publ. 20070291724; USPA Publ. 20070291690; 20070273503; USPA Publ. 20070268134; USPA Publ. 20070268126; USPA Publ. 20070159999; USPA Publ. 20070155327; USPA Publ. 20070099629; USPA Publ. 20070099628; USPA Publ. 20070069885; USPA Publ. 20070043807; USPA Publ. 20070041333; USPA Publ. 20070004431; USPA Publ. 20070004331; USPA Publ. 20070004330; USPA Publ. 20070002808; USPA Publ. 20070002793; USPA Publ. 20070002792; USPA Publ. 20070001898; USPA Publ. 20060289204; USPA Publ. 20060287822; USPA Publ. 20060287008; USPA Publ. 20060282217; USPA Publ. 20060276963; USPA Publ. 20060276161; USPA Publ. 20060274698; USPA Publ. 20060237490; USPA Publ. 20060023679; USPA Publ. 20060023678; USPA Publ. 20060018274; USPA Publ. 20040082296; U.S. Pat. No. 7,221,668; U.S. Pat. No. 7,209,771; U.S. Pat. No. 7,209,468; U.S. Pat. No. 7,200,132; U.S. Pat. No. 7,155,264; U.S. Pat. No. 7,133,704; U.S. Pat. No. 6,934,540; and U.S. Pat. No. 6,745,027. It is contemplated that the present invention may be utilized in the systems of these incorporated references, and that the class-based network technologies and/or wake-up technologies of these references may be used in combination with various embodiments and implementations of the present invention; however, the present invention is separate and distinct from, and is independent of, any of these background technologies.

These background technologies only represent some possible contexts within which the present invention may be utilized. Finally, each of the following patent application publications—which happen not to be owned by TeraHop Networks—are incorporated herein by reference for purposes of general background, wherein each publication relates, in some manner and to some extent, to watermark technologies: USPA Publ. 20080056531 ("Active Watermarks and Watermark Agents"); USPA Publ. 20060268895 ("Linking a Mobile Wireless Communication Device to a Proximal Consumer Broadcast Device"); USPA Publ. 20060120560 ("Data Transmission by Watermark Proxy"); USPA Publ. 20050251486 ("System and Methods for Protecting Digital Works Using a Watermark Gateway"); USPA Publ. 20050249374 ("Digital Watermarking for Workflow"); USPA Publ. 20050226461 ("Watermarking of Recordings"); USPA Publ. 20050058319 ("Portable Devices and Methods Employing Digital Watermarking"); USPA Publ. 20050022032 ("Active Watermarks and Watermark Agents"); USPA Publ. 20040049695 ("System for Providing a Real-Time Attacking Connection Traceback Using a Packet Watermark Insertion Technique and Method Therefor"); USPA Publ. 20040025024 ("Information Processing Apparatus and Information Processing Method"); USPA Publ. 20030012403 ("Portable Devices and Methods Employing Digital Watermarking"); USPA Publ. 20010044899 ("Transmarking of Multimedia Signals"); and USPA Publ. 20010040977 ("Electronic Watermark System").

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention generally relates to security in network communications.

Digital watermarks are used to enable an individual to add hidden copyright notices or other verification messages to digital audio, video, image signals and documents. For a digital watermark, the message is generally a group of bits describing the information pertaining to the signal or to the author of the signal. The technique is used to add a measure of security to the authenticity of the work without the end user's knowledge or with minimal impact. A simple visual digital watermark could be a seal placed over the image to identify the copyright. The watermark may contain additional information including the identity of the purchaser of a particular copy of material. An invisible watermark might change the least significant bits of the image and be basically imperceptible to the end user but identifiable to the viewer program.

RF watermarking is used to prevent impersonation attacks by modifying the hardware such that the modification can be verified by a node before communication is established. The RF watermark could be an intentional bit time dithering that can be measured before the link is negotiated.

Virtual Private Networks (VPNs) encrypt links between hosts talking over a public network, making it difficult to intercept communications.

Network security on MANet and ad-hoc networks is subject to attacks that can compromise the integrity of the system. Although digital and hardware watermarks help improve the ability to improve the security of the system, they do not provide security against attacks such as the Sybil, Stolen Identity, Invisible Node, Rush, Blackhole, Jellyfish and other common multicast threats. These attacks put information in jeopardy and need to be addressed.

SUMMARY OF THE INVENTION

Inventive aspects of the present invention generally relate to networks, apparatus, methods and systems for securing network communications.

Indeed, the present invention includes many aspects and related features. Moreover, while many aspects and features relate to, and are described in, the context of common designation networking (e.g., class-based networking), the present invention is not limited to such use and is applicable to other forms of network communications including, for example, network communications by computers, whether over intranets or the Internet. Applicability in such different contexts will become apparent from the following summaries and detailed descriptions of aspects, features, and one or more preferred embodiments of the present invention hereinbelow.

Accordingly, one aspect of the invention broadly defined relates to a communications method utilizing a network watermark process as disclosed herein, and another aspect broadly defined relates a communications network in which a network watermark is utilized as disclosed herein.

Another aspect of the present invention relates to a network communications method utilizing a network watermark process, the network watermark process comprising the step of creating a verifiable communications path through a network of nodes between a first end node and a second end node, the verifiable communications path being collectively created: by the first end node performing the step of sending a communication including an identification of the second end node to an immediately succeeding node in the verifiable communications path; by each respective intermediate node, if any, between the first end node and the second end node in the verifiable communications path, performing the steps of, receiving, by the respective intermediate node, a communication from an immediately preceding node, the communication including path data, verifying the communication that is received by the respective intermediate node from the immediately preceding node, and upon the successful verification of the communication from the immediately preceding node by the respective intermediate node, sending by the respective intermediate node a communication to an immediately succeeding node, the communication including path data that at least identifies a network communications path from the first end node to the respective intermediate node; and by the second end node performing the steps of, receiving a communication from the immediately preceding node, the communication including path data that at least identifies a network communications path from the first end node to the immediately preceding node, verifying the communication that is received from the immediately preceding node, and validating the communications path through the network of nodes between the first end node and the second end node.

In a feature of this aspect of the invention, the method further includes storing the verifiable communication path in a database for later reference.

In a feature of this aspect of the invention, the path data that is included in a communication sent by a respective intermediate node identifies the network communications path from the first end node to the respective intermediate node by identifying a sequence of unique identifiers (UIDs) of the nodes of the network communications path.

In a feature of this aspect of the invention, the UIDs are MAC addresses.

In a feature of this aspect of the invention, the step of validating, by the second end node, the communications path through the network of nodes between the first end node and the second end node includes checking the UIDs of the nodes identified by the path data against valid UIDs of known nodes in order to confirm that the UIDs identified by the path data match valid UIDs.

In a feature of this aspect of the invention, the second end node maintains valid UIDs of known nodes.

In a feature of this aspect of the invention, the communication that is sent by a node, to an immediately succeeding node in the communications path through the network of nodes, includes a result of a function by which the immediately succeeding node verifies the communication received by the immediately succeeding node.

In a feature of this aspect of the invention, the result of the function included in the communication indicates to the immediately succeeding node whether the node from which the communication is sent is a trusted node.

In a feature of this aspect of the invention, the result of the function included in the communication is unique to the specific instance of sending the communication by the node to the immediately succeeding node.

In a feature of this aspect of the invention, the result of the function is unique to the specific instance of sending the communication by the node to the immediately succeeding node.

In a feature of this aspect of the invention, the result of the function is dependent upon the date and time of the sending of the communication by the node to the immediately succeeding node.

In a feature of this aspect of the invention, the communication that is sent by a respective intermediate node, to an immediately succeeding node in the communications path through the network of nodes, includes a result of a function by which the immediately succeeding node verifies the communication received by the immediately succeeding node, wherein the result of the function included in the communication depends, in part, upon the communication that is received by the respective intermediate node.

In a feature of this aspect of the invention, the path data of a communication that is sent by a node, to an immediately succeeding node in the communications path through the network of nodes, includes a date and time of the communication.

In a feature of this aspect of the invention, the method further includes the step of validating, by a respective intermediate node, the communications path of nodes between the first end node and the respective intermediate node by checking the UIDs of the nodes identified in the communications path in order to confirm that the UIDs identified in the communications path match valid UIDs.

In a feature of this aspect of the invention, the respective intermediate nodes maintains valid UIDs of known nodes.

In a feature of this aspect of the invention, the communication received by each respective intermediate node in the network communications path between the first end node and the second end node includes path data that identifies a network communications path from the first end node to the second end node.

In a feature of this aspect of the invention, the step by each respective intermediate node of sending a communication to an immediately succeeding node comprises sending, by the respective intermediate node, the communication to the node identified as coming next after the respective intermediate node in the network communications path identified by the path data.

In a feature of this aspect of the invention, the communication received by the second end node represents a request for the transfer of information to the first end node, and further comprising establishing communication links between each of the nodes of the verifiable communications path and transferring the information from the second end node to the first end node of the request over the established communication links.

In a feature of this aspect of the invention, the communication links are concurrently maintained between all adjacent nodes of the verifiable communications path during the transfer of the information.

In a feature of this aspect of the invention, each communication link is established between adjacent nodes in the verifiable communications path as the information is transferred between the adjacent nodes such that the information hops between nodes in being transferred from the second end node to the origination node.

In a feature of this aspect of the invention, the communication received by the second end node represents a request for the transfer of information to the first end node for use by a specific application program, and wherein the step of validating, by the second end node, the communications path through the network of nodes between the first end node and the second end node includes checking the UIDs of the nodes identified by the path data against information maintained for valid UIDs of known nodes in order to confirm that the information maintained for each node identified by the path data matches criteria specified by the specific application program.

In a feature of this aspect of the invention, the communication received by the second end node represents a request for the transfer of information to the first end node that will be used by a specific application program, and wherein the step of validating, by the second end node, the communications path through the network of nodes between the first end node and the second end node includes checking the UIDs of the nodes identified by the path data against security levels that are maintained for valid UIDs of known nodes in order to confirm that the security levels of each node identified by the path data matches a required security level specified by the specific application program.

In a feature of this aspect of the invention, the method further includes communicating an acknowledgement from the second end node to the first end node, and creating a second verifiable communications path through a network of nodes between the second end node and the first end node, the second verifiable communications path being collectively created: by the second end node performing the step of sending a communication including an identification of the first end node to an immediately succeeding node in the second verifiable communications path; by each respective intermediate node, if any, between the second end node and the first end node in the second verifiable communications path, performing the steps of, receiving, by the respective intermediate node, a communication from an immediately preceding node, the communication including path data, verifying the communication that is received by the respective intermediate node from the immediately preceding node, and upon the successful verification of the communication from the immediately preceding node by the respective intermediate node, sending by the respective intermediate node a communication to an immediately succeeding node, the communication including path data that at least identifies a network communications path from the second end node to the respective intermediate node; and by the first end node performing the steps of, receiving a communication from the immediately preceding node, the communication including path data that at least identifies a network communications path from the second end node to the immediately preceding node, verifying the communication that is received by the first end node from the immediately preceding node, and validating the communications path through the network of nodes between the second end node and the first end node.

In a feature of this aspect of the invention, the communication received by the first end node represents an acknowledgement by the second end node of a request for the transfer of information to the first end node for use by a specific application program, and wherein the step of validating, by the first end node, the second communications path through the network of nodes between the second end node and the first end node includes checking the UIDs of the nodes identified by the path data against information maintained for valid UIDs of known nodes in order to confirm that the information maintained for each node identified by the path data matches criteria specified by the specific application program.

In a feature of this aspect of the invention, the communication received by the first end node represents an acknowledgement by the second end node of a request for the transfer of information to the first end node for use by a specific application program, and wherein the step of validating, by the first end node, the second communications path through the network of nodes between the second end node and the first end node includes checking the UIDs of the nodes identified by the path data against security levels that are maintained for valid UIDs of known nodes in order to confirm that the security levels of each node identified by the path data matches a required security level specified by the specific application program.

Another aspect of the present invention relates to a network communications method utilizing a network watermark for providing security in the communications, comprising the steps of: creating a verifiable network communications path of nodes through a network for the transfer of information from a first end node to a second end node; verifying the network communications path of nodes, by the first end node, before communicating by the first end node information intended for receipt by the second end node; and once the network communications path of nodes is verified by the first end node, communicating by the first end node, via the verified communications path of nodes, the information intended for receipt by the second end node; wherein the network watermark represents the verifiable network communications path of nodes.

Another aspect of the present invention relates to an Internet communications method utilizing a network watermark for providing security in the transfer of information, comprising the steps of: creating a verifiable network communications path of servers for the transfer of information from a first node to a second node; verifying the network communications path of servers before transferring the information over the network communications path of servers; and once the network communications path of servers is verified, transferring the information from the first node to the second node via the verified network communications path of servers; wherein the network watermark represents the verifiable network communications path of servers.

In a feature of this aspect of the invention, verifying the network communications path of servers comprises checking servers of the network communications path against a trusted server list.

In a feature of this aspect of the invention, the verifiable network communications path includes path data comprising IP addresses of the servers of the network communications path, and wherein verifying the network communications path of servers comprises checking the IP addresses of the servers against known IP addresses.

In a feature of this aspect of the invention, the information to be transferred is for use by a specific application program, and wherein verifying the network communications path of servers comprises checking servers of the network communications path for compliance with rules pertaining to servers provided by the specific application program.

In a feature of this aspect of the invention, the information to be transferred is for use by a specific application program, and wherein verifying the network communications path of servers comprises checking servers of the network communications path against a minimum security level that is specified by the specific application program.

Another aspect of the present invention relates to a network communications method utilizing a network watermark for providing security in communications between a first end node and a second end node that communicate over a network communications path of nodes, comprising the steps of: sending, by the first end node, a communication including an identification of the second end node to an immediately succeeding node in the network communications path; by each respective intermediate node, if any, between the first end node and the second end node in the network communications path, performing the steps of, receiving, by the respective intermediate node, a communication from an immediately preceding node, the communication including path data, verifying the communication that is received by the respective intermediate node from the immediately preceding node, and upon the successful verification of the communication from the immediately preceding node by the respective intermediate node, sending by the respective intermediate node a communication to an immediately succeeding node, the communication including path data that at least identifies a network communications path from the first end node to the respective intermediate node; and by the second end node, receiving a communication from the immediately preceding node, the communication including path data that at least identifies a network communications path from the first end node to the immediately preceding node, and verifying the communication that is received from the immediately preceding node.

Another aspect of the present invention relates to a communications method for providing security in communications between a first networked node and a second networked node, comprising the steps of: receiving, by the first networked node, a request from the second networked node for information from the first networked node, which request is received over a first communications path including a plurality of intermediate nodes of a first common designation network, the common designation of which is shared by both the first networked node and the second networked node; sending, by the first networked node, the requested information to the second networked node, which information is sent over a second communications path including a plurality of intermediate nodes of a second common designation network, the common designation of which is different from that of the first common designation network and which is also shared by both the first networked node and the second networked node, at least some of the nodes of the plurality of nodes of the first communications path being different from at least some of the nodes of the plurality of nodes of the second communications path.

In a feature of this aspect of the invention, the first networked node is configured to effect a change in one or more common designations of the second networked node.

In a feature of this aspect of the invention, the first networked node is configured to add a new common designation of the second networked node.

In a feature of this aspect of the invention, the first networked node is configured to activate or deactivate one or more common designations of the second networked node.

Another aspect of the present invention relates to a network communications method utilizing a network watermark process, the network watermark process comprising the step of creating a verifiable communications path through a network of nodes between a first end node and a second end node, the verifiable communications path being collectively created: by the first end node performing the step of sending a communication including a class identifier of the first end node and an identification of the second end node to an immediately succeeding node in the verifiable communications path; by each respective intermediate node, if any, between the first end node and the second end node in the verifiable communications path, performing the steps of, receiving, by the respective intermediate node, a communication from an immediately preceding node, the communication including a class identifier and path data, verifying the communication that is received by the respective intermediate node from the immediately preceding node using class rules corresponding to the class identifier that are maintained by the respective intermediate node, and upon the successful verification of the communication from the immediately preceding node by the respective intermediate node, sending by the respective intermediate node a communication to an immediately succeeding node, the communication including a class identifier and path data that at least identifies a network communications path from the first end node to the respective intermediate node; and by the second end node performing the steps of, receiving a communication from the immediately preceding node, the communication including a class identifier and path data that at least identifies a network communications path from the first end node to the immediately preceding node, verifying the communication that is received from the immediately preceding node using class rules corresponding to the class identifier that are maintained by the respective intermediate node, and validating the communications path through the network of nodes between the first end node and the second end node.

In a feature of this aspect of the invention, the path data that is included in a communication sent by a respective intermediate node identifies the network communications path from the first end node to the respective intermediate node by identifying a sequence of unique identifiers (UIDs) of the nodes of the network communications path.

In a feature of this aspect of the invention, the step of validating, by the second end node, the communications path through the network of nodes between the first end node and the second end node includes checking the class identifier of the communication that is received by the second end node against class identifiers of the nodes identified by the path data in order to confirm that a class identifier of each node identified by the path data corresponds to the class identifier of the communication received by the second end node.

In a feature of this aspect of the invention, the second end node maintains the class identifiers associated with known nodes.

In a feature of this aspect of the invention, the communication received by the second end node includes a request by the first end node for the transfer of information from the second end node.

In a feature of this aspect of the invention, the second end node is a server.

In a feature of this aspect of the invention, the method further includes communicating an acknowledgement from the second end node to the first end node, and creating a second verifiable communications path through a network of nodes between the second end node and the first end node, the second verifiable communications path being collectively created: by the second end node performing the step of sending a communication including a class identifier of the second end node and an identification of the first end node to an immediately succeeding node in the second verifiable communications path; by each respective intermediate node, if any, between the second end node and the first end node in the second verifiable communications path, performing the steps of, receiving, by the respective intermediate node, a communication from an immediately preceding node, the communication including a class identifier and path data, verifying the communication that is received by the respective intermediate node from the immediately preceding node using class rules corresponding to the class identifier that are maintained by the respective intermediate node, and upon the successful verification of the communication from the immediately preceding node by the respective intermediate node, sending by the respective intermediate node a communication to an immediately succeeding node, the communication including a class identifier and path data that at least identifies a network communications path from the second end node to the respective intermediate node; and by the first end node performing the steps of, receiving a communication from the immediately preceding node, the communication including a class identifier and path data that at least identifies a network communications path from the second end node to the immediately preceding node, verifying the communication that is received by the first end node from the immediately preceding node using class rules corresponding to the class identifier that are maintained by the respective intermediate node, and validating the communications path through the network of nodes between the second end node and the first end node.

In a feature of this aspect of the invention, the communication received by the first end node represents an acknowledgement by the second end node of a request for the transfer of information to the first end node for use by a specific application program, and wherein the step of validating, by the first end node, the second communications path through the network of nodes between the second end node and the first end node includes checking the UIDs of the nodes identified by the path data against information maintained for valid UIDs of known nodes in order to confirm that the information maintained for each node identified by the path data matches criteria specified by the specific application program.

In a feature of this aspect of the invention, the communication received by the first end node represents an acknowledgement by the second end node of a request for the transfer of information to the first end node for use by a specific application program, and wherein the step of validating, by the first end node, the second communications path through the network of nodes between the second end node and the first end node includes checking the UIDs of the nodes identified by the path data against security levels that are maintained for valid UIDs of known nodes in order to confirm that the security levels of each node identified by the path data matches a required security level specified by the specific application program.

In a feature of this aspect of the invention, the class identifier of the communications that are sent by the second end node and the respective intermediate nodes in the second verifiable communications path from the first end node to the second end node is different from the class identifier of the communications that are sent by the first end node and the respective intermediate nodes in the first verifiable communications path from the first end node to the second end node.

Another aspect of the present invention relates to a network communications method utilizing a network watermark for providing security in communications between a first end node and a second end node that communicate over a network communications path of nodes, comprising the steps of: sending, by the first end node, a communication including a class identifier of the first end node and an identification of the second end node to an immediately succeeding node in the network communications path; by each respective intermediate node, if any, between the first end node and the second end node in the network communications path, performing the steps of, receiving, by the respective intermediate node, a communication from an immediately preceding node, the communication including a class identifier and path data, verifying the communication that is received by the respective intermediate node from the immediately preceding node using class rules corresponding to the class identifier that are maintained by the respective intermediate node, and upon the successful verification of the communication from the immediately preceding node by the respective intermediate node, sending by the respective intermediate node a communication to an immediately succeeding node, the communication including a class identifier and path data that at least identifies a network communications path from the first end node to the respective intermediate node; and by the second end node, receiving a communication from the immediately preceding node, the communication including a class identifier and path data that at least identifies a network communications path from the first end node to the immediately preceding node, and verifying the communication that is received from the immediately preceding node using class rules corresponding to the class identifier that are maintained by the respective intermediate node.

In addition to the aforementioned aspects and features of the present invention, it should be noted that the present invention further encompasses the various possible combinations, subcombinations, and permutations of such aspects and features.

BRIEF DESCRIPTION OF THE DRAWINGS

Further features, embodiments, and advantages of the present invention will become apparent from the following detailed description with reference to the drawings, wherein:

FIGS. 2-8 illustrate the wireless network of FIG. 1 in which the sequence of node-to-node communications occurs when a message from node $X_7$ is originated and communicated for further communication to the server of FIG. 1.

FIG. 9 illustrates a table of representative link quality for each possible communication link that may be established between each pair of nodes of the wireless network of FIG. 1.

FIG. 10 illustrates a table of representative overall link quality for each possible pathway between a node and the server in the wireless network of FIG. 1, the overall link quality being based on the link quality for each node-to-node communication link set forth in the table of FIG. 9.

FIG. 11 illustrates a table of representative link quality for each communication link established between each pair of nodes of the wireless network of FIG. 1 that is known to the server at time t=t5 based on communication sequences of FIGS. 2-8.

FIG. 12 illustrates a table of overall link quality for each pathway between a node and the server in the wireless network based on the table of link qualities of FIG. 11 that are known to the server.

FIGS. 14-30 illustrate network routing in the class-based wireless networks of FIG. 13.

DETAILED DESCRIPTION

Figure 1:
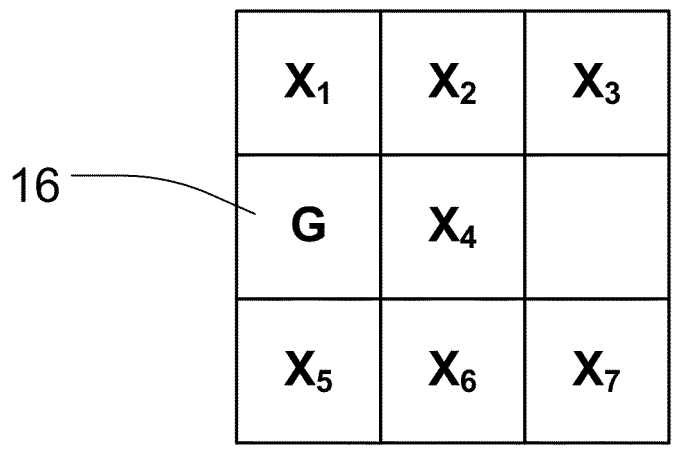
FIG. 1 illustrates an architecture associated with an exemplary embodiment of the invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Additionally, as used herein with reference to a network, a "node" of the network refers to a data communication device that is a node of a network and that receives and transmits information with one or more other nodes of the network.

The data communication device may include a low-power radio frequency ("LPRF") data communication device having a two-way wireless communications component in the form of a transceiver that communicates with other nodes via data packets. The transmission of the data packets may utilize, for example, transmission control protocol ("TCP"). In such cases, the two-way wireless communications component of the data communication device preferably is a standards-based radio ("SBR") and may comprise, for example, a WiFi, WiMAX, CDMA, WCDMA, GSM, Zigbee, Ultra-Wideband, or Bluetooth radio.

Additionally, in receiving or transmitting information wirelessly between two nodes, a communications link preferably is established between the SBRs of the two nodes and an electronic message then is transmitted via the communications link. Following transmission of the electronic message, the communications link is disconnected. Alternatively, the communications link established between the data communication devices of the two nodes may be maintained, if desired, in order to provide continuous communications between the two nodes without having to reestablish a communications link therebetween. Establishing a continuous communications link between two nodes without having to reestablish the communications link therebetween is particularly desirable, for instance, in transmitting real time audiovisual content, or in providing real time audiovisual communications between persons. Such person-to-person communications further may be "two-way" when each data communication device at each node includes dual radios. This is particularly true when Bluetooth radios are utilized, which do not include duplex capabilities. Thus, for example, maintaining continuous communications between two nodes each employing dual radios is particularly desirable if data packets for Voice-over-IP ("VoIP") services are to be wirelessly transmitted between the two nodes. Once the continuous communications are no longer needed, the communications link is disconnected.

The data communication device of a node of the wireless network may be mobile or fixed at a particular location, and the data communication device may include an internal power supply source or utilize an external power supply source. The data communication device also may include an interface for communicating with an associated sensor or other data acquisition device, which sensor may or may not form part of the node. The data communication device constituting the node also or alternatively may be attached to an asset that is to be monitored and/or tracked; alternatively, the data communication device constituting the node may be permanently affixed to a structure for monitoring and/or tracking assets that come within proximity thereto.

Furthermore, the network may be an ad hoc wireless network. As used herein with reference to a wireless network, an "ad hoc network" refers to a wireless network in which node-to-node communications occur without central control or wired infrastructure. Such a network typically will have dynamic pathways and is advantageous because it is inexpensive, fault-tolerant, and flexible.

A node of a network from which an electronic message first is sent is referred to herein as an "originating node." Similarly, a node of a network to which an electronic message is ultimately destined is referred to herein as a "destination node." Any node that relays the electronic message from the originating node to the destination node is referred to herein as an "intermediate node." Each route by which an electronic message is communicated from an originating node to a destination node is referred to herein as a "pathway," and each pathway preferably be identified by the identification of the originating node, each intermediate node that relays the electronic message, and the destination node.

One or more nodes of a local network may be disposed in direct electronic communication with a network that is external to the particular local network. Such a node is referred to herein as a "gateway." With respect to a "gateway" node, the gateway node preferably is configured for direct electronic communication with a network that is external to any ad hoc wireless network that may be formed by the nodes themselves. Communications between the gateway and the external network may be wireless or hard wired and comprise, for example, a network interface card that accepts a CAT 5 cable for Ethernet communications; a cellular transceiver for communications via a cellular telephone network; a satellite transceiver for communications via a satellite network; or any combination thereof. The wired network itself may be a wide area network ("WAN") and include the Internet. Such a node is called a "gateway" node because it serves as a gateway for other nodes in communicating via the external network.

A computer system may be disposed in electronic communication with the same external network, whereby the computer system and each node of the local network may communicate with each other through the external network, such as the WAN, and one or more gateways of the local network. Generally, the computer system preferably includes application software and a database (or access to a database), and the computer system may record and maintain information regarding the local network, about the nodes thereof, and/or data received therefrom. Such a computer system is referred to herein as a "server." and may be utilized to track and/or monitor asset that may be associated with the nodes. If the nodes are utilized simply for monitoring purposes irrespective of assets, such a server may be utilized for responding to conditions that are sensed by one or more of the nodes, including alerting appropriate third parties to a sensed condition.

A gateway further may include the additional functionality of a server, where the gateway has application software and a database (or access to a database), and the gateway records and maintains information regarding the local network, information about the nodes thereof, and/or data received from the nodes. Such a gateway is herein referred to as a gateway controller. In such embodiments the gateway controller preferably is still configured to communicate with an external network, thereby providing an avenue for communicating from remote locations via the WAN with the gateway controller in order to access information that is recorded and maintained by the gateway controller.

A node of the local network at which a data communication device establishes a communication link with a gateway is referred to herein as a "top level node."

Additionally, in one or more preferred embodiments, the nodes utilize common designation networking in combination with wake-up technologies. Common designation networking or "CDN" is perhaps best disclosed in the incorporated U.S. Pat. Nos. 6,745,027 and 7,221,668. When the nodes are associated with assets, common designation identifiers representing attributes or characteristics of the assets are typically used, which common designations often are referred to as "class" designations. Similarly, ad hoc networks formed based thereon are often referred to as "class-based" networks and communications in such networks are often referred to as "class-based" communications. In accordance with common designation networking or "CBN", a node screens each transmission for a data identifier that represents a common designation of that node. The node does not process, route, or respond to an incoming transmission if the data identifier is not found. As will be appreciated, common designation networking greatly reduces RF noise when many nodes are within broadcast range of each other and greatly increase operating life of mobile nodes that dependent on battery sources, as the nodes do not needlessly respond to all transmissions, filtering out and processing, routing, and/or responding to only those transmission bearing its common designation.

As further disclosed in the incorporated references, it will be appreciated that a node may have more than one common designation at any given time, and that a common designation may represent a subset (or "subclass") or a superset (or "abstracted class") of another common designation.

Wake-up technologies that may be utilized in accordance with one or more preferred embodiments are perhaps best disclosed in incorporated U.S. Pat. No. 7,209,771 and incorporated U.S. Patent Appl. Publication No. 2006/0287008. These two incorporated references disclose alternative approaches for the wake-up technologies that may be used. Specifically, in incorporated U.S. Pat. No. 7,209,771, each node of the wireless ad hoc network includes—in connection with the SBR—a wake-up receiver that listens for a wake-up broadcast or signal, referred to generally as a "wake-up broadcast," that includes a common designation of that node. Upon receiving such a wake-up broadcast, the wake-up receiver provides an electronic signal that activates the SBR, which resides in a dormant state (either off or in a reduced power standby mode) while the wake-up receiver is listening for an applicable broadcast. The wake-up receiver is a simplified receiver that draws much less current when listening for an applicable broadcast compared to the current that would be drawn by the SBR when listening for an applicable broadcast. Hence, significant power conservation and long battery life is achieved using such a wake-up receiver.

Furthermore, this wake-up receiver may screen only for a predetermined common designation, as disclosed in incorporated U.S. Patent Appl. Publication No. 2006/0287008. Alternatively, a more complicated stepped wake up of the SBR may be performed using the wake-up receiver, wherein the wake-up receiver first screens for one or more criteria before screening for the common designation in the wake-up broadcast. Such a stepped wake-up methodology is disclosed, for example, in the incorporated U.S. Patent Appl. Publication No. US 2006/0276161. Screening for criteria that is indicative of an actual wake-up broadcast being received can be beneficial when significant RF noise is present, whereby false indications of the receipt of a wake-up broadcast can be reduced.

In incorporated U.S. Patent Appl. Publication No. 2006/0287008, a wake-up transceiver is disclosed. The wake-up transceiver is similar to the aforementioned wake-up receiver, but further includes a transmitter by which a wake-up broadcast may be transmitted without necessarily having to activate the SBR. In the data communication devices of U.S. Pat. No. 7,209,771, the SBR sends a wake-up broadcast whereas, in U.S. Patent Appl. Publication No. 2006/0287008, the wake-up broadcast may be sent by the wake-up transceiver without having to activate the SBR. Avoiding booting up of the SBR has been found to result in significant power savings, and while the SBR has additional features and functionality not provided by the wake-up transceiver, such features and functionality are not required in transmitting a wake-up broadcast.

As used herein, "Wake-Up Component" is intended to mean either a wake-up receiver or wake-up transceiver, as disclosed in these incorporated references.

Finally, each communication of an electronic message between nodes may include several components, including a header and a body. The body of the communication preferably carries the original message from the originating node and would include any data acquired at the node or by a sensor associated with the node that is to be communicated to the server. The header of the communication preferably includes information pertaining to the message itself, such as a unique "message ID" that comprises information representative of the originating node of the message and may include a count representing the number of messages originated by the originating node. In class-based networks, the message ID further may include the class or classes of the originating node. The header of the communication also preferably includes the pathway by which the message is to be communicated when the message is being sent in accordance with a deterministic routing method. Other header information of the communication preferably includes the pathway history by which the message has been communicated, including the original communication from the originating node, and the link quality of each communication link between nodes in the pathway history. A possible checksum and priority optionally may be included in the message header. In class-based networks, the header of the communication also may include one or more class designations.

Figure 46:
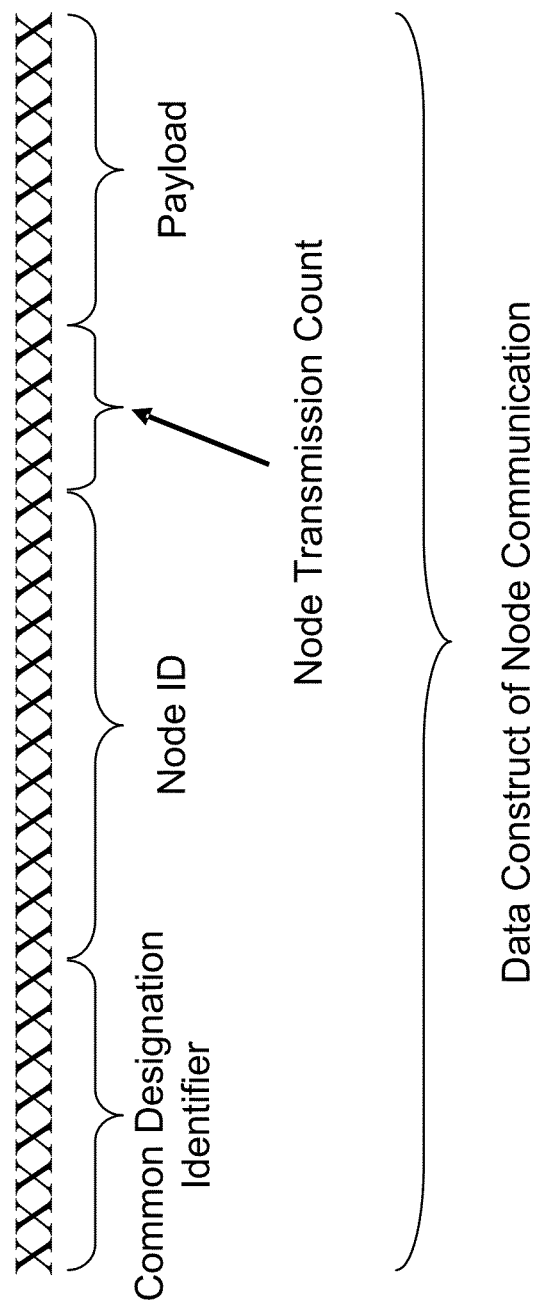
FIG. 46 illustrates an exemplary data construct that may be utilized in class-based communications.

An exemplary data construct representative of such a communication is shown in FIG. 46. The pieces of information contained within the data construct include: a common designation identifier, such as a class designation; a node ID; and a payload. In particular, the illustrated data construct includes 32 bits, with the first eight bits representing a class identifier portion of the communication; with the next twelve bits representing an identification of the node initiating the communication; and with the next four bits representing a rolling transmission or message count sent by the originating node; and with the remaining eight bits representing the payload or message of the communication. Moreover, while the data construct shown is 32 bits, it will be appreciated that any number of bits may be selected depending upon the number of possible identifiers, node IDs, counts that are desired to be accommodated, and desired extent of the payload or message. Moreover, any desired encoding scheme may be used, such as base 16, base 32, base 64, etc. It will be appreciated from the description hereinbelow that this exemplary data construct may be modified to similarly accommodate a network watermark, i.e., a verifiable pathway of networked nodes, as described hereinbelow.

Referring now to the drawings, one or more preferred embodiments of the present invention are next described. The following description of one or more preferred embodiments is merely exemplary in nature and is in no way intended to limit the invention, its implementations, or uses.

First Exemplary Illustration

Turning now to the drawings, FIGS. 1-12 relate to an exemplary implementation of a preferred embodiment of the invention in the context of class-based networking in a wireless ad hoc network. It should be understood that while this preferred embodiment is described in the context of class-based networking, the invention is not limited to class-based networking and is applicable in many other contexts in accordance with other preferred embodiments of the invention.

In FIG. 1, eight nodes forming a single class-based wireless ad hoc network of class "X" are illustrated. The eight nodes include seven nodes $X_1, X_2, X_3, X_4, X_5, X_6, X_7$ and an eighth node comprising a gateway controller 16 indicated by the letter G in the drawings.

Each node maintains reference to its membership in one or more classes through a class table. In accordance with class-based networks, each data communication device of a node of a class-based network preferably maintains membership information in the form of a "class table" that lists those classes of which that device is a member. Furthermore, membership in a class need not be exclusive relative to membership in another class. For example, a particular data communication device may include membership in both the "X" class and the "Y" class, as described below with respect to the second exemplary implementation. The class table can be referenced when a class-based message is received by a data communication device to determine whether the message is applicable to the data communication device. In accordance with class-based networking, the message is received and processed if directed to a class of which the data communication device is a member, else the message is not received and processed.

Class tables also are helpful to reference when attempting to send a message. In this respect, a class table may include not only identification of the classes of which a data communication device is a member, but also the identification of other classes with which the data communication device may need to communicate under certain scenarios. Such a class table similarly is useful for a gateway controller when sending class-based communications.

Additionally, in one or more preferred embodiments, a gateway controller maintains and updates class tables for various data communication devices of one or more class-based wireless networks, whereby centralized assignment of classes may be performed and distributed from the gateway controller down to the different devices. Communications of updates and/or assignments of new classes for each data communication device thereby is efficiently performed.

Each of the nodes $X_1, X_2, X_3, X_4, X_5, X_6, X_7$ may be fixed or mobile, and each of the nodes $X_1, X_2, X_3, X_4, X_5, X_6, X_7$ may exit the wireless network 14 and may or may not rejoin the wireless network 14. The eighth node G also may be mobile or fixed. Accordingly, the wireless network 14 is shown in a grid formation in FIG. 1 only for simplicity and clarity in illustration, and it is to be understood that the spatial relationships between any of the various nodes $G, X_1, X_2, X_3, X_4, X_5, X_6, X_7$ likely will be fluid in any actual implementation. The exemplary grid arrangement also aids in illustrating an exemplary range of communication for each node. In this respect, each node is deemed to have a communications range equal to the length of a side of one of the nine basic squares of the grid. Consequently, communications may occur between a node either to the immediate side or top or bottom of another node within the grid; however, a node disposed diagonally to another node is out of direct communications range and, therefore, direct communications between such nodes do not occur. Again, each node is shown having the same communications range only for simplicity and clarity in illustration, and it is to be understood that the actual communications ranges of the nodes likely will vary in any actual implementation.

Communications Between Gateway Controller and Other Nodes in the First Exemplary Illustration Communications between the gateway controller 16 and each other node of the wireless network 14 occur in which information is acquired by the gateway controller 16 from each of the other nodes. The information may include data that is stored within a computer-readable medium of the node and/or data that is acquired from a sensor that is associated with the node. In communicating, TCP preferably is utilized as the protocol, which well known protocol is robust and accounts for error detection and correction.

Communications also preferably hop in this illustration, which tends to generally keep power consumption low as compared to continuous communication links being established and maintained between nodes along a pathway between an originating node and a destination node. Nevertheless, it contemplated that, instead of "hopping" between nodes, the connection may be established and maintained between origin and destination nodes until the information has been successfully communicated from origin to destination, which is believed to facilitate large file transfers as well as real time communications, such as voice over IP and video conferencing communications. Indeed, two communication links between each pair of nodes in the pathway may be established and maintained for enabling two-way communications using half-duplex standards based radios, such as Bluetooth radios.

Hopping is well suited for communicating, by a node, information regarding the occurrence of an event. Origination and communication of a message from a node to the gateway controller 16 preferably is triggered upon occurrence of a predefined event ("Trigger Event"). The Trigger Event may be based on data that is acquired by a sensor. Thus, for example, if a sensor monitors the opening of a maritime shipping container door, a Trigger Event may include the detection that the container door has been opened. In another example, if a sensor monitors for motion of an asset being tracked, a Trigger Event may include the movement of the asset. Alternatively, or in addition thereto, Trigger Events may be predefined to occur at regular defined intervals at which times messages are originated and communicated from a node to the gateway controller 16. Such messages may include all or a portion of data that has been acquired from a sensor associated with the node. Such intervals may be determined utilizing a timer. In addition to origination and communication of a message from a node to the gateway controller 16 upon occurrence of a Trigger Event, a message also may be originated and communicated from a node to the gateway controller 16 in response to an inquiry that is directed to the node, a response to which is included in the message. The inquiry may originate from the gateway controller 16 or from a server on the external network via the gateway controller 16.

Deterministic Vs. Nondeterministic Routing in the First Exemplary Illustration

Upon occurrence of a Trigger Event, and assuming that the originating node is other than the gateway controller 16, a message is originated and communicated from the originating node to a neighboring node. Two scenarios exist in this situation. First, a particular pathway for reaching a gateway controller 16 may be known to the originating node. In this first scenario, the wireless network 14 is deemed a "Deterministic Network," at least to the extent that the originating node can provide determined routing information when communicating the message, whereby the message will be sent to the gateway controller 16 via the identified pathway. In the second scenario, a pathway for reaching a gateway controller 16 is not known by the originating node, and the wireless network 14 is deemed a "Nondeterministic Network," at least to the extent that the originating node does not know and, therefore, cannot provide determined routing information identifying a pathway for communication of the message to a gateway controller 16. Each of these scenarios will be discussed in greater detail below. The nondeterministic network scenario is now described in detail.

Nondeterministic Routing Scenario for the First Exemplary Illustration

Communication from a Node to a Gateway Controller

FIGS. 2-8 illustrate the wireless network 14 of FIG. 1 in which a Trigger Event occurs at node $X_7$ and a sequence of node-to-node communications takes place thereafter. Because of the occurrence of the Trigger Event, a message is originated and communicated from node $X_7$ for further communication to the gateway controller 16. The sequence of node-to-node communications illustrated here is in accordance with nondeterministic routing and may occur, for example, when none of the nodes $X_1$ through $X_7$ have previously communicated with the gateway controller 16, i.e., when each node may be "new" to the wireless network 14 and/or "new" to the wireless network topology shown in FIG. 1.

Figure 2:
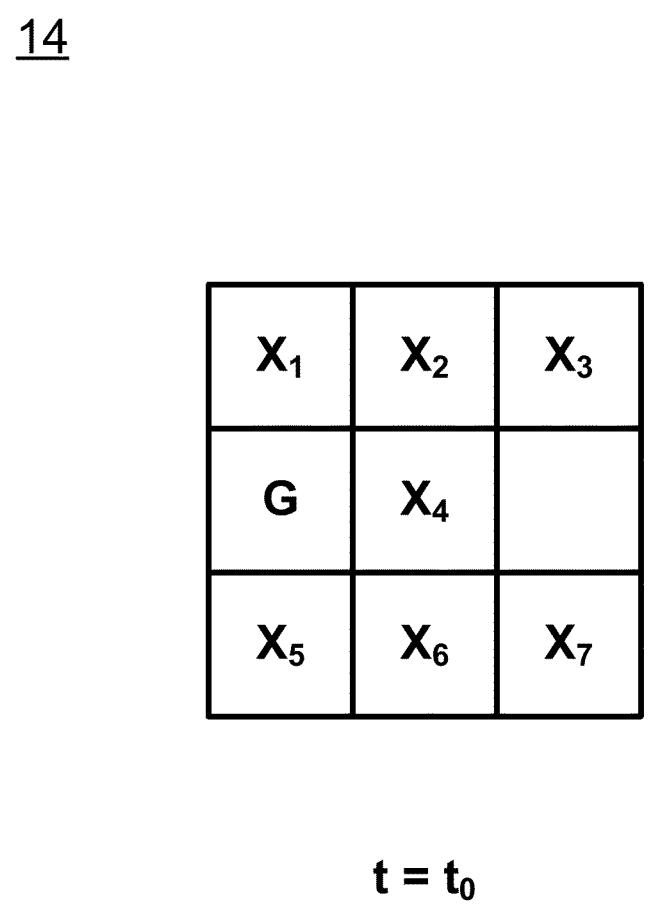
Figure 3:
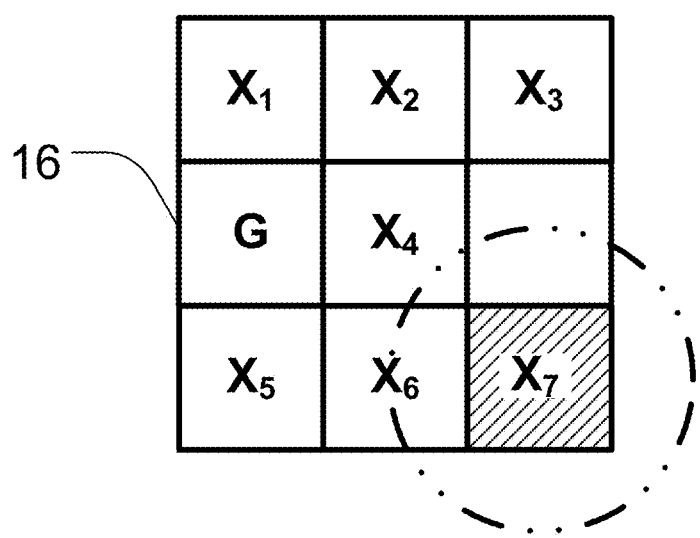

With particular regard to certain steps in the sequence of communicating the message from node $X_7$ to the gateway controller 16, FIG. 2 illustrates the wireless network 14 at time $t=t_0$ before any message has been originated or communicated. In contrast thereto, FIG. 3 illustrates that at time $t=t_1$ a Trigger Event has occurred at node $X_7$, and a message has been originated at node $X_7$. At this time the pathway for reaching a gateway controller 16 in the wireless network 14 is unknown to the data communication device of node $X_7$. Because the pathway is unknown, the message is communicated generally to any and all of the "X" class data communication devices falling within communications range of node $X_7$. The message therefore is shown in FIG. 3 being communicated at time $t=t_1$ to neighboring node $X_6$, which node happens to be within the communications range of node $X_7$. Indeed, the communications range of node $X_7$ is graphically illustrated in FIG. 3 by the generally circular outline around node $X_7$, within which only node $X_6$ at least partially lies. Nodes within the communications range of node $X_7$, i.e., node $X_6$, also are explicitly identified in the range definition set forth in FIG. 3. The act of communicating the message by node $X_7$ further is graphically illustrated in FIG. 3 by shading of the square of the grid containing node $X_7$.

Furthermore, it will be appreciated from the foregoing description that in communicating the message from node $X_7$ to node $X_6$, a communication link first is established between these two nodes. In establishing the communication link, preferably each node is identified to the other node in the communication link, whereby the originating node will come to learn the neighboring node that falls within its communications range (at least at that time). Furthermore, node $X_6$—an intermediate node—will come to learn the node from which the message is received for forwarding to a gateway controller 16. In establishing the communication link and in communicating the message, information regarding the quality of the link also may be monitored and recorded. This is the same for communications between any of the nodes further described below.

Figure 4:
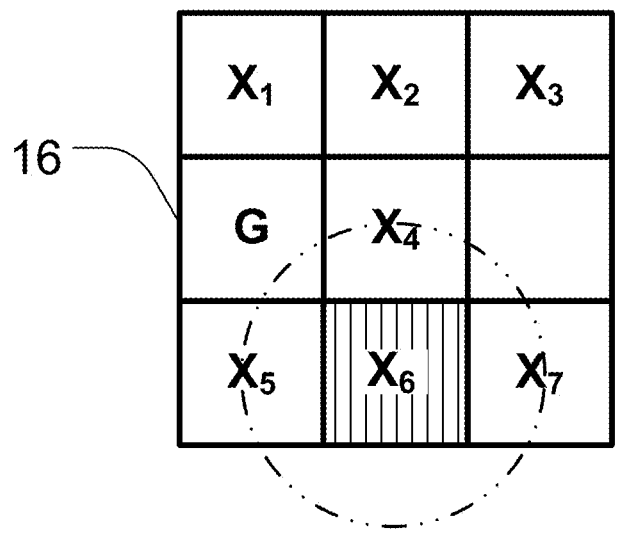

At time $t=t_2$, the message is shown in FIG. 4 being communicated by node $X_6$ to neighboring nodes $X_4$, $X_5$, $X_7$, which "X" class nodes happen to be within the communications range of node $X_6$. Again, because node $X_6$ does not know a pathway to the gateway controller 16, node $X_6$ proceeds to communicate the message generally to any and all "X" class nodes within its communications range following the same protocol as originating node $X_7$. The communications range of node $X_6$ is graphically illustrated in FIG. 4 by the generally circular outline around node $X_6$, within which only nodes $X_4$, $X_5$, $X_7$ each at least partially lies. Nodes within the communications range of node $X_6$, i.e., nodes $X_4$, $X_5$, $X_7$, also are explicitly identified in the range definition set forth in FIG. 4. The act of communicating the message by node $X_6$ further is graphically illustrated in FIG. 4 by shading of the square of the grid containing node $X_6$.

Figure 5:
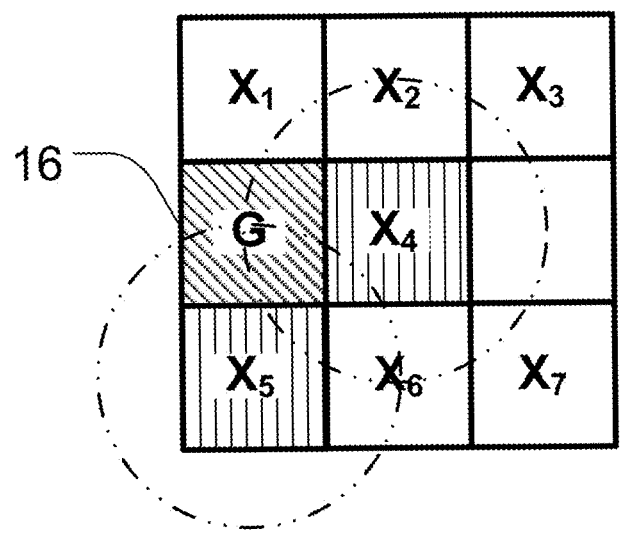

At time $t=t_3$, the message is shown in FIG. 5 being communicated by each of nodes $X_4$, $X_5$ to respective neighboring "X" class nodes that happen to be within communications range. The communications range of node $X_4$ is graphically illustrated by the generally circular outline around node $X_4$ in FIG. 5, and the communications range of node $X_5$ is graphically illustrated by the generally circular outline around node $X_5$ in FIG. 5. As further identified in FIG. 5, nodes $X_2$, G, $X_6$ each at least partially lies within the communications range of node $X_4$, and nodes G, $X_6$ each at least partially lies within the communications range of node $X_5$. The act of communicating the message by node $X_4$ further is graphically illustrated in FIG. 5 by shading of the square of the grid containing node $X_4$, and the act of communicating the message by node $X_5$ further is graphically illustrated in FIG. 5 by shading of the square of the grid containing node $X_5$. Receipt of a communication containing the message by node G at time $t=t_3$ also is emphasized in FIG. 5 by shading of the square of the grid containing node G.

Furthermore, it should be noted that although node $X_7$ received the communication from node $X_6$, node $X_7$ does not communicate the message a second time. Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $X_7$ is not illustrated in FIG. 5 as communicating the message again. Only nodes $X_4$, $X_5$, which have not previously communicated the message, are shown in FIG. 5 as communicating the message. Additionally, it will be appreciated that, in accordance with class-based networking, the gateway representing node G is a member of the "X" class, whereby node G is able to establish communications and communicate with other "X" class nodes. Thus, node G receives the message from both nodes $X_4$, $X_5$.

Figure 6:
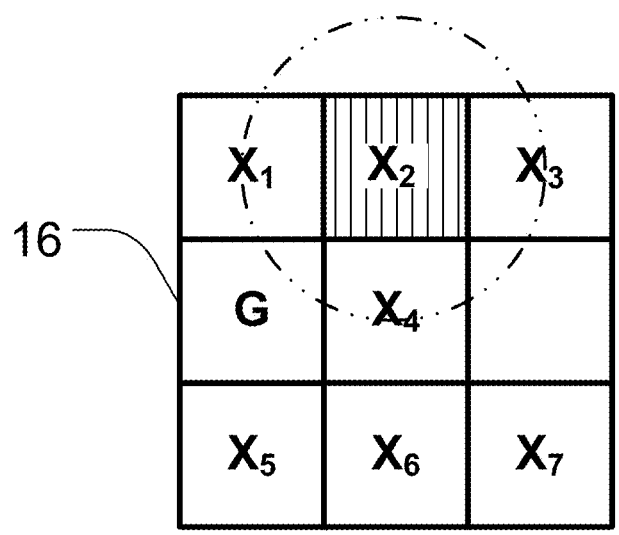

At time $t=t_4$, the message is shown in FIG. 6 being communicated to neighboring "X" class nodes $X_1$, $X_3$, $X_4$, which nodes happen to be within the communications range of node $X_2$. The communications range of node $X_2$ is graphically illustrated in FIG. 6 by the generally circular outline around node $X_2$, within which only nodes $X_1$, $X_3$, $X_4$ each at least partially lies. The nodes within the communications range of node $X_2$, i.e., nodes $X_1$, $X_3$, $X_4$, also are explicitly identified in the range definition set forth in FIG. 6. The act of communicating the message by node $X_2$ further is graphically illustrated by shading of the square of the grid containing node $X_2$.

Figure 7:
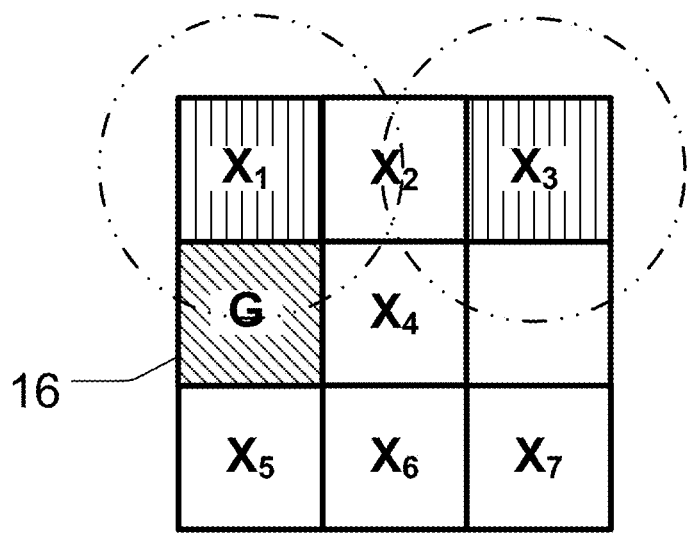

At time $t=t_5$, the message is shown in FIG. 7 being communicated by each of nodes $X_1$, $X_3$ to respective neighboring class "X" nodes that happen to be within communications range. The communications range of node $X_1$ is graphically illustrated by the generally circular outline around node $X_1$ in FIG. 7, and the communications range of node $X_3$ is graphically illustrated by the generally circular outline around node $X_3$ in FIG. 7. As further identified in FIG. 7, nodes G, $X_2$ each at least partially lies within the communications range of node $X_1$, and node $X_2$ at least partially lies within the communications range of node $X_3$. The act of communicating the message by node $X_1$ further is graphically illustrated by shading of the square of the grid containing node $X_1$, and the act of communicating the message by node $X_3$ further is graphically illustrated by shading of the square of the grid containing node $X_3$. Receipt of a communication containing the message by node G at time $t=t_5$ also is emphasized in FIG. 7 by shading of the square of the grid containing node G.

Figure 8:
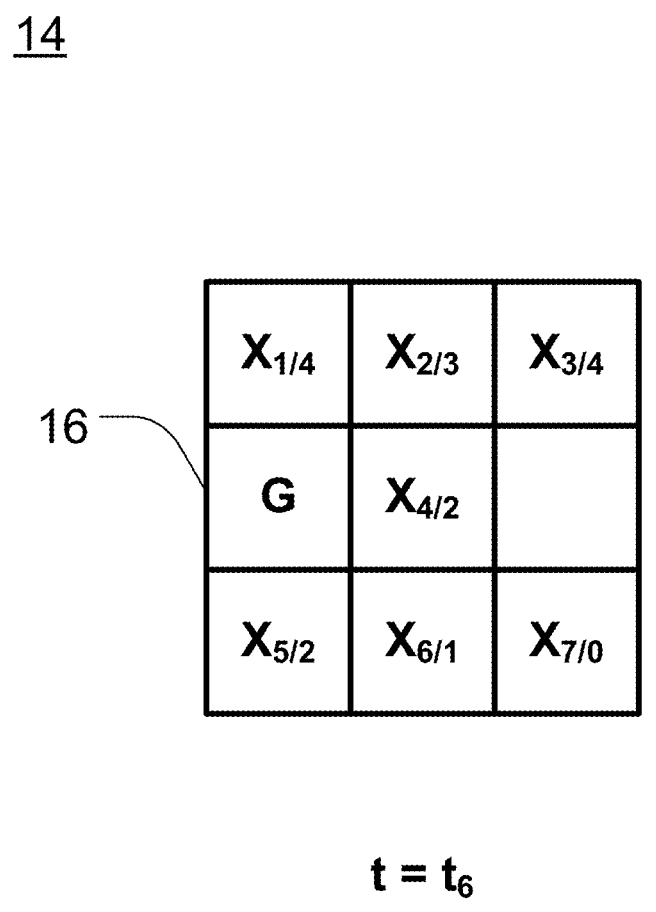

At time $t=t_6$, the message now has been communicated to the gateway controller 16 by way of three different pathways, the message has been propagated generally to all nodes of the wireless network 14, and no further communication of the message within the wireless network 14 occurs, as illustrated in FIG. 8. Moreover, each node is identified in FIG. 8 with reference to the number of "hops" that occurred in receiving the message (for the first time) from the originating node. As indicated in FIG. 8, for example, node $X_1$ received the message after four (4) hops, and node $X_3$ received the message after four (4) hops, too.

Notably, when node G (the gateway controller 16) receives the message the following information also may be received: the pathway, including the identification of the originating node and each intermediate node by which the message was communicated; the link quality of each communication link of the pathway; a possible checksum; and priority. In class-based networks, the header of the communication also may include one or more class designations. Other information also may be sent with the message and received by node G. Moreover, based on the illustration set forth in FIGS. 2-8, the gateway controller 16 represented by node G receives three (3) communications of the message, and the gateway controller 16 preferably records three times (once for each time the message is received), the respective information communicated with the message. The gateway controller 16 additionally may calculate and record a representative overall link quality for each pathway in association therewith.

For purposes of illustration, a table shown in FIG. 9 that sets forth exemplary link qualities of each possible communication link in the wireless network topology of FIG. 1. In these examples, the link quality is represented by a percentage of packets that are successfully transmitted to total transmitted packets. Moreover, it should be noted that differences in link quality are overstated in order to emphasize the differences. In actuality, the differences in link quality between a "good link" and a "poor link" are typically much smaller. It further should be noted that other means for determining link quality can be utilized, such as by monitoring the number of packets that are retransmitted between two nodes.

Notably, in the foregoing illustration of FIGS. 2-8, the gateway controller 16 will not record the link quality for the communication link between respective data communication devices of nodes $X_2$ and $X_3$. This communication link will not be recorded by the gateway controller 16 because no pathway included node $X_3$. Thus, the gateway controller 16 will receive and record the link quality for all possible links except the communication link between respective data communication devices of node $X_2$ and node $X_3$. A table is shown in FIG. 11 that sets forth exemplary link qualities for all links that are known to the gateway controller 16 as a result of the communications shown in FIGS. 2-8.

Additionally, for purposes of illustration, a table setting forth exemplary overall link qualities of each possible pathway is shown in FIG. 10. Again, differences in link quality and, thus, overall link quality are overstated in order to emphasize such differences. The overall link quality shown here is based on the link quality for each node-to-node communication link set forth in the table of FIG. 9, and is achieved through multiplication of the individual link qualities making up a particular pathway. In the foregoing illustration of FIGS. 2-8, the gateway controller 16 will be able to calculate the overall link quality for all pathways in the wireless network 14 except for the pathways that include node $X_3$. A table setting forth exemplary overall link qualities for all pathways known to the gateway controller 16 is shown in FIG. 12. A table is shown in FIG. 12 that sets forth the pathway and overall link quality that are known to the gateway controller 16 as a result of the communications shown in FIGS. 2-8.

It is revealing to note that the tables of FIGS. 9-10 and the tables of FIGS. 11-12 do not differ significantly, and that a significant amount of information has been learned by the gateway controller 16 about the wireless network 14 upon the single message having been originated and communicated from node $X_7$ (i.e., the data communication device thereof) in the nondeterministic manner. It should further be noted that the identification of the nodes in the tables of FIGS. 9-12 represent the data communication devices of the nodes and that each data communication device is identified by a unique identifier.

Furthermore, several observations of characteristics of the wireless network 14 and manner of communicating as set forth in FIGS. 2-8 should now be apparent to the Ordinary Artisan. For example, it should be apparent that no node of the wireless network 14 will appear twice in any pathway. Second, it should be apparent that a node must either be an originating node or an intermediate node in a pathway by which a message is successfully communicated to the gateway controller 16 in order for the gateway controller 16 to gain information regarding that node. Third, a message sent in nondeterministic manner from an originating node that arrives via the same gateway controller 16 from two top level nodes evidences the fact that the two top level nodes each represents an ad hoc network in which the nodes of the particular network are disposed in communication with each other. Conversely, a message sent in nondeterministic manner from an originating node that arrives via a gateway controller 16 from only one of two or more known top level nodes evidences the fact that the top level node represents an ad hoc network in which nodes of that network are disposed in radio isolation from all other nodes of the other ad hoc networks represented by the other top level nodes. In the exemplary wireless network 14 of FIGS. 1-8, top level nodes include nodes $X_1$, $X_4$, and $X_5$. There are no isolated ad hoc networks shown in FIGS. 1-8.

Deterministic Routing Scenario for the First Exemplary Illustration

Communication from a Gateway Controller to a Node

A deterministic routing illustration is readily described based on the information obtained from the nondeterministic routing illustration of FIGS. 2-8. In this regard, if a message such as an inquiry or command is to be sent from the gateway controller 16 to a data communication device of a node of the wireless communications network 14, the information received by the gateway controller 16 preferably is utilized in sending the message via a known pathway that includes the recipient node as the last node of the pathway. In particular, if the gateway controller 16 is to send a message, for example, to node $X_7$, then the gateway controller 16 preferably searches the known pathways in Table 4 of FIG. 12 and identifies each pathway that ends with the data communication device of node $X_7$. Of all such pathways that are identified, the gateway controller 16 preferably sends the message along one of the pathways that is selected to be the "best" based on one or more predefined parameters and/or algorithms.

An exemplary algorithm that may be used includes selecting the pathway having the shortest number of intermediate nodes, thereby reducing the number of "hops" that must occur in successfully communicating the message to the destination node. In other words, the "shortest" known pathway is selected. Referring to the Table 4 of FIG. 12, two pathways comprise the shortest pathways, and are represented by the notations //G/X4/X6/X7 and //G/X5/X6/X7.

In selecting the "best" of these two "shortest" pathways, additional factors may be considered, such as the overall link quality of the pathway, with the pathway having the best overall link quality being selected. In this case, the first pathway has an overall link quality of 24.3% which exceeds, in this case substantially, the overall link quality of 8.1% of the second pathway and, thus, the first pathway preferably would be selected as the determined route for sending the message from the gateway controller 16 to the data communication device of node $X_7$.

Another algorithm for selecting a pathway may comprise selecting the pathway having the best overall link quality without regard to the number of intermediate nodes or hops. For example, with reference to Table 4 of FIG. 12, a message to be communicated to the data communication device of node $X_5$ would be sent via pathway //G/X4/X6/X5 in accordance with this algorithm, even though pathway //G/X5 is the shortest, because the overall link quality of the longer pathway is 72.9% compared to the overall link quality of the shorter pathway of 30%. The unexpected difference in link qualities may be attributed, for example, to environmental factors including radio frequency obstacles. Moreover, such radio frequency obstacles can be inferred from the data that is collected with messages received from the wireless network 14, including the various pathways and link qualities, as shown in the tables. Inferences that may be drawn include the absolute or relative locations of radio frequency obstacles if absolute or relative locations of the data communication devices of certain nodes is known. Such information, for example, can be acquired from GPS sensors and the like that are included or associated with these data communication devices.

Dynamic Nature of the Ad Hoc Wireless Network and Continual Maintenance of Routing Tables Due to the nature of the ad hoc network and the mobility of one or more of the data communication devices of the nodes thereof, the wireless network topology likely will change over time. (This is in contrast to fixed, wired networks.) Consequently, pathways and link qualities will change, and pathways and link qualities recorded in any table that may be maintained by the gateway controller 16 likely will become outdated. To address this, the gateway controller 16 preferably updates any such table as each message and associated information is received from the wireless network 14. Due to the significant amount of information that may be received from the wireless network 14 with any given message, information maintained by the gateway controller 16 nevertheless may prove valuable during its useful life. Moreover, information that is outdated may be identified based on more recent information that is received by the gateway controller 16 with another message, as well as by the failure to receive an acknowledgement ("ACK") in response to a communication by the gateway controller 16 to a particular node of the wireless network 14 via a previously known pathway. An entry for a pathway by which a message is not successfully sent from the gateway controller 16 to a node may be removed, together with all sub-pathways including the destination node of the message.

Use of Network Watermarks in the Context of the First Exemplary Illustration

Communication from a Node to a Gateway Controller

In accordance with the present invention, and with this first illustration as a backdrop, communications among the nodes of the network 14 preferably include a network watermark as now described below.

As noted hereinabove, when a gateway controller receives a message, a header of the message preferably includes the pathway history by which the message has been communicated, e.g. an identification of the originating node and each intermediate node by which the message was communicated.

More specifically, FIGS. 2-8 illustrate the wireless network 14 of FIG. 1 in which a Trigger Event occurs at node $X_7$ and a sequence of node-to-node communications takes place thereafter. Because of the occurrence of the Trigger Event, a message is originated and communicated from node $X_7$ for further communication to the gateway controller 16. The sequence of node-to-node communications illustrated here is in accordance with nondeterministic routing and may occur, when none of the nodes $X_1$ through $X_7$ have previously communicated with the gateway controller 16.

FIG. 2 illustrates the wireless network 14 at time $t=t_0$ before any message has been originated or communicated. In contrast thereto, FIG. 3 illustrates that at time $t=t_1$ a Trigger Event has occurred at node $X_7$, and a message has been originated at node $X_7$. At this time, the message is communicated generally to any and all of the "X" class data communication devices falling within communications range of node $X_7$. The message therefore is shown in FIG. 3 being communicated at time $t=t_1$ to neighboring node $X_6$, which node happens to be within the communications range of node $X_7$. Prior to, or in, communicating the message, an identification of the communicating node, i.e. the originating node $X_7$, is appended to the message.

In communicating the message from node $X_7$ to node $X_6$, a communication link first is established between these two nodes. In establishing the communication link, preferably each node is identified to the other node in the communication link. Further, in establishing the communication link and in communicating the message, information regarding the link also may be monitored and recorded. This is the same for communications between any of the nodes further described below.

At time $t=t_2$, the message is shown in FIG. 4 being communicated by node $X_6$ to neighboring nodes $X_4$, $X_5$, $X_7$, which "X" class nodes happen to be within the communications range of node $X_6$. This message includes the identification of the originating node which was appended to the message. Prior to, or in, communicating the message, an identification of the communicating node, i.e. $X_6$, is appended to the message.

At time $t=t_3$, the message is shown in FIG. 5 being communicated by each of nodes $X_4$, $X_5$ to respective neighboring "X" class nodes that happen to be within communications range. This message includes the identification of the originating node, as well as the identification of intermediate node $X_6$. Further, prior to, or in, communicating the message, an identification of the respective communicating node is appended to the message. Thus, the message as communicated by node $X_4$ includes an identification of node $X_4$, while the message as communicated by node $X_5$ includes an identification of node $X_5$.

At time $t=t_4$, the message is shown in FIG. 6 being communicated by node $X_2$ to neighboring "X" class nodes $X_1, X_3, X_4$, which nodes happen to be within the communications range of node $X_2$. This message includes the identification of the originating node, as well as the identification of each intermediate node it has hopped through. Further, prior to, or in, communicating the message, an identification of the communicating node, i.e. $X_2$, is appended to the message.

At time $t=t_5$, the message is shown in FIG. 7 being communicated by each of nodes $X_1, X_3$ to respective neighboring class "X" nodes that happen to be within communications range. This message includes the identification of the originating node, as well as the identification of each intermediate node it has hopped through. Further, prior to, or in, communicating the message, an identification of the respective communicating node is appended to the message. Thus, the message as communicated by node $X_1$ includes an identification of node $X_1$, while the message as communicated by node $X_3$ includes an identification of node $X_3$.

At time $t=t_6$, the message now has been communicated to the gateway controller 16 by way of three different pathways, and no further communication of the message within the wireless network 14 occurs, as illustrated in FIG. 8. The message received at the gateway controller via each of the three pathways includes the pathway history for that pathway. As described, each pathway history includes an identification of the originating node, and an identification of each intermediate node through which the message was communicated. Preferably, the identification of each node represents the data communication device of that node, which is identified by a unique identifier. FIG. 10 illustrates, inter alia, exemplary logical pathway histories for each of the pathways described above.

These pathway histories can be utilized by the gateway controller in a variety of ways. For example, these pathway histories may be compared to network information stored at the gateway controller to attempt to confirm that each node through which the message passed represents a "trusted" node, or that the path itself corresponds to a stored "trusted" path. Notably, routing tables and other network information maintained at the gateway controller, or elsewhere, may be used for such comparisons and confirmation. Alternatively, these pathway histories may be stored at the gateway controller, or communicated elsewhere for storage, for later analysis, as described in more detail hereinbelow.

This example demonstrates the use of simple network watermarks comprising an identification of each node through which a message passes. As described, such identifications are appended to the message by each node as the message travels along a pathway to the gateway controller. Alternatively, or additionally, the message may be modified in other ways by each node, and other information may be sent with the message and received at the gateway controller. This other information may include, for example, a timestamp associated with each node. The modification of a message at a node is controlled by rules of the node. Such rules preferably represent an algorithm implemented at each node in either hardware, software, or some combination thereof.

Use of Acknowledgments in the First Exemplary Illustration

Upon the successful receipt of a message by the gateway controller 16, the gateway controller 16 preferably sends an acknowledgment ("ACK") to the originating node of the message to acknowledge the successful receipt of the message. Preferably, only one ACK is sent for each particular message, regardless of the number of times that the particular message is received by the gateway controller 16 via different pathways. In sending the ACK, the gateway controller 16 preferably selects a known pathway based on information that is received with the message or that has been received in conjunction with previous messages or other intelligence that is known about the network topology. Selection of the particular pathway is made in accordance with one of the disclosed algorithms or in accordance with some other algorithm, as desired. If an ACK is not received from the gateway controller 16 by the originating node, then the originating node will save the message in memory for communication at a later time when communication with the gateway controller 16 is available, whether via the wireless network 14 of FIGS. 1-8 or via a future wireless network in which the data communication device becomes a node.

Similarly, the receipt of a message representing a command or inquiry that is sent by a gateway controller 16 to a destination node preferably is acknowledged by an ACK being sent to the gateway controller 16 from the destination node. The message may be sent via a known pathway, or, if the pathway is outdated or otherwise unknown, then the message is sent in accordance with the nondeterministic routing method of the present invention. In particular, the message is communicated in the wireless network in which the destination node is expected. The message then propagates through the nodes of that wireless network and, when the destination node receives the message, the ACK is communicated by the destination node to the gateway controller 16. Moreover, like the gateway controller 16 in the implementation illustrated in FIGS. 2-8, the node in this case will have sufficient information upon receipt of the message to select the "best" pathway for communicating the ACK back to the gateway controller 16. Additionally, if an ACK is not received by the gateway controller 16, then the gateway controller 16 can store or cache the message for later communication, or the gateway controller 16 can communicate the message to one or more other suspected wireless networks in which the data communication device of the destination node (the actual recipient of the message) may be found.

In accordance with preferred implementations, the successful receipt of an ACK is not acknowledged in order to avoid a recurring chain of communications.

Use of Network Watermarks in the Context of the First Exemplary Implementation

Communication from a Gateway Controller to a Node

In the prior watermark example, discussed with reference to FIGS. 2-8, a network watermark comprising a pathway history was constructed for a message communicated from a node to a gateway controller. The use of acknowledgment messages, however, allows for similar utilization of network watermarks for messages communicated from a gateway to a node.

More specifically, the receipt of a message that is sent by a gateway controller 16 to a destination node preferably is acknowledged by an ACK sent to the gateway controller 16 from the destination node. The message may be sent in accordance with the nondeterministic routing method described above. In particular, the message is communicated in the wireless network in which the destination node is expected. Preferably, the message propagates through the nodes of that wireless network, and an identification of each node along a pathway the message travels is appended to the message as it travels along that pathway. When the destination node receives the message, an ACK is communicated by the destination node to the gateway controller 16. Notably, like the gateway controller 16 in the implementation illustrated in FIGS. 2-8, the node in this case will have sufficient information upon receipt of the message to select the "best" pathway for communicating the ACK back to the gateway controller 16.

This ACK that is communicated back to the gateway controller 16 includes the pathway history, which can be characterized as a simple network watermark. Such a watermark may be compared to network information stored at the gateway controller to attempt to confirm that each node through which the message passed represents a "trusted" node, or that the path itself corresponds to a stored "trusted" path. Alternatively, such watermarks may be stored at the gateway controller, or communicated elsewhere for storage, for later analysis, as described in more detail hereinbelow.

Second Exemplary Illustration

A single class-based network is described above with regard to FIGS. 1-12. Another illustration is now described in which two class-based networks physically coexist and communicate with a gateway controller represented by node 17. In particular, communications between the gateway controller 17 and each node of two distinct class-based wireless networks is now described with reference to FIGS. 13-30, in which information is acquired by the gateway controller 17 from each of the nodes. The information may include data that is stored within a computer-readable medium of the node and/or data that is acquired from a sensor that is associated with the node. In communicating between nodes, TCP preferably is utilized as the protocol, which well known protocol is robust and accounts for error detection and correction.

Origination and communication of a message from a node to the gateway controller 17 preferably is triggered upon occurrence of a predefined event ("Trigger Event"). The Trigger Event may be based on data that is acquired by a sensor. Thus, for example, if a sensor monitors the opening of a maritime shipping container door, a Trigger Event may include the detection that the container door has been opened. In another example, if a sensor monitors for motion of an asset being tracked, a Trigger Event may include the movement of the asset. Alternatively, or in addition thereto, Trigger Events may be predefined at regular defined intervals upon which messages are originated and communicated from a node to the gateway controller 17. Such messages may include all or a portion of data that has been acquired from a sensor associated with the node.

In addition to origination and communication of a message from a node to the gateway controller 17 upon occurrence of a Trigger Event, a message also may be originated and communicated from a node to the gateway controller 17 in response to an inquiry that is received by and directed to the node, a response to which is included in the message.

Deterministic Vs. Nondeterministic Routing in the Second Exemplary Illustration

Upon occurrence of a Trigger Event, and assuming that the originating node is other than a gateway controller 17, a message is originated and communicated from the originating node to a neighboring node within a class-based network. Two scenarios exist in this situation. First, a particular pathway for reaching a gateway controller 17 may be known to the originating node. In this first scenario, the class-based wireless network is deemed a deterministic network, at least to the extent that the originating node can provide determined routing information in the communication of the message, whereby the message will be sent to the gateway controller 17 via the identified pathway. In the second scenario, a pathway for reaching a gateway controller 17 is not known by the originating node, and the class-based wireless network is deemed a nondeterministic network, at least to the extent that the originating node does not know and, therefore, cannot provide determined routing information identifying a pathway for communication of the message to a gateway controller 17. Each of these scenarios will be discussed in greater detail below. The nondeterministic network scenario is described in detail now with reference to FIGS. 14-19, both in connection with an "X" class-based network and in connection with a "Y" class-based network. The two class-based networks are formed by a plurality 24 of wireless data communication devices.

Nondeterministic Routing Scenario for the Second Exemplary Illustration

Communication from a Node to a Gateway Controller

Figure 13:
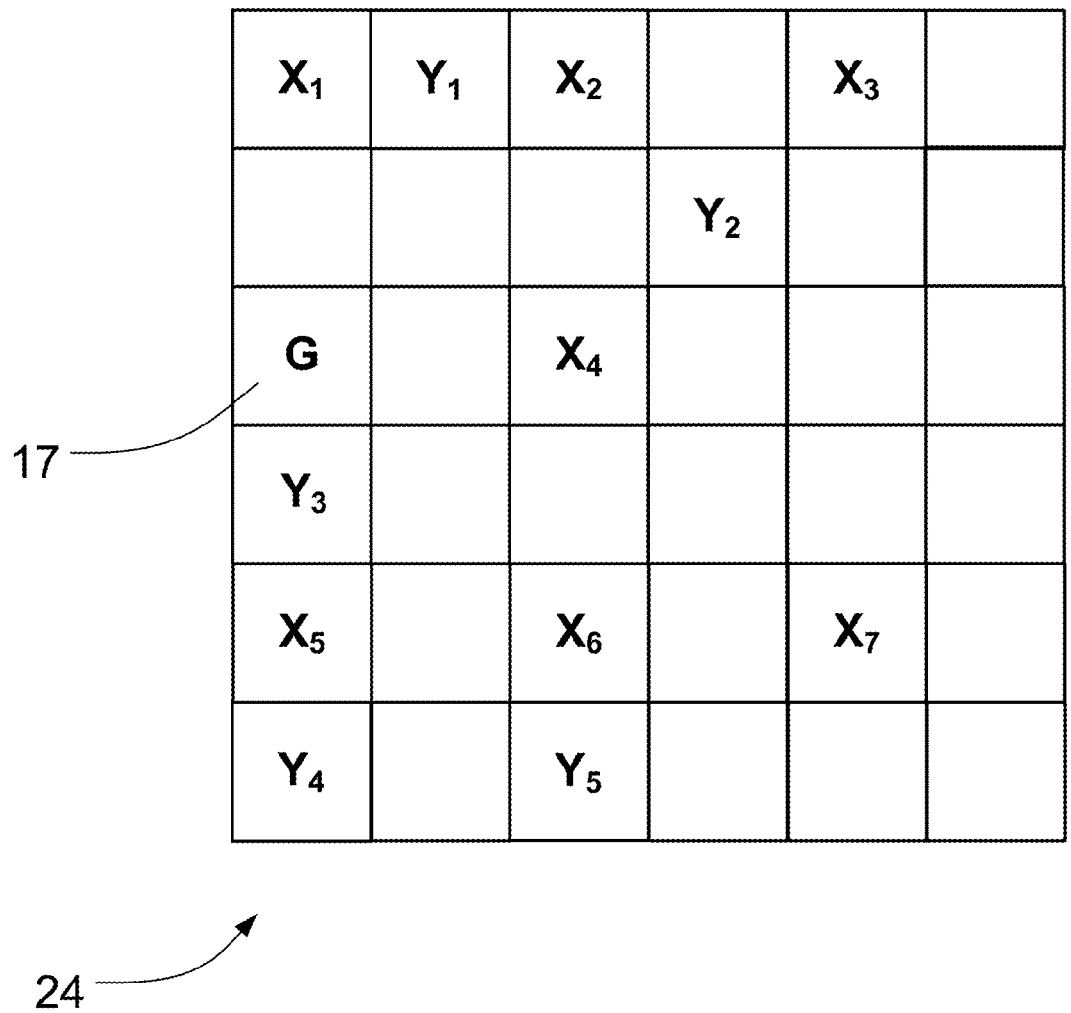
FIG. 13 illustrates another architecture associated with exemplary embodiments of the invention in which class-based wireless networks are utilized.

FIGS. 14-19 illustrate the "X" class-based wireless network of FIG. 13 in which the sequence of node-to-node communications takes place following occurrence of a Trigger Event at node $X_7$. Because of the occurrence of the Trigger Event, a message is originated and communicated from node $X_7$ for further communication to the gateway controller 17. The sequence of node-to-node communications illustrated here is in accordance with nondeterministic routing and may occur, for example, when nodes $X_1$ through $X_7$ have not previously communicated with the gateway controller 17 through the wireless network, i.e., when each node may be "new" to the "X" class-based wireless network and/or "new" to the wireless network topology thereof shown in FIG. 13.

Figure 14:
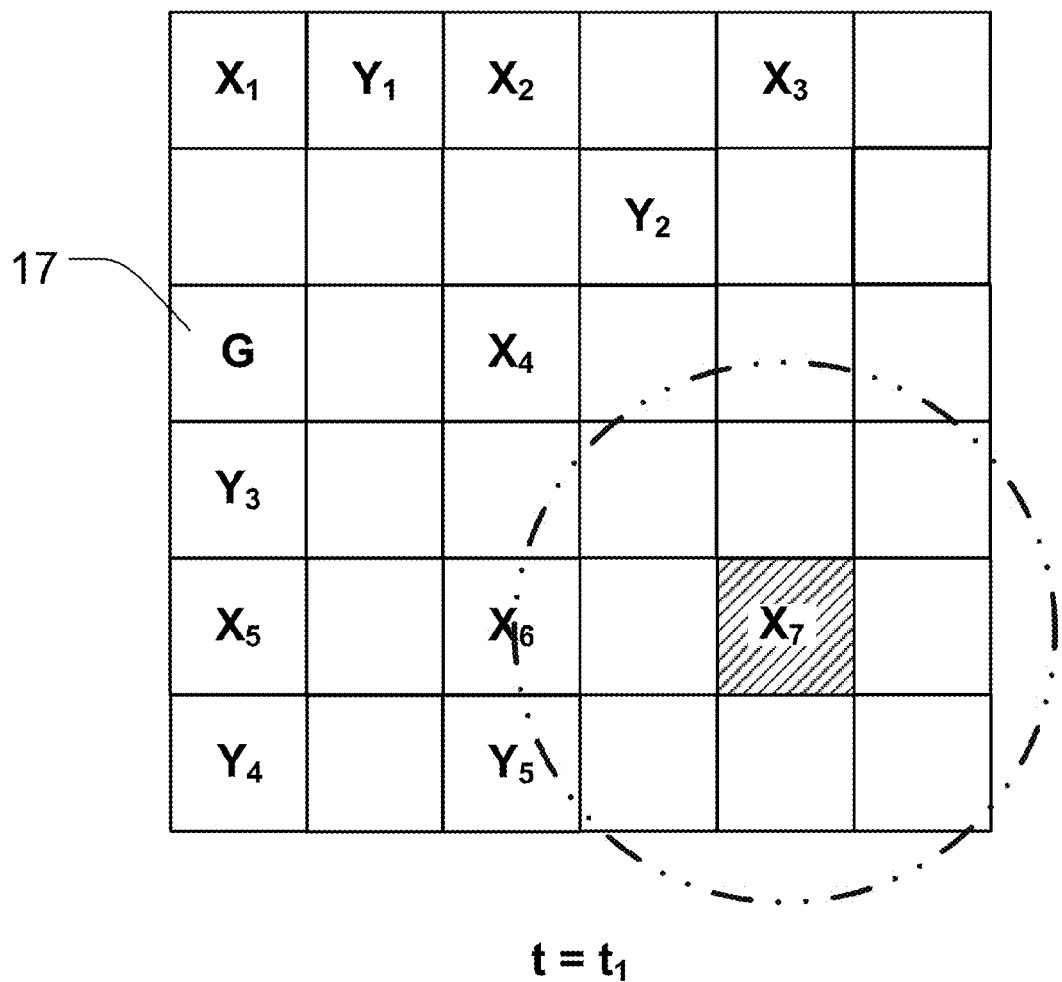

With particular regard to certain steps in the sequence of communicating the message from node $X_7$ to the gateway controller 17, FIG. 14 illustrates the wireless network 24 at time $t=t_1$ when a Trigger Event has occurred at node $X_7$ and a message has been originated at node $X_7$. At this time, the pathway for reaching a gateway controller 17 in the "X" class-based wireless network is unknown to the data communication device of node $X_7$. Accordingly, the message is communicated generally to all data communication devices of class "X" falling within the communications range of node $X_7$. The message therefore is shown in FIG. 14 being communicated at time $t=t_1$ to neighboring node $X_6$, which node happens to be within the communications range of node $X_7$. Indeed, the communications range of node $X_7$ is graphically illustrated in FIG. 14 by the generally circular outline around node $X_7$, within which only node $X_6$ at least partially lies. The act of communicating the message by node $X_7$ further is graphically illustrated in FIG. 14 by shading of the square of the grid containing node $X_7$.

Furthermore, it will be appreciated from the foregoing description that in communicating the message from node $X_7$ to node $X_6$, a communication link first was established between these two nodes. In establishing the communication link, preferably each node is identified to the other node, whereby the originating node will come to learn the neighboring node that falls within its communications range (at least at that time). Furthermore, node $X_6$—an intermediate node—will come to learn from which node the message is received for forwarding to a gateway controller 17. In establishing the communication link and in communicating the message, information regarding the quality of the link also is monitored and recorded.

Figure 15:
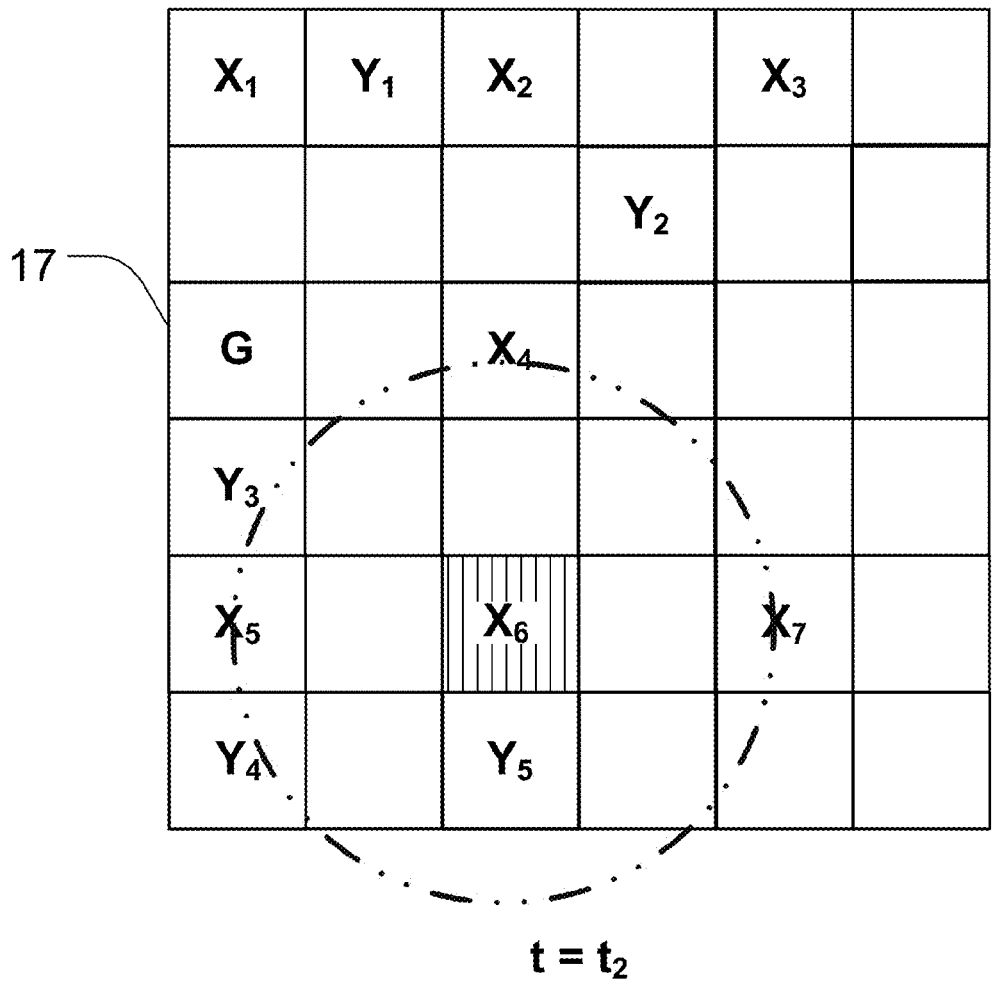

At time $t=t_2$, the message is shown in FIG. 15 being communicated by node $X_6$ to neighboring nodes $X_4$, $X_5$, $X_7$, which nodes happen to be within the communications range of node $X_6$. Again, because node $X_6$ does not know a pathway to the gateway controller 17, node $X_6$ proceeds to communicate the message generally to all nodes within its communications range following the same protocol as originating node $X_7$. The communications range of node $X_6$ is graphically illustrated in FIG. 15 by the generally circular outline around node $X_6$, within which only nodes $X_4$, $X_5$, $X_7$ each at least partially lies. The act of communicating the message by node $X_6$ further is graphically illustrated in FIG. 15 by shading of the square of the grid containing node $X_6$.

Figure 16:
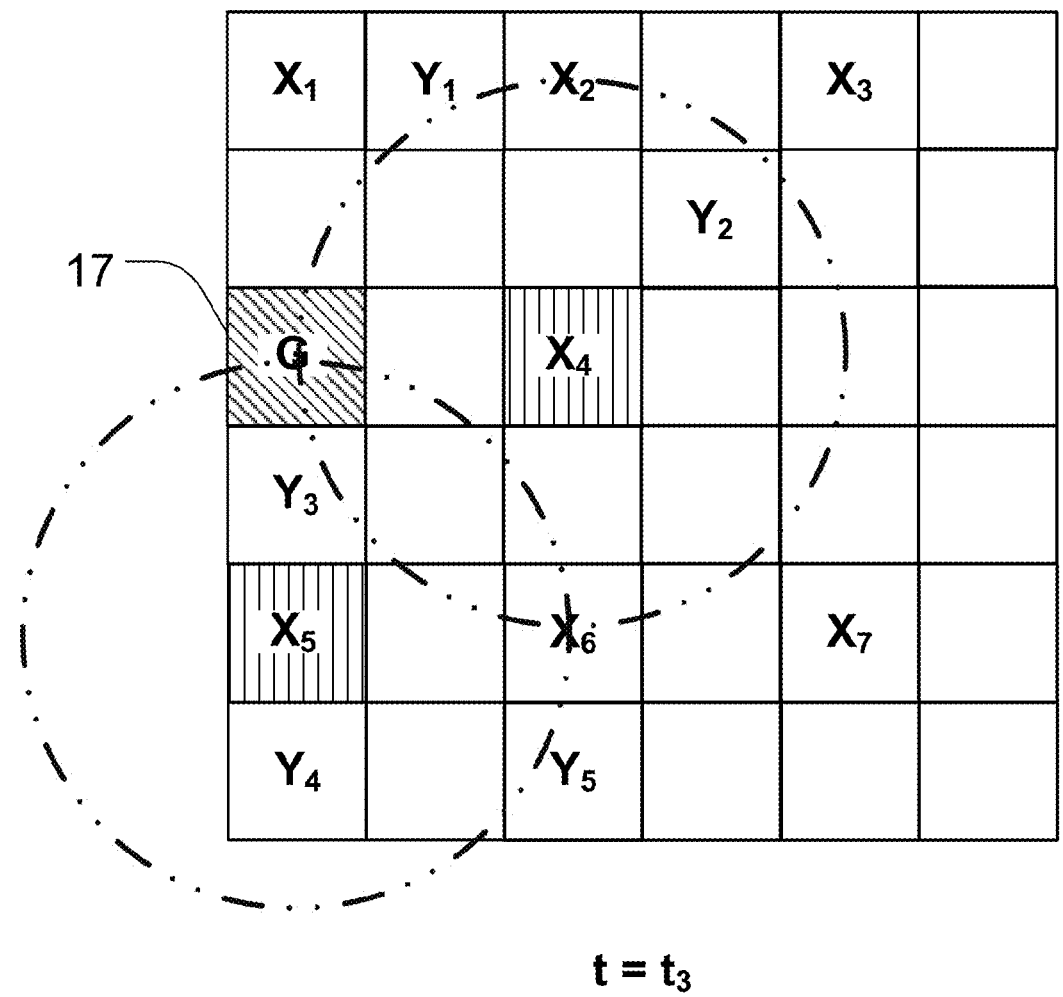

At time $t=t_3$, the message is shown in FIG. 16 being communicated by each of nodes $X_4$, $X_5$ to respective neighboring nodes that happen to be within communications range. The communications range of node $X_4$ is graphically illustrated by the generally circular outline around node $X_4$ in FIG. 16, and the communications range of node $X_5$ is graphically illustrated by the generally circular outline around node $X_5$ in FIG. 16. As further identified in FIG. 16, nodes $X_2$, G, $X_6$ each at least partially lies within the communications range of node $X_4$, and nodes G, $X_6$ each at least partially lies within the communications range of node $X_5$. The act of communicating the message by node $X_4$ further is graphically illustrated in FIG. 16 by shading of the square of the grid containing node $X_4$, and the act of communicating the message by node $X_5$ further is graphically illustrated in FIG. 16 by shading of the square of the grid containing node $X_5$. Receipt of a communication containing the message by node G at time $t=t_3$ also is emphasized in FIG. 16 by shading of the square of the grid containing node G.

Furthermore, it should be noted that node $X_7$ that receives the communication from node $X_6$ does not again communicate the message. Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $X_7$ is not illustrated in FIG. 16 as communicating the message again. Only nodes $X_4$, $X_5$, which have not yet communicated the message, are shown in FIG. 16 as communicating the message.

Figure 17:
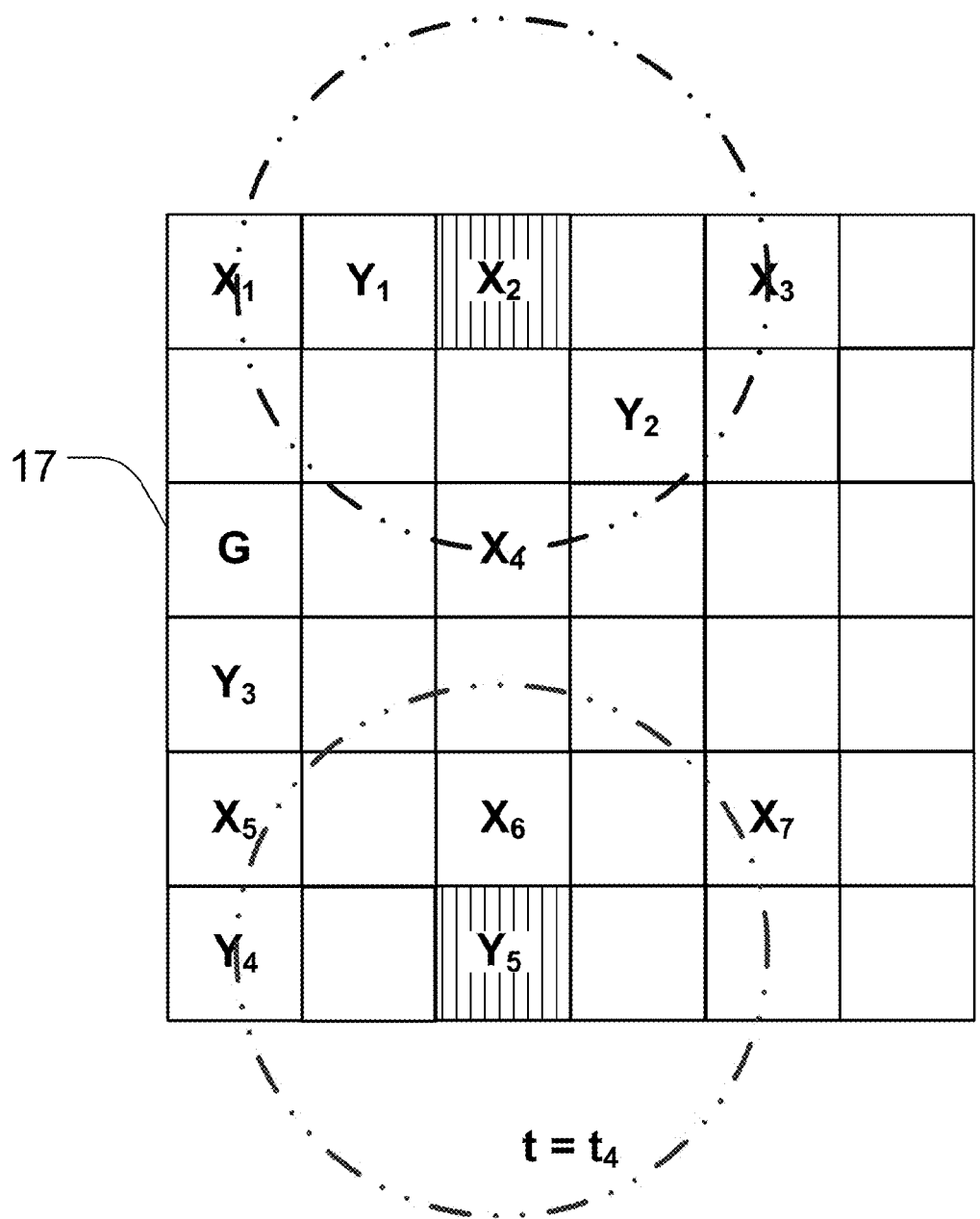

At time $t=t_4$, the message is shown in FIG. 17 being communicated to neighboring nodes $X_1$, $X_3$, $X_4$, which nodes happen to be within the communications range of node $X_2$. The communications range of node $X_2$ is graphically illustrated in FIG. 17 by the generally circular outline around node $X_2$, within which only nodes $X_1$, $X_3$, $X_4$ each at least partially lies. The act of communicating the message by node $X_2$ further is graphically illustrated by shading of the square of the grid containing node $X_2$.

Figure 18:
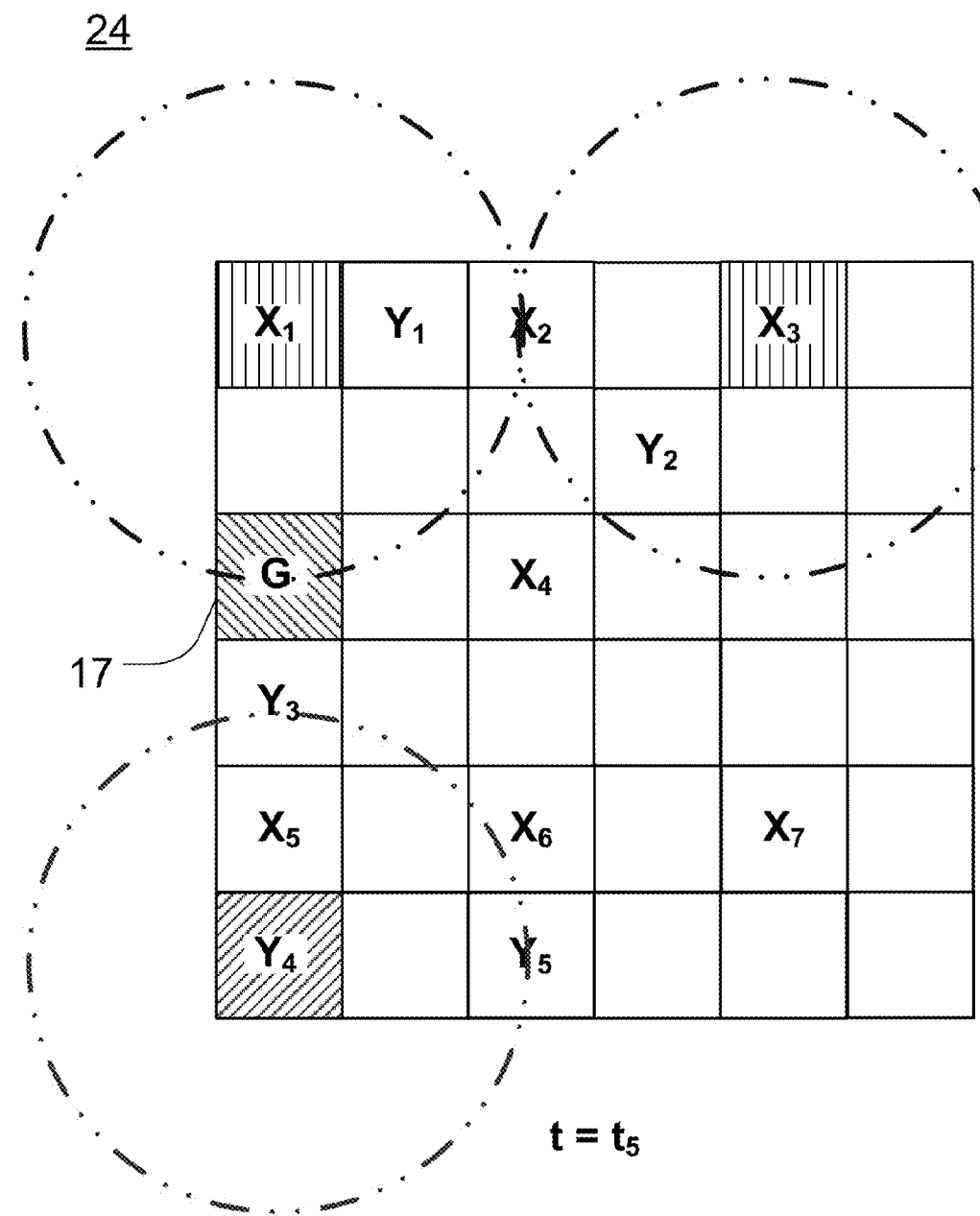

At time $t=t_5$, the message is shown in FIG. 18 being communicated by each of nodes $X_1$, $X_3$ to respective neighboring nodes that happen to be within communications range. The communications range of node $X_1$ is graphically illustrated by the generally circular outline around node $X_1$ in FIG. 18, and the communications range of node $X_3$ is graphically illustrated by the generally circular outline around node $X_3$ in FIG. 18. As further shown in FIG. 18, nodes G, $X_2$ each at least partially lies within the communications range of node $X_1$, and node $X_2$ at least partially lies within the communications range of node $X_3$. The act of communicating the message by node $X_1$ further is graphically illustrated by shading of the square of the grid containing node $X_1$, and the act of communicating the message by node $X_3$ further is graphically illustrated by shading of the square of the grid containing node $X_3$. Receipt of a communication containing the message by node G at time $t=t_5$ also is emphasized in FIG. 18 by shading of the square of the grid containing node G.

Figure 19:
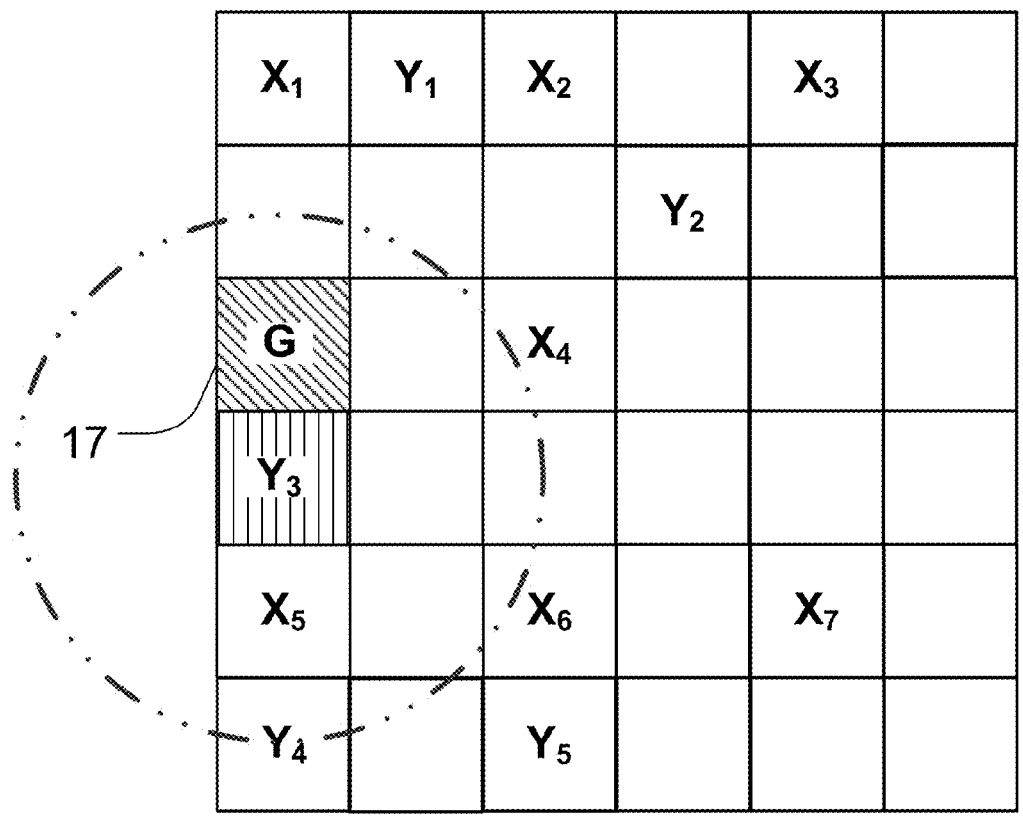

At time $t=t_6$, the message now has been communicated to the gateway controller 17 by way of three different pathways, the message has been propagated to all nodes of the "X" class-based wireless network, and no further communication of the message within the "X" class-based wireless network occurs, as illustrated in FIG. 19.

Notably, when node G (the gateway controller 17) receives the message the following information also may be received: the pathway, including the identification of the originating node and each intermediate node by which the message was communicated; the link quality of each communication link of the pathway; a possible checksum; and priority. In class-based networks, the header of the communication also may include one or more class designations. Other information also may sent with the message and received by node G. Moreover, based on the illustration set forth in FIGS. 14-19, the gateway controller 17 represented by node G receives three (3) communications of the message, and the gateway controller 17 preferably records three times (once for each time the message is received), the respective information communicated with the message. The gateway controller 17 additionally may calculate and record a representative overall link quality for each pathway in association therewith. It will further be noted that the gateway controller 17 will receive and record the link quality for all possible links in the "X" class-based network except the communication link between respective data communication devices of node $X_2$ and node $X_3$; this communication link will not be identified by the gateway controller 17 because no pathway included node $X_3$.

A subset of FIGS. 14-19—namely, FIGS. 17-19—illustrate nondeterministic networking in the "Y" class-based wireless network of FIG. 13. In this case, the sequence of node-to-node communications illustrated takes place following occurrence of a Trigger Event at node $Y_5$.

In particular, because of the occurrence of the Trigger Event at node $Y_5$, a message is originated and communicated from node $Y_5$ for further communication to the gateway controller 17. The sequence of node-to-node communications illustrated here is in accordance with nondeterministic routing and may occur, for example, when nodes $Y_1$ through $Y_5$ have not previously communicated with the gateway controller 17 through the wireless network, i.e., when each node may be "new" to the "Y" class-based wireless network and/or "new" to the wireless network topology thereof shown in FIG. 13.

With particular regard to certain steps in the sequence of communicating the message from node $Y_5$ to the gateway controller 17, FIG. 17 illustrates the wireless network 24 at time $t=t_4$ when a Trigger Event has occurred at node $Y_5$ and a message as been originated at node $Y_5$. At this time the pathway for reaching a gateway controller 17 in the "Y" class-based wireless network is unknown to the data communication device of node $Y_5$. Accordingly, the message is communicated generally to all data communication devices of class "Y" falling within the communications range of node $Y_5$. The message therefore is shown in FIG. 17 being communicated at time $t=t_4$ to neighboring node $Y_4$, which node happens to be within the communications range of node $Y_5$. Indeed, the communications range of node $Y_5$ is graphically illustrated in FIG. 17 by the generally circular outline around node $Y_5$, within which only node $Y_4$ of the "Y" class-based network at least partially lies. The act of communicating the message by node $Y_5$ further is graphically illustrated in FIG. 17 by shading of the square of the grid containing node $Y_5$.

Furthermore, it will be appreciated from the foregoing description that in communicating the message from node $Y_5$ to node $Y_4$, a communication link first was established between these two nodes. In establishing the communication link, preferably each node is identified to the other node, whereby the originating node will come to learn the neighboring node that falls within its communications range (at least at that time). Furthermore, node $Y_4$—an intermediate node—will come to learn from which node the message is received for forwarding to a gateway controller 17. In establishing the communication link and in communicating the message, information regarding the quality of the link also is monitored and recorded.

At time $t=t_5$, the message is shown in FIG. 18 being communicated by node $Y_4$ to neighboring nodes $Y_3$, $Y_5$, which nodes happen to be within the communications range of node $Y_4$ in the "Y" class-based wireless network. Again, because node $Y_4$ does not know a pathway to the gateway controller 17, node $Y_4$ proceeds to communicate the message generally to all nodes of the "Y" class-based network within its communications range following the same protocol as originating node $Y_5$. The communications range of node $Y_4$ is graphically illustrated in FIG. 18 by the generally circular outline around node $Y_4$, within which only nodes $Y_3$, $Y_5$ each at least partially lies. The act of communicating the message by node $Y_4$ further is graphically illustrated in FIG. 18 by shading of the square of the grid containing node $Y_4$.

At time $t=t_6$, the message is shown in FIG. 19 being communicated by node $Y_3$ in propagation of the message. The act of communicating the message by node $Y_3$ is graphically illustrated by shading of the square of the grid containing node $Y_3$. Furthermore, it should be noted that node $Y_5$, which received the communication from node $Y_4$, does not communicate the message a second time.

Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $Y_5$ is not illustrated in FIG. 19 as communicating the message again. Only node $Y_3$, which has not yet communicated the message, is shown in FIG. 19 as communicating the message.

As further shown in FIG. 19, node G at least partially lies within the communications range of node $Y_3$. Receipt of the communication containing the message by node G at time $t=t_6$ is emphasized in FIG. 19 by shading of the square of the grid containing node G.

Moreover, because node G was the only node of the "Y" class-based network within the communication range of node $Y_3$, no further communication of the message within the "Y" class-based wireless network occurs.

When node G (the gateway controller 17) receives the message the following information also may be received: the pathway, including the identification of the originating node and each intermediate node by which the message was communicated; the link quality of each communication link of the pathway; a possible checksum; and priority. In class-based networks, the header of the communication also may include one or more class designations. Other information also may sent with the message and received by node G. Moreover, based on the illustration set forth in FIGS. 17-19, the gateway controller 17 represented by node G receives three (3) communications of the message, and the gateway controller 17 preferably records three times (once for each time the message is received), the respective information communicated with the message. The gateway controller 17 additionally may calculate and record a representative overall link quality for each pathway in association therewith.

Use of Acknowledgments in the Second Exemplary Illustration

Upon the successful receipt of a message by the gateway controller 17, the gateway controller 17 preferably sends to the originating node of the message an ACK to acknowledge the successful receipt of the message. Preferably, only one ACK is sent for each particular message, regardless of the number of times that the particular message is received by the gateway controller 17 via different pathways.

In sending the ACK, the gateway controller 17 preferably selects a known pathway based on information that is received with the message or that has been received in conjunction with previous messages or other intelligence that is known about the network topology. Selection of the particular pathway is made in accordance with one of the disclosed algorithms or in accordance with some other algorithm, as desired. If an ACK is not received from the gateway controller 17 by the originating node, then the originating node will save the message in memory for communication at a later time when communication with the gateway controller 17 is available.

Similarly, the receipt of a message representing a command or inquiry that is sent by a gateway controller 17 to a destination node preferably is acknowledged by an ACK being sent to the gateway controller 17 from the destination node. The message may be sent via a known pathway, or, if the pathway is outdated or otherwise unknown, then the message is sent in accordance with the nondeterministic routing method of the present invention. In particular, the message is communicated in the wireless network in which the destination node is expected. The message then propagates through the nodes of that wireless network and, when the destination node receives the message, the ACK is communicated by the destination node to the gateway controller 17. Moreover, like the gateway controller 17 in the implementation illustrated in FIGS. 13-19, the node in this case will have sufficient information upon receipt of the message to select the "best" pathway for communicating the ACK back to the gateway controller 17. If an ACK is not received by the gateway controller 17, then the gateway controller 17 can store or cache the message for later communication, or the gateway controller 17 can communicate the message to one or more other suspected wireless networks in which the data communication device of the destination node (the actual recipient of the message) may be found.

In accordance with preferred implementations, the successful receipt of an ACK is not acknowledged in order to avoid a recurring chain of communications.

Figure 20:
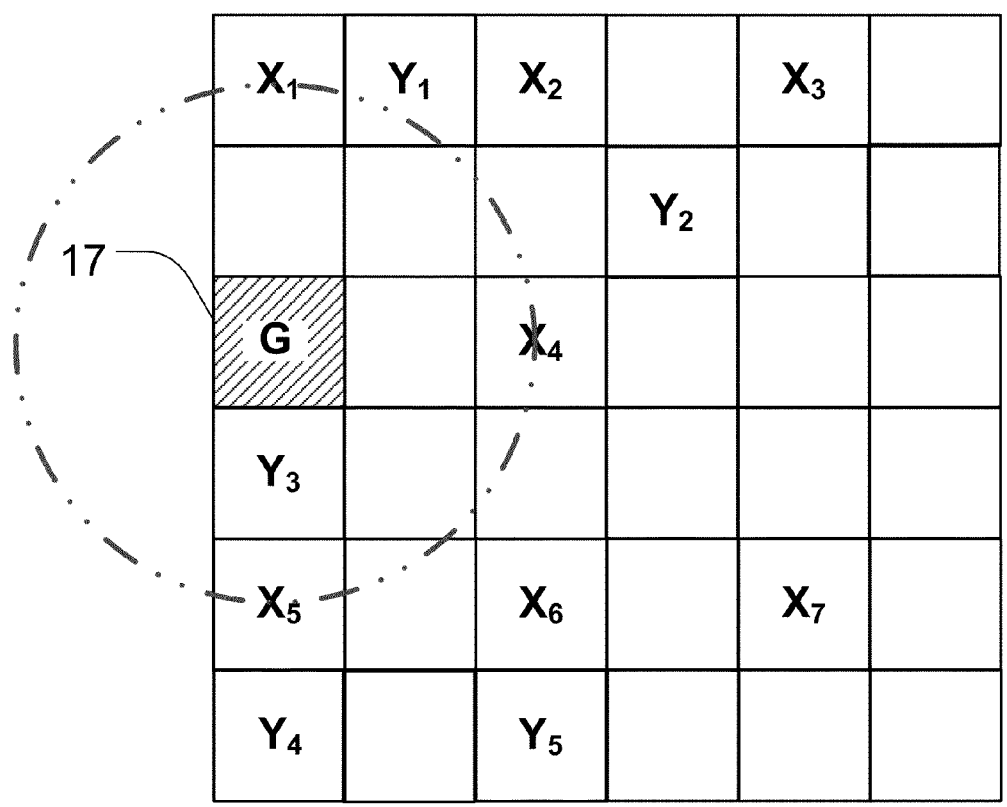
Figure 22:
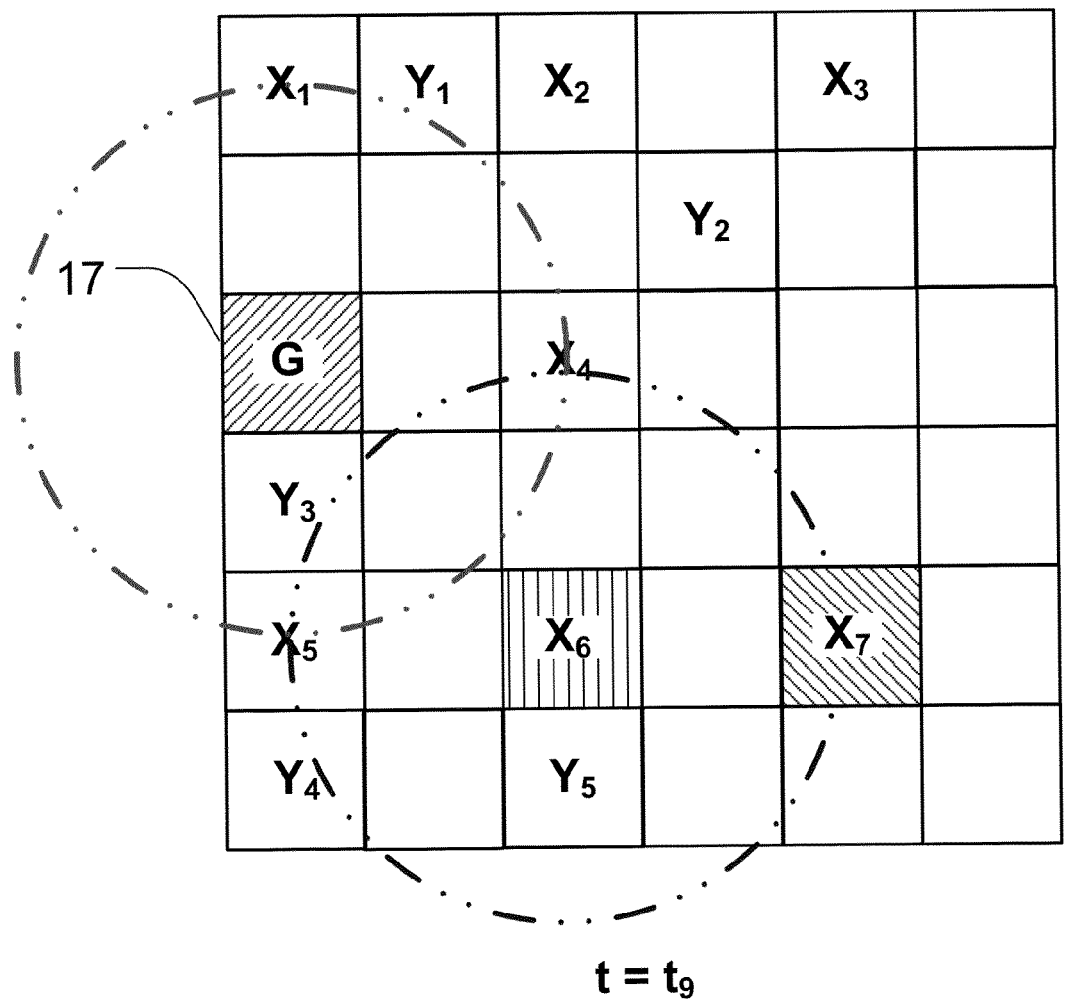
Figure 24:
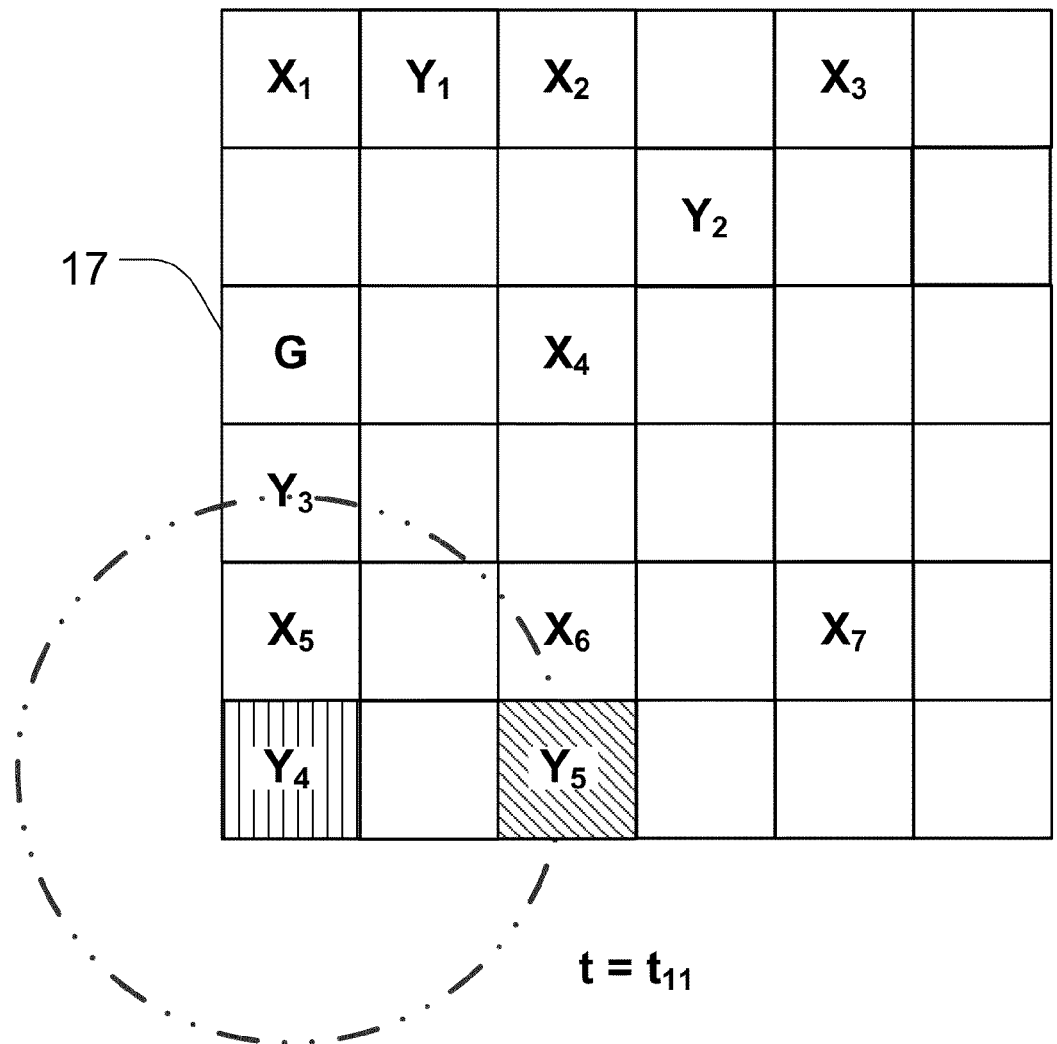

FIGS. 20-22 illustrate communication of an ACK from the gateway controller 17 to originating node $X_7$ of FIG. 14 along a deterministic route, and FIGS. 22-24 illustrate communication of an ACK from the gateway controller 17 to originating node $Y_5$ of FIG. 17 along a deterministic route. The deterministic route in each class-based wireless network is readily based on the information obtained from the nondeterministic routing illustration of FIGS. 14-19 and the information that is acquired by the gateway controller 17 in conjunction with the receipt of the message. Additionally, as will be appreciated, the information also may permit the gateway controller 17 to send a command or inquiry to any intermediate node via a deterministic route.

Search for Specific Node

Using all Available Resources of the Plurality of Wireless Data Communication Devices One of many advantages of the present invention utilized in class-based wireless networks is the ability to send communications via data communication devices of a particular class-based network without consuming power resources of data communication devices of one or more other class-based networks. This is particularly beneficial if two different class-based networks having nodes within communication range of each other are owned or operated by or on the behalf of separate legal entities.

Nevertheless, it also is beneficial to be able to utilize all nodes within communications range of another node regardless of particular classes of the nodes. For example, an urgent need may arise to communicate with a particular mobile data communication device that may be out of range of a node of a class with which that data communication device is associated, but nevertheless within range of a node of a different class-based wireless network.

An example of this scenario is illustrated in FIGS. 25-30 where node $Y_2$ is within communications range of nodes of the "X" class-based wireless network, but out of communications range of all other nodes of the "Y" class-based wireless network. If the gateway controller 17 has reason to suspect that the data communication device associated with node $Y_2$ is within the overall wireless network of FIG. 13, then the gateway controller 17 may send a communication to node $Y_2$ via nondeterministic routing utilizing the plurality 24 of data communication devices. In this case, an overall class-based wireless network is identified by the class "A", and each of the plurality 24 of data communication devices are additionally assigned class "A" and represent members of that class in addition to their respective X or Y class memberships (note: classes do not have to be mutually exclusive and a single data communication device can enjoy membership in multiple classes).

Figure 25:
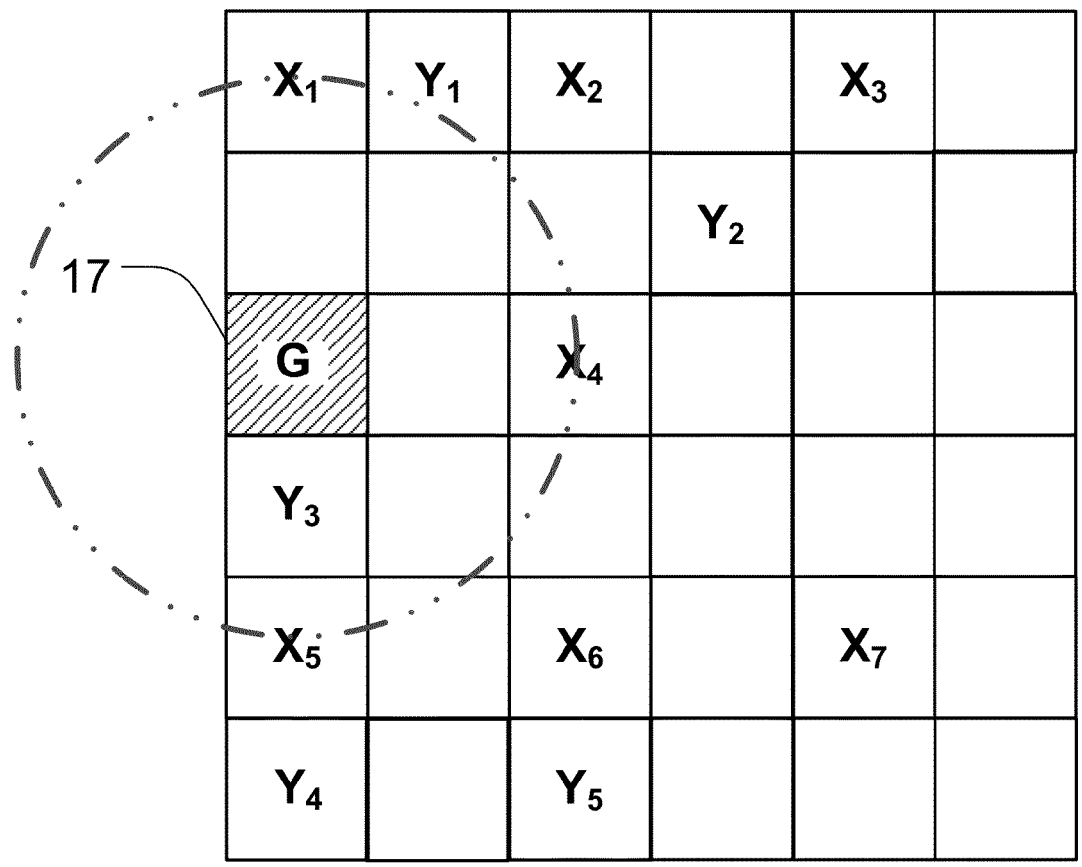

The gateway controller 17 thus sends a communication destined for receipt by node $Y_2$ to the "A" class-based network of which each of the plurality 24 of data communication devices are members. Transmission of this message by node G at time $t=t_{12}$ is illustrated in FIG. 25. Nodes $X_1, X_4, X_5, Y_3$ all are within the communications range of node G and, therefore, receive the message. Because each of these nodes $X_1, X_4, X_5, Y_3$ are members of the "A" class-based network, each node $X_1, X_4, X_5, Y_3$ (i.e., data communication device thereof) will receive the message and transmit the message intended for receipt by $Y_2$.

Figure 26:
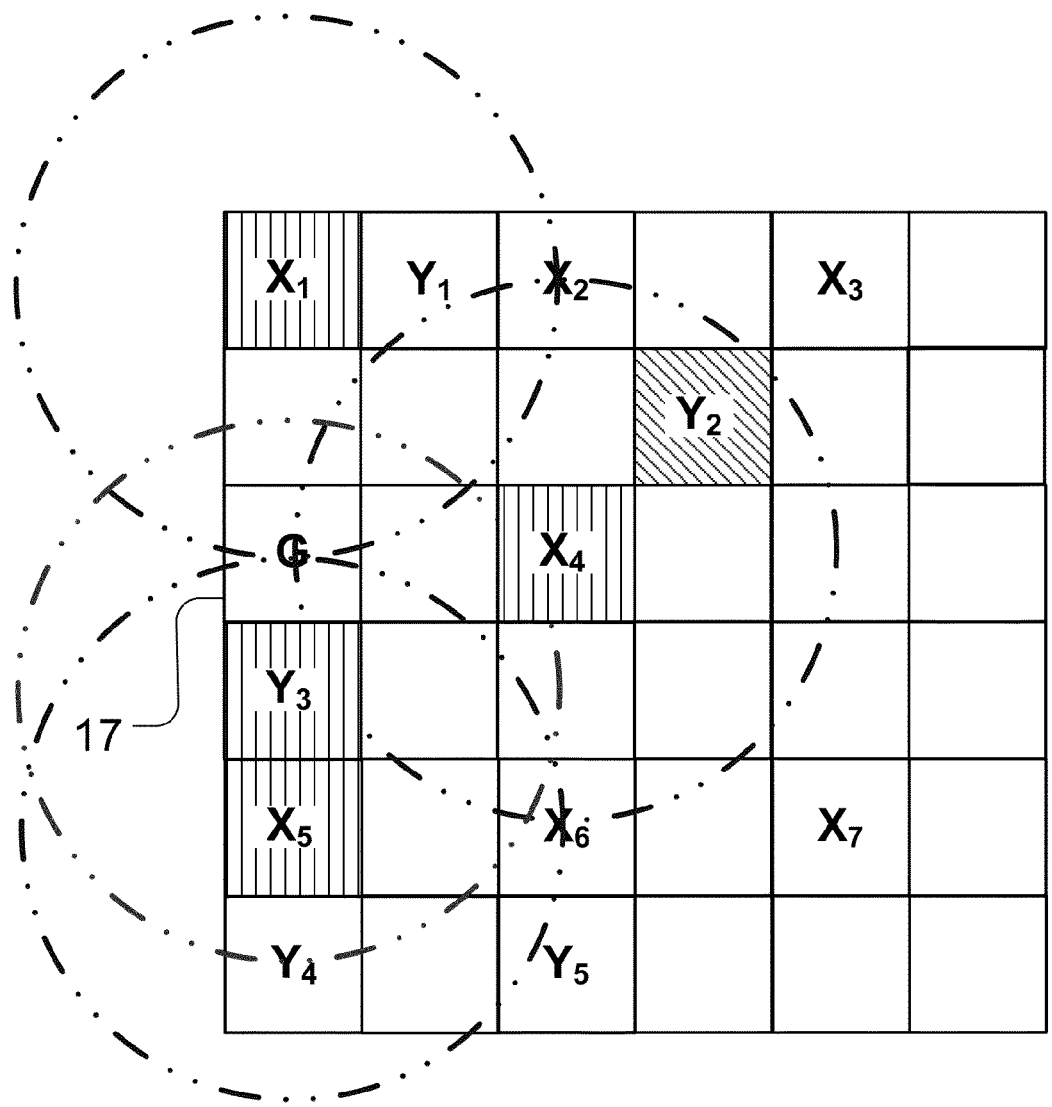

Assuming that none of the nodes $X_1, X_4, X_5, Y_3$ have information identifying a deterministic pathway to node $Y_2$, each preferably will transmit the message generally to all nodes of class "A" within its respective communications range for propagation of the message. This retransmission of the message by nodes $X_1, X_4, X_5, Y_3$ is illustrated in FIG. 26 at time $t=t_{13}$. On the other hand, if a node $X_1, X_4, X_5, Y_3$ has information identifying a deterministic pathway to node $Y_2$, then that node preferably will transmit the message to node $Y_2$ via such deterministic network pathway.

Figure 27:
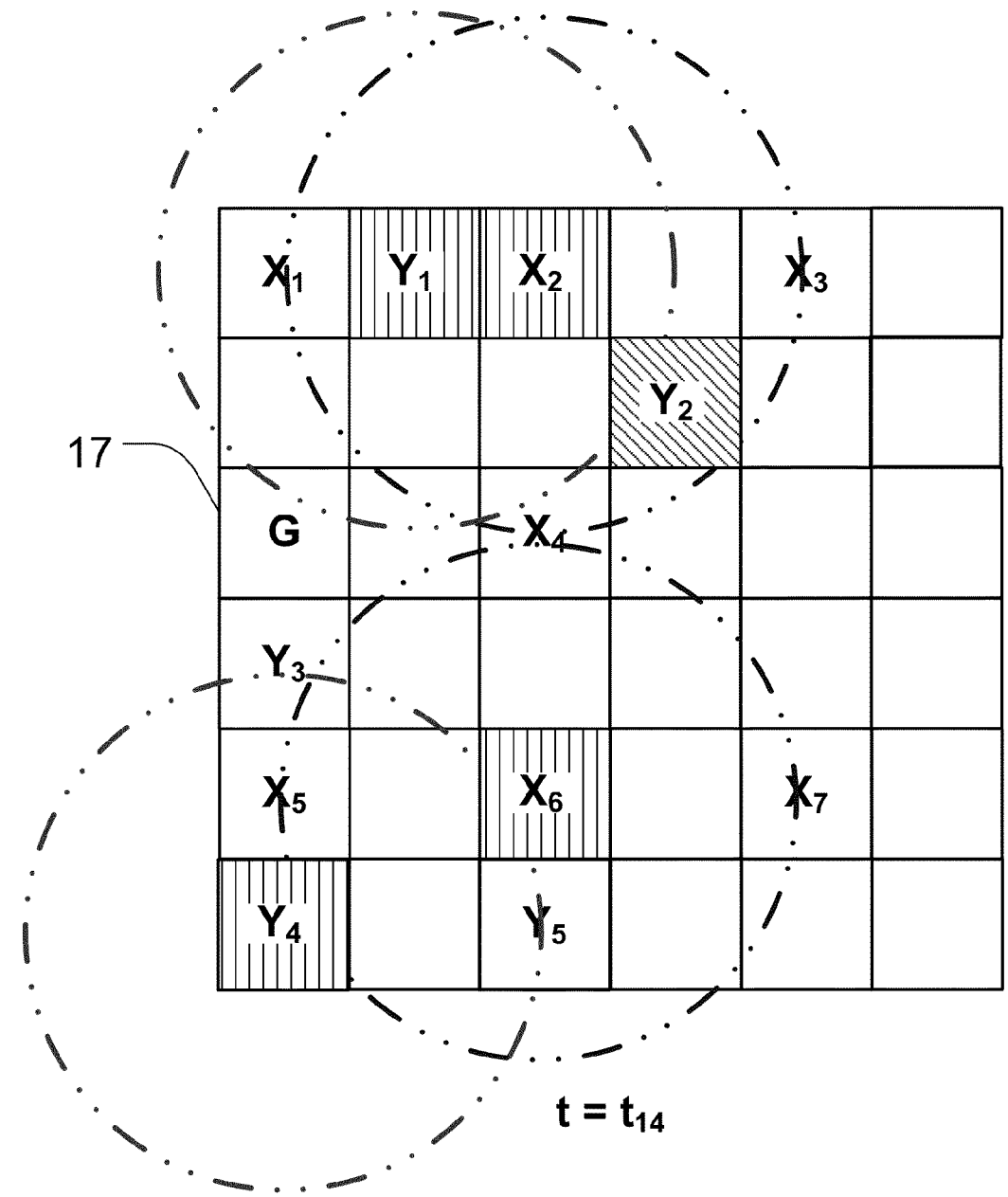
Figure 28:
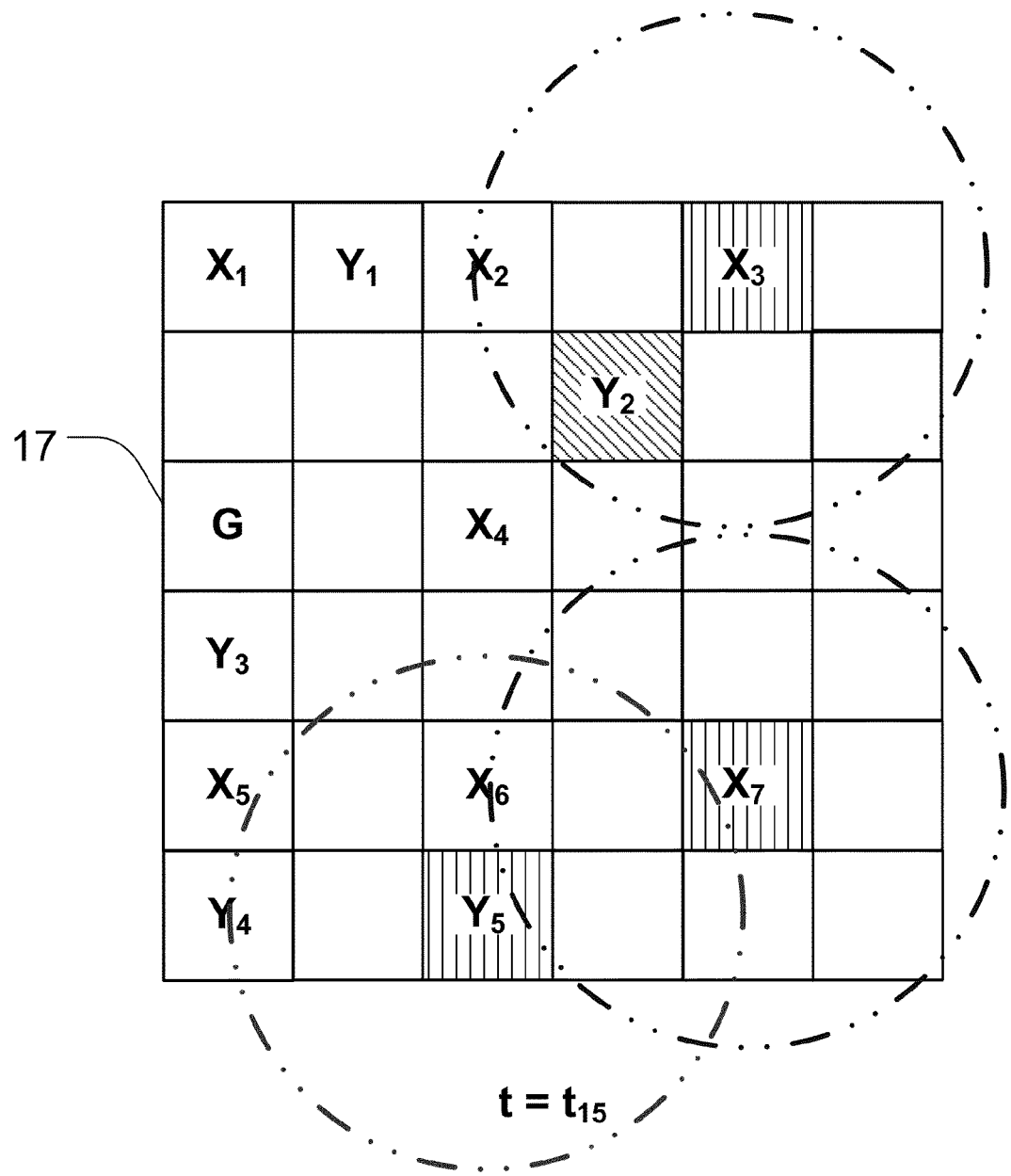

As shown in FIG. 26, node $Y_2$ is within communications range of node $X_4$ and first receives the message from the gateway controller 17 via intermediate node $X_4$. As the message continues to propagate, node $Y_2$ also receives the message from the gateway controller 17 via intermediate node $X_2$ as shown in FIG. 27 at time $t=t_{14}$; and receives the message from the gateway controller 17 via intermediate node $X_3$ as shown in FIG. 28 at time $t=t_{15}$. The data communication device of node $Y_2$ acknowledges receipt of the message from the gateway controller 17 by sending an ACK to the gateway controller 17, as illustrated in FIGS. 29-30.

Moreover, as will be appreciated, the message has been received three times and, hence, several pathways to the gateway controller 17 and information regarding those pathways are known to the data communication device of node $Y_2$. This information may be recorded for future use by the data communication device of node $Y_2$ just as is done by the gateway controller 17.

Accordingly, a deterministic route is chosen based on an appropriate algorithm for sending the ACK to the gateway controller 17. The appropriate algorithm may take into account factors such as, for example, the number of intermediate nodes of the pathway, the link quality of the various communication links of the pathway, the overall link quality of the pathway, the number of "Y" class-based network nodes of the pathway, and the number of non "Y" class-based network nodes of the pathway.

Figure 29:
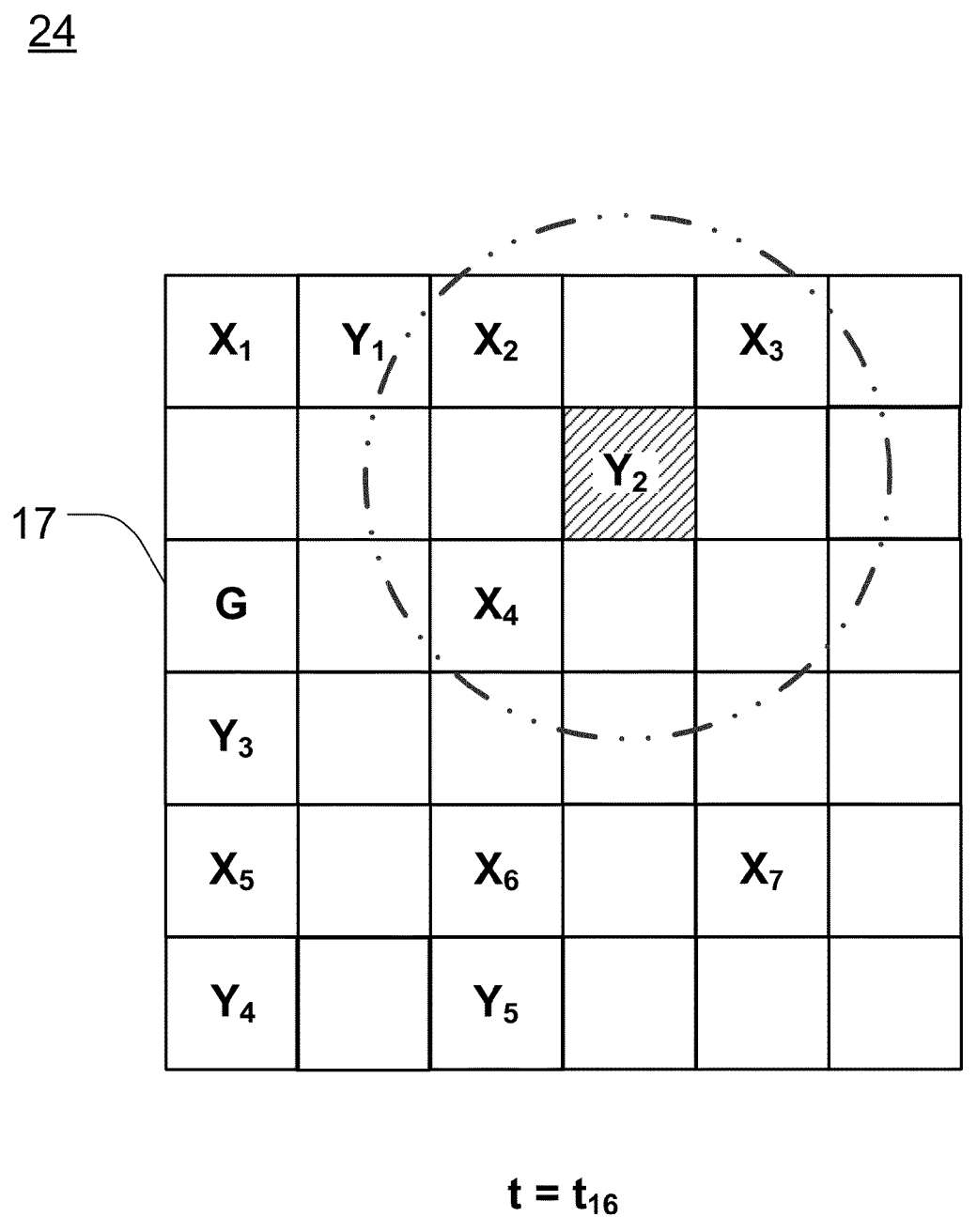
Figure 30:
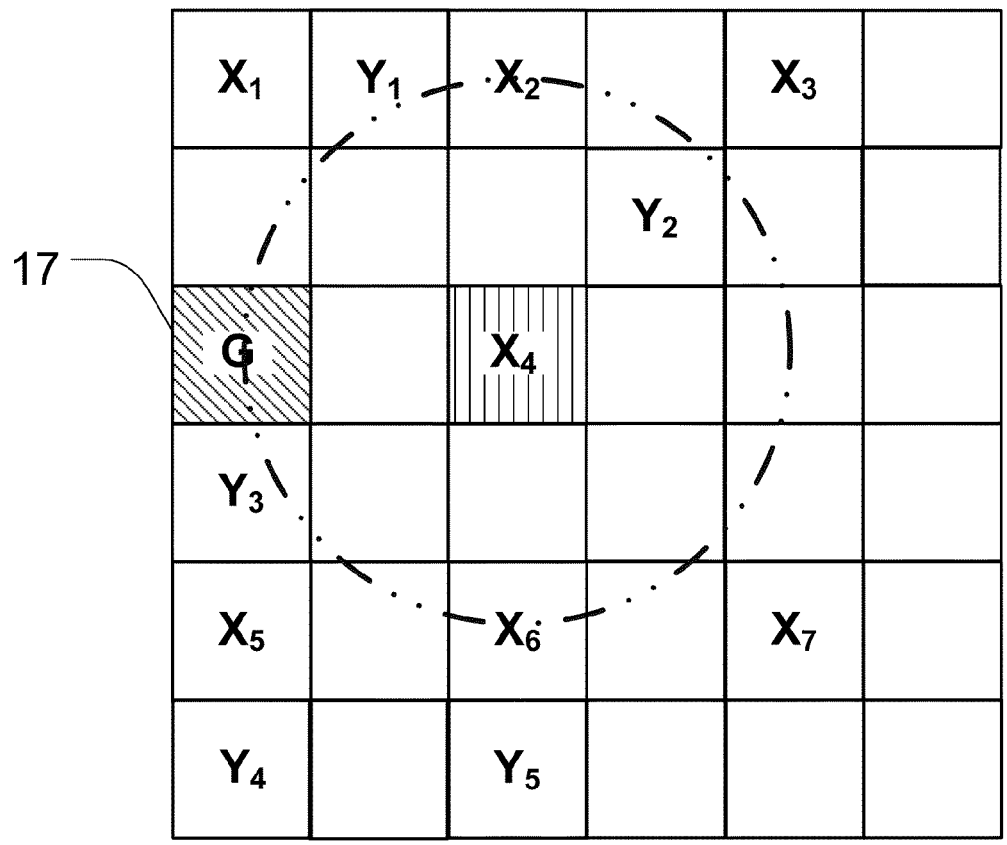

In this example, node $Y_2$ transmits a message representing the ACK to the gateway controller 17 by transmitting the message to node $X_4$ as shown in FIG. 29 at time $t=t_{16}$ and, in turn, node $X_4$ transmits the message representing the ACK to the node G as shown in FIG. 30 at time $t=t_{17}$. Node G further is shown as receiving this message in FIG. 30. It also should be noted that the ACK is transmitted in this case to an "X" class-based network node because node $Y_2$ otherwise would be out of communications range with the gateway controller 17 via node G and, therefore, unable to transmit the ACK successfully to the gateway controller 17 via node G.

Use of Network Watermarks in the Context of the Second Exemplary Illustration

In accordance with the present invention, and with respect to this second illustration, communications among the nodes of the plurality of nodes 24 preferably include network watermarks, as now described below.

As noted hereinabove, when a gateway controller receives a message, a header of the message preferably includes the pathway history by which the message has been communicated, e.g. an identification of the originating node and each intermediate node by which the message was communicated. Alternatively or additionally, the header includes one or more class designations, e.g. a class designation corresponding to the originating node and each intermediate node by which the message was communicated. In such an implementation, each node includes rules configured to effect appending of a class designation to a message that it forwards. These class designations then together form a network watermark.

The example of FIGS. 14-19 illustrates the use of multiple class designations to form an "X" class-based wireless network and a "Y" class-based wireless network. As described hereinabove, the data communication device of each node maintains reference to its membership in one or more classes through a class table stored at that node. The class table can be referenced when a class-based message is received by a data communication device of the node to determine whether the message is applicable to the data communication device. The message is received and processed if directed to a class of which the data communication device is a member, else the message is not received and processed. Class tables also are helpful to reference when attempting to send a message. In this respect, a class table may include not only identification of the classes of which a data communication device is a member, but also the identification of other classes with which the data communication device may need to communicate under certain scenarios.

As each node may include one or more class designations in its class table, different class rules for modifying, or appending information to, received messages may be provided. The following example illustrates "X" and "Y" class-based networks, where class rules corresponding to class "X" specify appending of a class designation together with an identification of the node, and class rules corresponding to class "Y" specify appending of a class designation.

FIGS. 14-19 illustrate the "X" class-based wireless network of FIG. 13 in which the sequence of node-to-node communications takes place following occurrence of a Trigger Event at node $X_7$. Because of the occurrence of the Trigger Event, a message is originated and communicated from node $X_7$ for further communication to the gateway controller 17.

FIG. 14 illustrates the wireless network 24 at time $t=t_1$ when a Trigger Event has occurred at node $X_7$ and a message has been originated at node $X_7$. At this time, the message is communicated generally to all data communication devices of class "X" falling within the communications range of node $X_7$. The message therefore is shown in FIG. 14 being communicated at time $t=t_1$ to neighboring node $X_6$, which node happens to be within the communications range of node $X_7$. Prior to, or in, communicating the message, an identification of the communicating node, i.e. $X_6$, as well as an identification of the class used for the communication, e.g. "X", is appended to the message.

In communicating the message from node $X_7$ to node $X_6$, a communication link first is established between these two nodes. In establishing the communication link, preferably each node is identified to the other node in the communication link, and the class designation of each node (or a class designation or network watermark included in the message as described hereinbelow) is validated based on each node's rules. In establishing the communication link and in communicating the message, information regarding the link also may be monitored and recorded. This is the same for communications between any of the nodes further described below.

At time $t=t_2$, the message is shown in FIG. 15 being communicated by node $X_6$ to neighboring nodes $X_4$, $X_5$, $X_7$, which nodes happen to be within the communications range of node $X_6$. This message includes the identification of the of the originating node and the identification of the class used for the communication from the originating node which were appended to the message. Prior to, or in, communicating the message, an identification of the communicating node, i.e. $X_6$, and an identification of the class used for the communication, e.g. "X", are appended to the message.

At time $t=t_3$, the message is shown in FIG. 16 being communicated by each of nodes $X_4$, $X_5$ to respective neighboring nodes that happen to be within communications range. This message includes the appended identification of each previous communicating node along the path as well as the appended identification of the class used for each previous communication of the message. Prior to, or in, communicating the message, an identification of each respective communicating node and an identification of the class used for each respective communication is appended to the message. Thus, the message as communicated by node $X_4$ includes an identification of node $X_4$, while the message as communicated by node $X_5$ includes an identification of node $X_5$.

At time $t=t_4$, the message is shown in FIG. 17 being communicated by node $X_2$ to neighboring nodes $X_1$, $X_3$, $X_4$, which nodes happen to be within the communications range of node $X_2$. This message includes the appended identification of each previous communicating node along the path as well as the appended identification of the class used for each previous communication of the message. Prior to, or in, communicating the message, an identification of the communicating node, i.e. $X_2$, and an identification of the class used for the communication, e.g. "X", is appended to the message.

At time $t=t_5$, the message is shown in FIG. 18 being communicated by each of nodes $X_1$, $X_3$ to respective neighboring nodes that happen to be within communications range. This message includes the identification of the of the class used for each previous communication of the message. Prior to, or in, communicating the message, an identification of each respective communicating node and an identification of the class used for each respective communication is appended to the message. Thus, the message as communicated by node $X_1$ includes an identification of node $X_1$, while the message as communicated by node $X_3$ includes an identification of node $X_3$.

At time $t=t_6$, the message now has been communicated to the gateway controller 17 by way of three different pathways, and no further communication of the message within the "X" class-based wireless network occurs, as illustrated in FIG. 19. The message received at the gateway controller via each of the three pathways includes a pathway history for that pathway. As described, each pathway history includes an identification of each node along the path, as well as a class designation used in communicating that message from that node pathway. It will be appreciated that, alternatively or additionally, a class designation used in receiving a message at a particular node, or a class designation of a message itself, or some other class designation, could be utilized in the pathway history.

Such pathway histories can be characterized as network watermarks. These watermarks can be utilized by the gateway controller in a variety of ways. For example, these watermarks may be compared to network information stored at the gateway controller to attempt to confirm that each node through which the message passed represents a "trusted" node, or that the path itself corresponds to a stored "trusted" path. More specifically, the gateway controller may check that communication along the pathway only utilized one or more specified classes, such as, for example class "X". Alternatively, these watermarks may be stored at the gateway controller, or communicated elsewhere for storage, for later analysis.

A subset of FIGS. 14-19—namely, FIGS. 17-19—illustrate nondeterministic networking in the "Y" class-based wireless network of FIG. 13. In this case, the sequence of node-to-node communications illustrated takes place following occurrence of a Trigger Event at node $Y_5$.

In particular, because of the occurrence of the Trigger Event at node $Y_5$, a message is originated and communicated from node $Y_5$ for further communication to the gateway controller 17.

FIG. 17 illustrates the wireless network 24 at time $t=t_4$ when a Trigger Event has occurred at node $Y_5$ and a message has been originated at node $Y_5$. At this time, the message is communicated generally to all data communication devices of class "Y" falling within the communications range of node $Y_5$. The message therefore is shown in FIG. 17 being communicated at time $t=t_4$ to neighboring node $Y_4$, which node happens to be within the communications range of node $Y_5$. Prior to, or in, communicating the message, an identification of the class used for the communication, e.g. "Y", is appended to the message.

At time $t=t_5$, the message is shown in FIG. 18 being communicated by node $Y_4$ to neighboring nodes $Y_3$, $Y_5$, which nodes happen to be within the communications range of node $Y_4$ in the "Y" class-based wireless network. This message includes the identification of the of the class used for the communication from the originating node which was appended to the message. Prior to, or in, communicating the message, an identification of the class used for the communication, e.g. "Y", is appended to the message.

At time $t=t_6$, the message has now been communicated to node G, i.e. gateway controller 17.

The message received at the gateway controller includes a pathway history. As described, each pathway history includes an identification of each class designation used in communicating that message along a respective pathway.

This pathway history can be characterized as a network watermark. This watermark can be utilized by the gateway controller in a variety of ways. For example, this watermark may be compared to network information stored at the gateway controller to attempt to confirm that each node through which the message passed represents a "trusted" node, e.g. a node of one or more selected classes, or that the path itself corresponds to a stored "trusted" path, e.g. that the sequence of stored class designations corresponds to one or more selected sequences or is in accordance with one or more path requirements.

For example, the gateway controller may check that communication along the pathway only utilized one or more specified classes, such as, for example, only utilized class "Y", class "Z", or class "A", and may further check that class "Z" was not utilized immediately before or after class "A". Alternatively, these watermarks may be stored at the gateway controller, or communicated elsewhere for storage, for later analysis.

Such watermark validation, however, need not occur exclusively at a gateway controller, i.e. at a destination. For example, in implementations in which each node along a path appends a class designation to a message, a node receiving that message can, rather than just examining the class of the immediately preceding node, examine each class designation that has been appended to the message, i.e. a pathway history of that message. As these class designations can be characterized as collectively forming a network watermark, such implementations can be characterized as providing for analysis and validation of a network watermark at each node along a path, rather than simply at a destination. Such analysis and validation is preferably implemented via rules located at each node. Thus, in a preferred implementation, nodes includes rules for both appending a class designation to a message as it is forwarded, and to validate a network watermark comprising class designations appended by each preceding node along the path.

Sleep/Standby Functionality & Low-Power Wake-Up Transceivers

In order to lessen power consumption, especially in mobile settings in which each data communication device constituting a node is self-powered by a mobile power supply, each mobile data communication device preferably includes the capability of powering down to a standby or sleep state, in which power is consumed at a substantially lower rate than when the data communication device is in a fully active state. In particular, the radio of the data communication device of the node preferably includes this capability to go into a standby or sleep mode. In such a mode, a standards based radio even may be turned completely off to be later awakened by a passive or semi-passive receiver or a lower-power transceiver of the data communication device designed for such purpose.

If mobile data communication devices and, in particular, radios thereof, include a standby or sleep capability, then each such radio further preferably includes the capability of being awakened in response to a communication from another data communication device of another node of the wireless network. Moreover, such a radio of a node preferably includes the ability to be selectively awakened—or powered up—out of a population of similar radios of data communication devices of nearby nodes. In this respect, implementations may include the ability to power down and be selectively powered up in accordance with any of the wake-up technologies set forth in USPA Publ. 2005/0093703 A1 and USPA Publ. 2006/0287008 A1, each of which is incorporated herein by reference. A preferred implementation includes use of low power wake-up transceivers, which are now described in greater detail with reference to FIGS. 31-38.

Accordingly, in one or more preferred embodiments, each node of a wireless, class-based ad hoc network includes, as a WU Component thereof, a wake-up transceiver as disclosed above, and as described in greater detail below.

Figure 31:
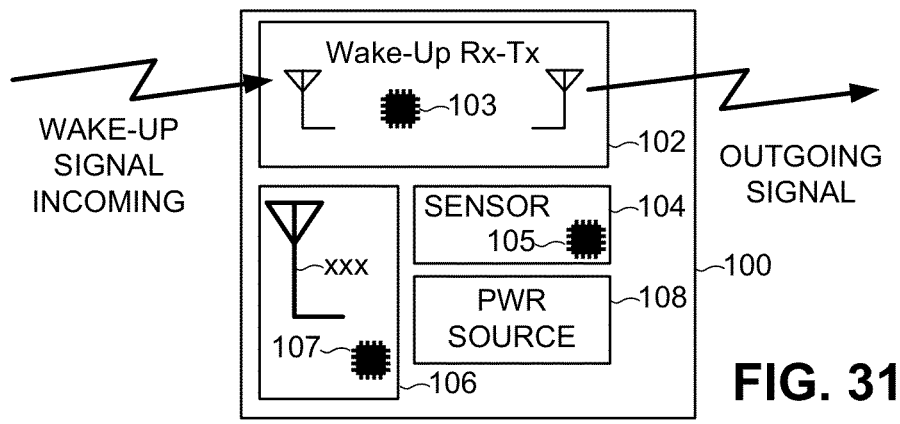
FIG. 31 is a diagram of a remote sensor interface (RSI).

In this regard, an exemplary node in the form of a remote sensor interface (RSI) 100 is diagrammatically shown in FIG. 31 to include: a Wake-Up Transceiver 102 that includes components for transmitting as well as receiving wireless signals (a "Wake-Up Rx-Tx"); a sensor interface 104 for acquiring data from one or more sensors associated with the RSI 100; a standards-based radio 106 for two-way wireless communications for exchanging data with one or more other RSIs and/or one or more gateways; and, an electrical power source 108, such as a battery.

In order to reduce unnecessary power consumption, the standards-based radio 106, which has a relatively high power consumption rate when active, is generally dormant until awakened. The Wake-Up Transceiver 102, which has a relatively low power consumption rate compared to that of the standards-based radio 106, generally remains active for detecting incoming wireless wake-up signals. Upon receipt of a wake-up signal addressed to the RSI 100, the Wake-Up Transceiver 102 generally wakes-up the standards-based radio 106 for receiving and transmitting data via the standards-based radio 106. Those components of the RSI that consume relatively high amounts of power thereby are generally active only when needed.

The Wake-up Transceiver 102 includes components for receiving wireless wake-up signals, which components are generally referred to herein as a "Wake-Up Receiver" or "Wake-Up Rx." The Wake-Up Receiver is generally similar to the "WT Component" described in detail, for example, in incorporated International Patent Application Publication No. WO 03/098851 A1 (and which international application entered the U.S. national phase and published as U.S. Patent Application Publication No. US 2005/0215280, also incorporated herein by reference). The Wake-Up Receiver moreover has been occasionally referred to as a "tag turn-on circuit" or "TTOC." The process for determining whether to wake-up the standards-based radio of the RSI furthermore may include a number of steps that are performed in a particular sequence, especially if the RSI 100 is disposed in a noisy radio-frequency (RF) environment. For example, such a wake-up sequence is described in U.S. Patent Application Publication No. US 2006/0276161, which is incorporated herein by reference.

In addition to the Wake-Up Receiver, and in accordance with the present invention, the Wake-Up Transceiver 102 additionally includes components for transmitting wireless signals, which components are generally referred to herein as a "Wake-Up Transmitter" or "Wake-Up Tx". The Wake-Up Transmitter occasionally has been referred to as a "tae turn-on" or "TTO", and the Wake-Up Transmitter is capable of sending signals to Wake-Up Receivers, TTOCs, or the like, for wake-up of RSIs and/or gateways.

In the embodiment of the RSI 100 diagrammatically shown in FIG. 31, the Wake-Up Transceiver 102 includes a microprocessor 103, the sensor interface 104 includes a microprocessor 105, and the standards-based radio 106 includes a microprocessor 107. Nonetheless, in other embodiments of the RSI 100, these components share a single microprocessor. Indeed, these components can be controlled by any number of microprocessors. Alternatively, microcontrollers or application specific integrated circuits (ASICs) may be used.

Figures 37, 38:
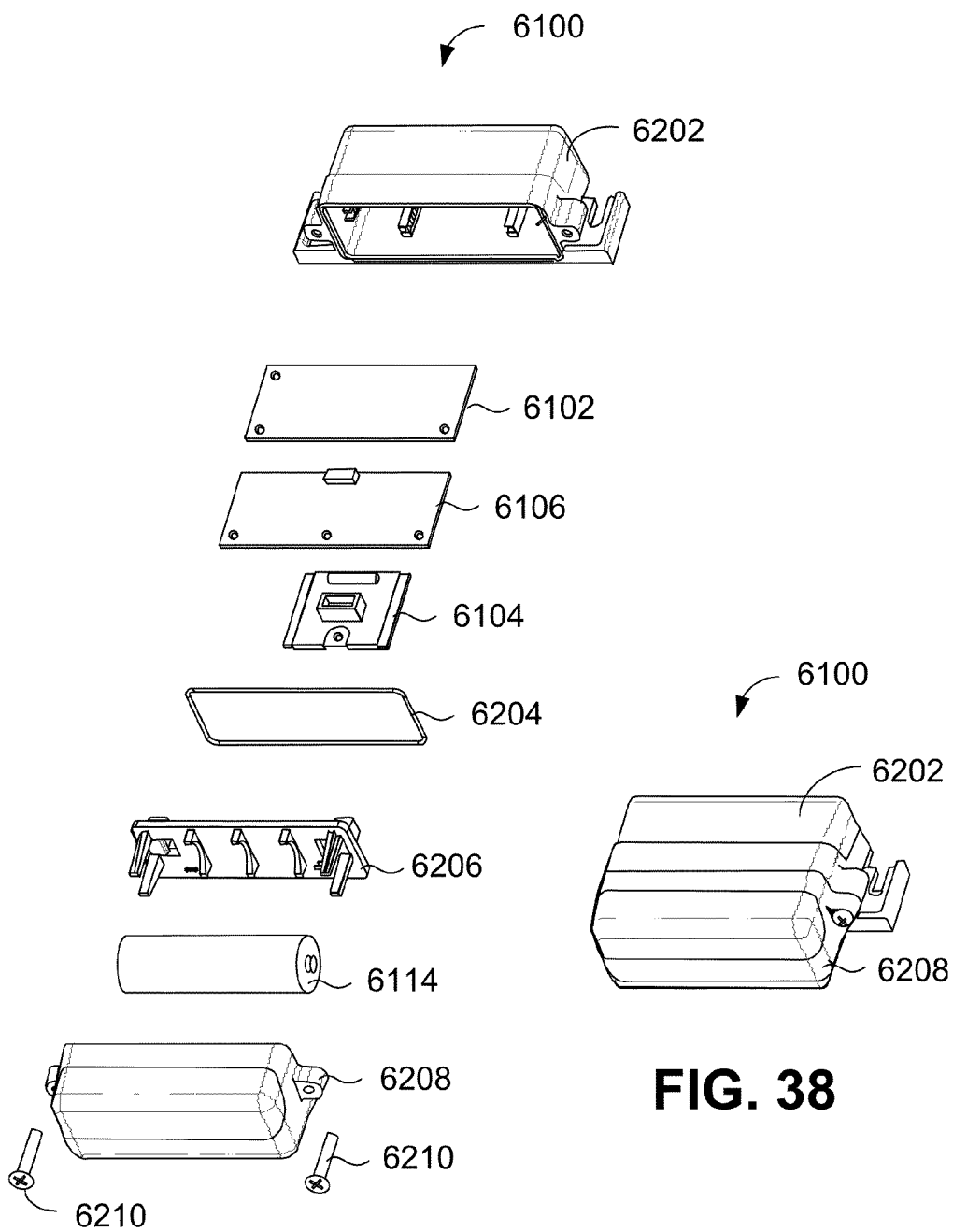
FIG. 37 is an exploded perspective view of an RSI of FIG. 31 having the Wake-Up Transceiver of FIG. 32.
FIG. 38 is an assembled perspective view of the RSI of FIG. 37.

Also, as generally illustrated and discussed herein, the Wake-Up Transceiver 102, sensor interface 104 and standards-based radio 106 comprise respective electronic circuits on respective printed circuit assembly (PCA) cards, for example, as shown in FIG. 37 (see components 6102, 6104, and 6106). Nonetheless, in some embodiments, these components are integral to a single PCA card. Indeed, these components can be arranged on any number of PCA cards. Moreover, these components can be arranged on any other physical structures without regard to PCA cards. For example, these components could be arranged on a PCMCIA (PC) Card.

Furthermore, the Wake-Up Transceiver 102, sensor interface 104 and standards-based radio 106 are each integral to a respective printed circuit board ("PCB") according to the illustrated embodiment of the RSI 100. Nonetheless, these components are constructed on or as other circuit substrates in other embodiments. For example, in one embodiment, the Wake-Up Transceiver is miniaturized by utilizing an ASIC programmed to provide transceiver circuit functions. In another embodiment, the Wake-Up Transceiver includes a standard cell, that is, a semiconductor substrate having hard printed circuits thereon to provide transceiver circuit functions.

Thus, without limiting the scope of the descriptions herein, and in order to provide an understanding of at least one embodiment, a preferred embodiment is discussed herein with regard to the Wake-Up Transceiver, sensor interface and standards-based radio each comprising respective electronic circuits and microprocessors on respective PCA cards that are separately received by a protective housing, for example, the first housing 6202 of FIG. 37.

Figure 32:
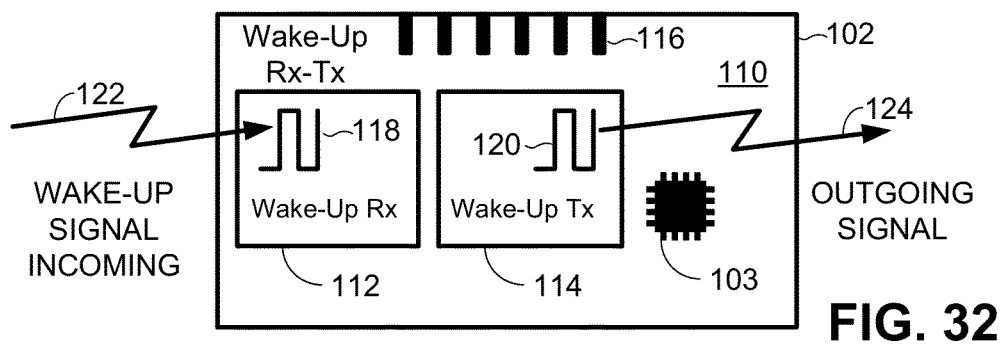
FIG. 32 is a diagram of a "Wake-Up Transceiver".

Turning now to FIG. 32, a preferred embodiment of the Wake-Up Transceiver 102 is shown as a PCA card that includes, on a single PCB 110, a low-power RF receiver, namely the Wake-Up Receiver 112 (Wake-Up Rx), a low-power RF transmitter, namely the Wake-Up Transmitter 114 (Wake-Up Tx), and a microprocessor 103. The Wake-Up Receiver 112 includes RF analog receiver circuitry. Similarly, the Wake-Up Transmitter 114 includes RF analog transmitter circuitry. A number of electrical contacts 116 for abutting corresponding electrical contacts within a housing of the RSI are provided for conducting electrical power to the Wake-Up Transceiver 102 and for conveying electronic signals between the transceiver and other electronic components of the RSI. In this embodiment, the Wake-Up Receiver 112 includes a low-power receiver and an etched antenna 118 on the PCB 110; and, the Wake-Up Transmitter 114 includes a low-power transmitter and another etched antenna 120 on the same PCB 110.

As additionally shown in FIG. 32, the Wake-Up Transceiver 102 is at least capable of: receiving an incoming wake-up signal 122 via the Wake-Up Receiver 112; and, transmitting an outgoing signal 124 via the Wake-Up Transmitter 114. In certain preferred embodiments, a wake-up signal received by the Wake-Up Receiver 112 is relayed or retransmitted by the Wake-Up Transmitter 114 as the outgoing signal 124. In other embodiments, the outgoing signal transmitted by the Wake-Up Transmitter 114 originates from the RSI 100 (FIG. 31).

The Wake-Up Transceiver 102 preferably operates as an RF device in the industrial, scientific, and medical (ISM) band. Operation in the 2.4 Gigahertz (GHz) range is of particular value in global distribution and utilization of transceivers in avoiding violating varying restrictions and regulations worldwide.

Figure 35:
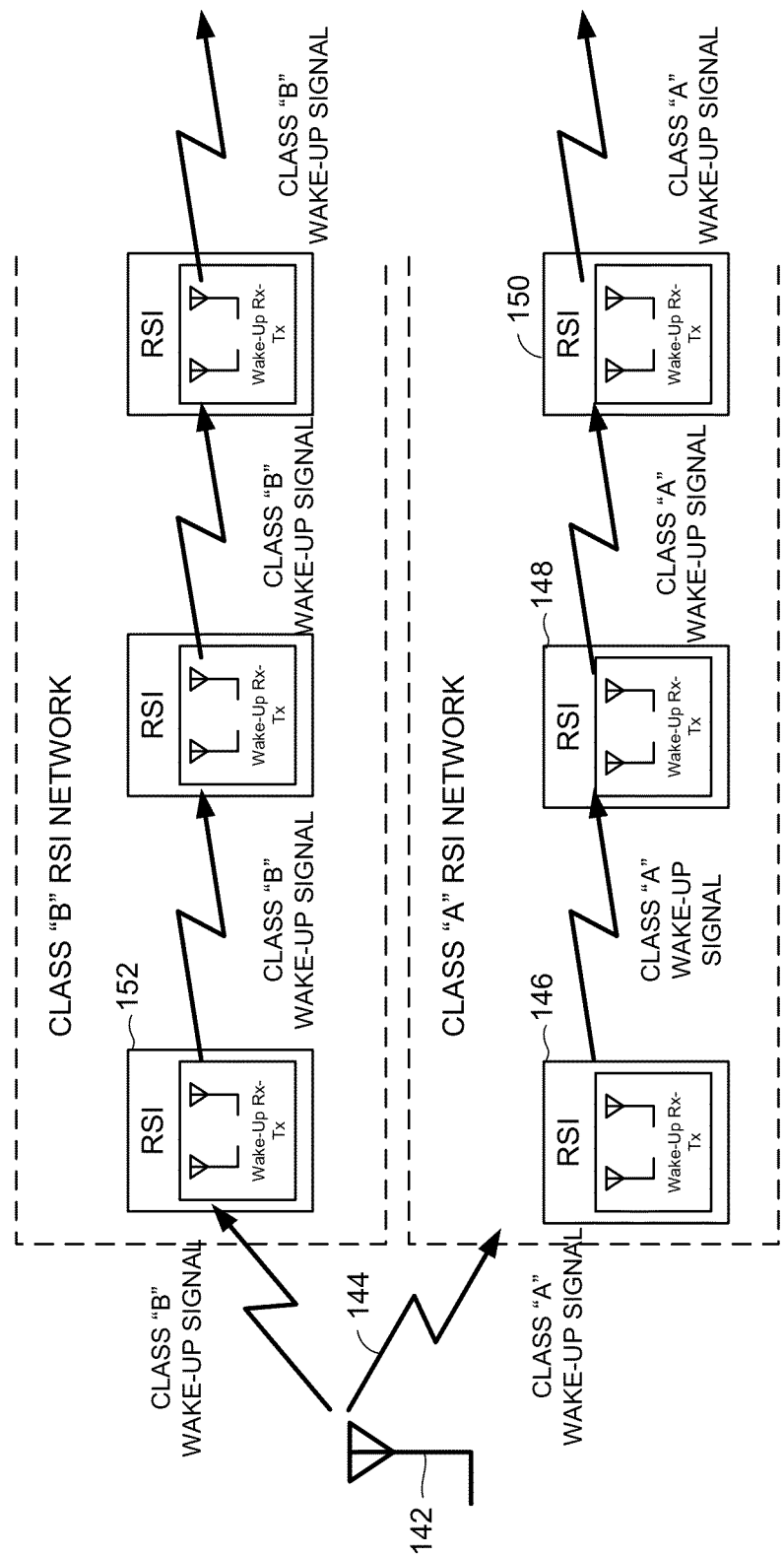
FIG. 35 illustrates RSIs receiving and sending class-based wake-up signals.

According to the needs of the entity engaged in utilizing the Wake-Up Transceiver, each signal received and transmitted by the Wake-Up Transceiver is optionally structured to convey an identification of one or more particular receivers (or devices in which the receivers are contained) for which the signal is intended, or, as in the example illustrated in FIG. 35, an identification of one or more classes of receivers (or such devices) for which the signal is intended. Each signal furthermore is optionally structured to convey payload data such as readings from one or more sensors that monitor conditions such as, for example, temperature, humidity, and vibration (discussed in further detail below). Outgoing signals also can be directly responsive to incoming signals to provide a roll-call functionality, wherein a Wake-Up Transceiver receives a wake-up signal and transmits a response in order to at least confirm its presence, operability, and receipt of the wake-up signal.

Figure 33:
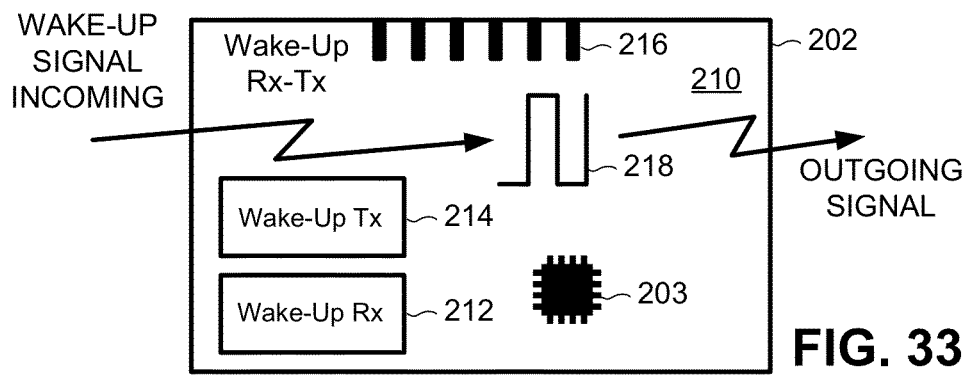
FIG. 33 is a diagram of a "Wake-Up Transceiver" according to another embodiment of the present invention.

Turning now to FIG. 33, another embodiment of a Wake-Up Transceiver 202 is shown as a PCA card that includes, on a single PCB 210, a low-power RF receiver, namely the Wake-Up Receiver 212 (Wake-Up Rx), a low-power RF transmitter, namely the Wake-Up Transmitter 214 (Wake-Up Tx), and a microprocessor 203. The Wake-Up Receiver 212 includes RF analog receiver circuitry. Similarly, the Wake-Up Transmitter 214 includes RF analog transmitter circuitry. A number of electrical contacts 216 for abutting corresponding electrical contacts within a housing of the RSI are provided for conducting electrical power to the Wake-Up Transceiver 202 and for conveying electronic signals between the transceiver and other electronic components of the RSI. In this embodiment, the Wake-Up Receiver and the Wake-Up Transmitter utilize a single dual-purpose etched antenna 218 for both receiving and transmitting wireless signals.

In yet another embodiment, the Wake-Up Transceiver operates to receive and sends wireless signals without regard to awakening other components of an RSI. In such an embodiment (not illustrated), the Wake-Up Transceiver itself comprises a stand alone transceiver that includes a power source, such as a battery, and is capable of receiving signals intended to prompt a response from the Wake-Up Transceiver as opposed to the standards-based radio associated with the Wake-Up Transceiver. In some instances, the response from the Wake-Up Transceiver includes a relay or retransmission of the received signal for receipt by other wireless devices. In another example, the Wake-Up Transceiver receives and further transmits a class-based signal prompting roll-call responses from multiple transceivers that are members of a class.

In other instances, the response from the Wake-Up Transceiver includes data from a sensor that may be directly associated with the Wake-Up Transceiver itself. With further regard to such scenarios, the Wake-Up Transceiver may be configured to wake-up a sensor thereby prompting the sensor to acquire data (i.e., take a reading). The sensor acquired data then may be communicated by the Wake-Up Transceiver, all without awakening a standards-based radio of the RSI, if even provided in the particular RSI. Indeed, an RSI in accordance with at least one aspect of the invention may not include a standards-based radio (omission of the standards-based radio from the RSI may reduce costs and save power consumption, and may be preferred if communications of the sensor acquired data do not require, for example, encryption). The sensor-acquired data may be carried in the payload data of the signal from the Wake-Up Transceiver and may include data relating to, for example, temperature, humidity, vibration, and/or status of a container seal (e.g., whether a container has been opened). In this respect, the Wake-Up Transceiver functions as a final destination point for a communication sent from, for example, a gateway or server either directly to the Wake-Up Transceiver, or indirectly to the Wake-Up Transceiver through one or more hops via other RSIs.

Figure 34:
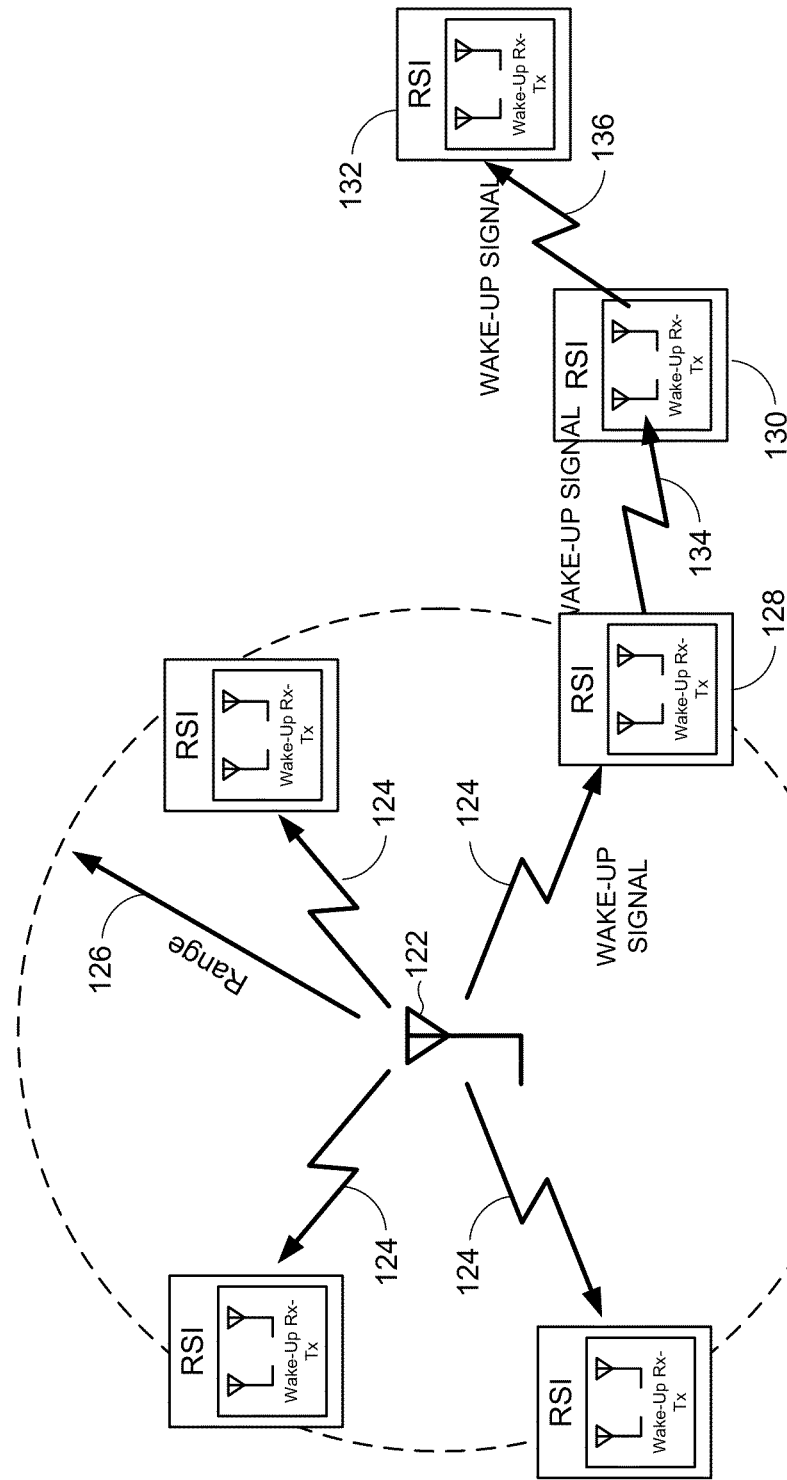
FIG. 34 illustrates RSIs receiving and sending wake-up signals.

The benefit of the relay ability of a Wake-Up Transceiver to promptly retransmit a wake-up signal is illustrated with reference to FIG. 34. As shown in FIG. 34, a gateway 122 broadcasts an original wake-up signal 124 to multiple RSIs within an effective broadcast range 126 of the gateway 122. Particular RSIs 130,132, however, are out of broadcast range of the wake-up signal 124 transmitted from the gateway 122. In accordance with the invention, an RSI 128 having a Wake-Up Transceiver ("Wake-Up Rx-Tx") receives the wake-up signal 124 from the gateway 122 and transmits a wake-up signal 134 that reaches the RSI 130. Similarly, the RSI 130 receives the wake-up signal 134 and transmits a wake-up signal 136 that reaches the RSI 132. Thus, RSIs 130,132—though out of range of the gateway 122—nevertheless are awoken (at least indirectly) by the original wake-up signal 124 broadcast from the gateway 122.

Of course, in retransmitting or relaying wake-up signals, an RSI preferably will not continuously relay a wake-up signal each time a wake-up signal is received. Such a simplistic algorithm may result in an endless loop of wake-up signals being transmitted back and forth between two or more RSIs. In this regard, an RSI and, in particular, a Wake-Up Transceiver of the RSI in accordance with the present invention, preferably is configured not to retransmit or relay a wake-up signal that has been previously received by the Wake-Up Transceiver.

While various methods are available to implement such a restriction and will be apparent to the Ordinary Artisan, a preferred technique comprises including a unique or quasi-unique identifier in each wake-up signal. In this case, the Wake-Up Transceiver preferably includes components for reading the identifier and comparing it to identifiers of previous wake-up signals. In the instance that the identifier is found to match an identifier of a previously received wake-up signal, the currently received wake-up signal is not relayed or retransmitted, and no wake-up signal consequently is transmitted by the Wake-Up Transceiver based on receipt of the current wake-up signal.

Additionally, a Wake-Up Transceiver may be configured to retransmit or relay wake-up signals upon receipt with regard to a class to which the wake-up signal may be targeted. Class-based networks and wake-up signals directed to one or more particular classes are disclosed, for example, in incorporated Patent Application Publication No. US 2004/0082296 A1 and/or in incorporated International Patent Application WO 03/098851 A1. In this case, the Wake-Up Transceiver preferably includes components for reading the class targeted by the wake-up signal and comparing it to the class(es) assigned to the RSI. In the instance that the targeted class of the wake-up signal is found to match an assigned class of the RSI, then not only is the standards-based radio of the RSI awoken by the Wake-Up Transceiver, but the wake-up signal is retransmitted or relayed by the Wake-Up Transceiver.

FIG. 35 illustrates an example in which a class-based wake-up signal is relayed. In FIG. 35, multiple RSIs 146,148, 150 are illustrated as being members of a first class identified nominally as class "A", and a gateway 142 is illustrated transmitting a wake-up signal 144 addressed to class "A". A particular RSI 146 that is a member of the intended recipient class receives the class "A" wake-up signal 144 from the gateway 142 and, thereafter, transmits a class "A" wake-up signal. RSI 148 that is out of range of the wake-up signal 144 from the gateway 142 and that is of class "A" nonetheless then is awakened by receipt of the relayed wake-up signal from RSI 146 directed to its class.

Similarly, RSI 148 that is a member of the intended recipient class receives the class "A" wake-up signal from the RSI 146 and, thereafter, transmits a class "A" wake-up signal that is received by RSI 150. RSI 150 that is out of range of the wake-up signal 144 from the gateway 142 and that is out of range from the RSI 146 nonetheless then is awakened by receipt of the relayed wake-up signal from RSI 148 directed to its class.

In another example, the gateway 142 transmits a class "B" wake-up signal that reaches a class "B" RSI 152, and additional class "B" RSIs thereafter are awakened by subsequent transmissions of class "B" wake-up signals by RSIs of class "B".

With further regard to FIG. 35, the class "A" and class "B" RSIs are shown for clarity as arranged in separate rows; however, it will be appreciated that the RSIs may be disposed in any diverse physical arrangements and that the RSIs may be static or dynamic. Indeed, an RSI may be disposed in a warehouse, in a container, or even on a vehicle. Moreover, there may be numerous classes in which the RSIs are members.

Figure 36:
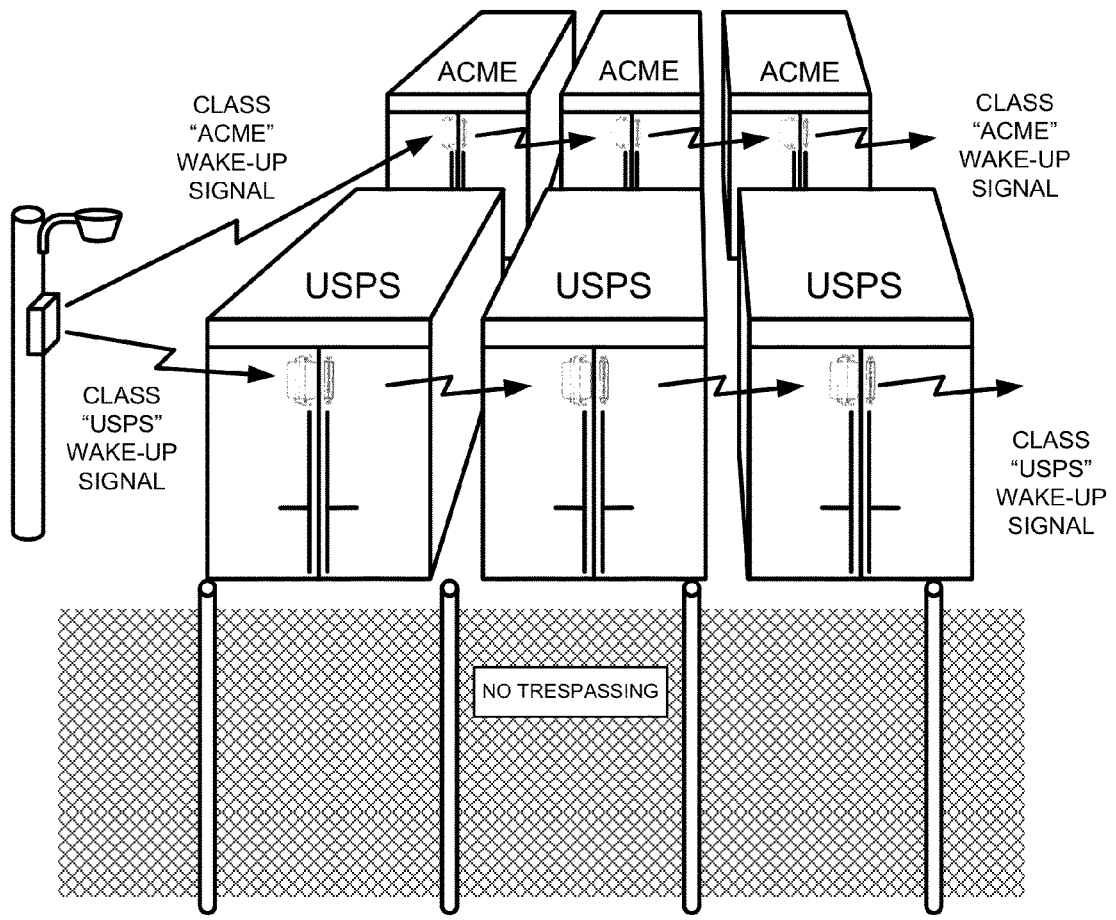
FIG. 36 illustrates a commercial implementation utilizing the RSIs of FIG. 35.

A commercial implementation of the preferred embodiment of FIG. 35 of relaying class-based wake-up signals is illustrated in FIG. 36. The exemplary classes of FIG. 36 include an "ACME" class, representing shipping containers of ACME IMPORTS INC., and a "USPS" class, representing shipping containers of the U.S. Postal Service. Importantly, wake-up signals intended to awaken RSIs of the ACME class do not awaken RSIs of the USPS class. Moreover, the USPS RSIs do not consume power in relaying or retransmitting wake-up signals intended for the ACME RSIs, and the ACME RSIs do not consume power in relaying or retransmitting wake-up signals intended for the USPS RSIs. This is particularly important, for example, when different parties are responsible for the expense of servicing and replacing power sources for the respective RSIs.

In FIG. 37, a preferred embodiment of an RSI 6100 of FIG. 31 is shown in exploded perspective view to include: a first housing 6202 for receiving electronic components such as a Wake-Up PCA Card 6102, a PCA Card 6106 comprising a standards-based radio for two-way wireless communications, and a PCA Card 6104 comprising a sensor interface; a seal 6204 and a cover 6206 for sealing the electronic components within the first housing 6202; and, a second housing 6208 for receiving a power source 6114. The second housing attaches to the first housing by connectors 6210 such as screws. Slots are formed in a base of the RSI for mounting of the RSI to a surface, such as that of a shipping or maritime container.

The standards-based radio of PCA Card 6106, which is also shown diagrammatically as standards-based radio 106 in FIG. 31, preferably operates as a WiFi or Bluetooth RF device. Benefits supported by the device include: high data rate reception, transmission, and relaying; long range transmission; sensitive (low RF signal strength) reception; data encryption; continuous RF link maintenance; and, multiple connections with other RF devices. These benefits, however, come at the expense of the energy of the power source 6114, and thus, utilization of the standards-based radio is minimized.

A PCA card 6104 comprising a sensor interface preferably is provided for acquiring data from one or more sensors associated with the RSI. Insofar as the RSI is associated with assets, such as shipping containers and contents thereof, the RSI preferably is capable of interfacing with sensors that, for example, monitor the assets, environmental characteristics of the assets, and/or geographical locations of the assets. In some embodiments, the sensor actually may be included within the RSI; in other embodiments, the sensor may be external to the RSI but nevertheless disposed in electronic communication with the sensor interface for data exchange therebetween. Electronic communication between the sensor interface and a sensor is exchanged wirelessly in some embodiments of the invention and by way of cabled connections in other embodiments. In at least one embodiment, the sensor interface comprises a multi-conductor connector, such as a ribbon cable, that passes from the interior of an RSI and to an external sensor, sensor array, or docking station that receives the RSI. Exemplary sensors include, but are not limited to, electronic seals, magnetic seals, cameras, microphones, temperature sensors, humidity sensors, radiation sensors, and motion sensors.

The electronic components of FIG. 37 each have a number of electrical contacts corresponding to electrical contacts within the first housing 6202. In assembling the RSI, each component is pressed into an available slot in the first housing with the electrical contacts of the component abutting corresponding electrical contacts of the first housing. The components are preferably easily installed and removed for replacement, upgrade, or servicing much like card components of a personal computer. In FIG. 38, the RSI 6100 of FIG. 37 is shown as assembled.

Network Watermark Implementation Utilizing Wake-Up Transceivers

Hereinabove, messages are disclosed as being received and processed, or not, based on validation of either a class designation, or a network watermark comprising a pathway history, included in the message. In one or more preferred implementations, this functionality is implemented using wake-up transceivers.

Further, as described hereinabove, in a preferred implementation, a plurality of nodes each include a Wake-Up Transceiver that includes components for reading a class targeted by a wake-up signal and comparing it to one or more classes assigned to the node, e.g. stored in a class table at the node. If the targeted class of the wake-up signal is found to match an assigned class of the node, then the standards-based radio of the node is awoken by the Wake-Up Transceiver.

Still yet further, as also described hereinabove, in communicating a message between first and second nodes, a communication link is preferably established. For example, in communicating a message from node $X_7$ to node $X_6$, a wake-up signal is first communicated from a wake-up transceiver of node $X_7$ to a wake-up transceiver of node $X_6$. This wake-up signal targets a specific class, i.e. includes a class designation which is compared to class designations stored in the class table of node $X_6$. If the class designation of the message is found in the class table, the wake-up transceiver of node $X_6$ communicates a corresponding acknowledgment signal to node $X_7$, and wakes up a standards-based radio of the node $X_6$. Upon receipt of the acknowledgment signal at node $X_7$, node $X_7$ wakes up its standards-based radio as well, for communication with the standards-based radio of node $X_6$. In this manner, a communication link is established which enables communication between the standards-based radios of node $X_7$ and node $X_6$. The message is then communicated from node $X_7$ to node $X_6$ via this established communication link, i.e. via the standards-based radios of node $X_7$ and node $X_6$.

As described above, however, a node can, in determining whether to establish a communication link, examine more than a single class designation. For example, a wake-up signal can include a class designation corresponding to each previous node along a path a message has traveled, i.e. a pathway history. A node can, in determining whether to establish a communication link in response to a wake-up signal, evaluate such a pathway history comprising a plurality of class designations, rather than simply evaluating a single class designation included in a wake-up signal. It will be appreciated that, as these class designations can be characterized as collectively forming a network watermark, such implementations can be characterized as providing for transmittal of a network watermark in a wake-up signal, and analysis and validation of such a network watermark at each node along a path. Such analysis and validation is preferably implemented via rules located at each node. Further, rules preferably govern what information is appended by each node along a path, e.g. a pathway history, to form a network watermark that is included in wake-up signals.

Preferably, when verification of a class designation or network watermark at a particular node fails, preferably, no communication link is established. In preferred embodiments, however, the node will communicate such failure to an originating node, such as a gateway controller, or, alternatively to a monitoring server. The monitoring server preferably is configured to act upon receipt of such failed validations. For example, the monitoring server might automatically investigate such a failed link, or trigger an alarm to alert a user to a possible network issue, such as, potentially, a network attack. The monitoring server further might be configured to communicate the failed link attempt to the originating node, or to automatically determine an alternative pathway for the message.

Path Validation Via Network Watermarks

Notably, described verification of a network watermark at each node along a path implemented via wake-up transceivers occurs prior to establishment of a communication link, and thus prior to communication of a message itself. In the above example, such link verification occurs via an electronic handshake comprising a wake-up signal and an acknowledgment signal. Verification can occur at either a communicating node, a receiving node, or both. Such link verification prior to communication of a message is in contrast with the previous examples in which a network watermark comprising a pathway history is analyzed subsequent to communication of a message.

However, in one or more preferred implementations, pathway validation, i.e. validation of a network watermark corresponding to that pathway, occurs at a server, e.g. a gateway controller, prior to communication of a message along the pathway.

Figure 43:
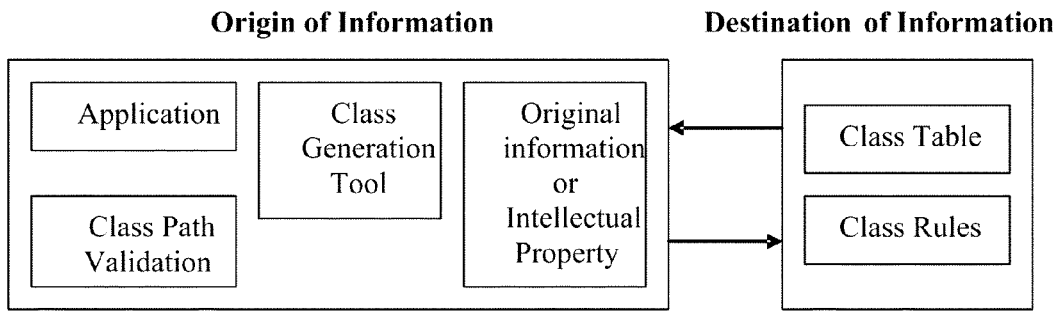
FIG. 43 is a block diagram illustrating the location of relevant information components in a source device and a destination device in a communication network, wherein the source device is a server.

FIG. 43 is a logical diagram illustrating the location of relevant information components in a source device and a destination device in accordance with a preferred implementation. The originating or source device, which may comprise a gateway or server, shown on the left side in FIG. 43, includes a software application, a class generation tool, and original information to be communicated. Generally, the software application is computer software that employs the capabilities of a computer directly to a task that the user wishes to perform, the class generation tool is software that organizes the node or destination device networking characteristics into manageable groups so that the network is optimized for the application and includes requirements needed to make the application useful, and the original information will be moved over a network link to the destination.

The destination device, shown on the right side in FIG. 43, includes a class table and a set of class rules.

The destination device may be specifically pre-configured with certain rules, for example, rules of a node may be hard-coded via an integrated circuit. Preferably, however, the rules are implemented at least partially by software, and may be downloaded to the destination device.

For example, as described above, in one or more preferred embodiments, a gateway controller maintains and updates class tables for various data communication devices of one or more class-based wireless networks, whereby centralized assignment of classes may be performed and distributed from the gateway controller down to the different devices. Similarly, in preferred implementations, a gateway controller maintains and updates class rules for various data communication devices of one or more class-based wireless networks, whereby centralized assignment of class rules may be performed and distributed from the gateway controller down to the different devices. Communications of updates and/or assignments of new classes or class rules for each data communication device thereby is efficiently performed.

These class rules downloaded to one or more devices from a source device, such as a gateway controller, are generated by the class generation tool of the source device. It will be appreciated that these rules are characterized as class rules because different class rules corresponding to different class designations, e.g. the class designations stored in a class table of a node, may be downloaded to that node.

It will be appreciated, however, that more generally such a tool may be characterized as a generation tool for generating rules, which may then be distributed to one or more devices, or nodes, of a network. As described hereinabove, these rules can both govern the formation of network watermarks, and, in some implementations, verify partial network watermarks prior to establishing a communication link.

Preferably, however, validation of a network watermark is carried out by a validation module. In class-based implementations this validation module may be characterized as a class path validation module. Such a class path validation module of the source device is illustrated in FIG. 43.

It will be appreciated that FIG. 43 illustrates a simplified example in which a source device, such as a server residing on a gateway, communicates directly with a destination device, such as a node. In this case, the server sends a wake-up signal including an appropriate class designation, verifies a direct connection to the target node, e.g. verifies a direct connection to the target radio's class in the data layer, and sends the information over the verified link. The path of the network can be recorded on the destination or the server for later verification, historical record and analysis.

Figure 39:
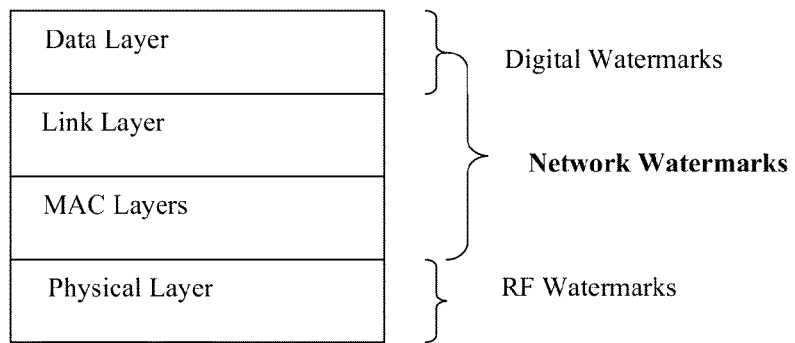
FIG. 39 is an illustration of layers in a communications and computer network protocol.

With respect to this reference to a "data layer", FIG. 39 is an illustration of layers in a communications and computer network protocol, with such layers and protocols being well known to the Ordinary Artisan. As shown therein, digital watermarks, described previously, may be used with regard to the data layer in a typical protocol, and RF watermarks, also described previously, may be used with regard to the physical layer in a typical protocol.

The illustration of FIG. 1 is not intended to reflect any specific, widely used model such as the OSI 7-layer model. Instead, this figure illustrates that, preferably, network watermarks do not apply to physical characteristics of the signal (i.e., to the "Physical Layer" wherein RF watermarks are used as described in the background section), and do not necessarily apply (but may apply) to application-specific data (i.e., to the "Data Layer" wherein digital watermarks are used as described in the background section). Instead, network watermark preferably apply with respect to verifying MAC addresses and network nodes by which communications are sent, as represented by reference in FIG. 1 to the "Link Layer" and "MAC Layers." The network watermark also may be checked by applications within the "Application Layer"; thus, overlap of the network watermark with the "Data Layer" where digital watermarks are used is illustrated in FIG. 1.

A network watermark creates a verifiable path through a network for the transfer of information. The network watermark may operate, for example, by initially setting up valid common identifiers or classes on a destination device and knowledge of these classes on an application, or source, device, such as a server. Then, once the destination device has requested information to be transferred, a pathway to the destination device is recorded and validated by the server containing the information using a set of rules and identifiers. Once this validation is completed successfully, links are set up and the information is transmitted to the destination device using the predetermined path, e.g. in a deterministic manner.

With respect to generalizing class wake-up technology to the illustrated layers, class wake-up functionality generally controls the link layer. The only devices that wake are devices that have the appropriate class identifiers in place. The action of comparing information at the MAC/link layer and data layer enables the network to verify and validate a pathway before information is sent via that pathway. Once the information has been transferred, pathway information, e.g. a pathway history, can be archived in the application database or memory for later analysis. Advantageously, use of network watermarks does not interfere with use of a digital watermark, i.e. a digital certificate, or use of a hardware watermark, i.e. an RF Watermark.

Returning to FIG. 43, as noted above it will be appreciated that such figure represents a simplified example in which a direct connection is established between a source device and a destination device. In contrast, FIG. 44 illustrates the use of one or more intermediate nodes.

Figure 44:
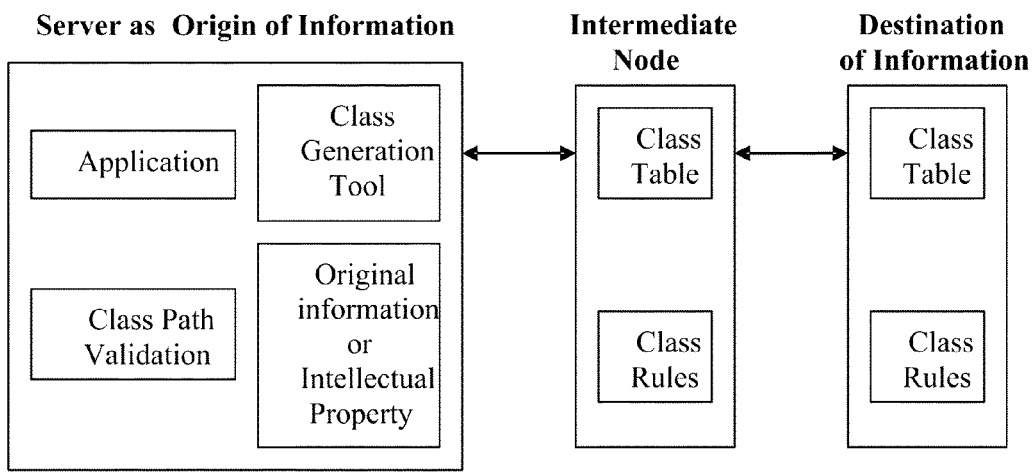
FIG. 44 is a block diagram illustrating the location of relevant information components in a source device, a destination device and an intermediate device in a communication network.

Specifically, FIG. 44 illustrates a preferred implementation in which pathway validation, i.e. validation of a network watermark corresponding to that pathway, occurs at a server, e.g. a gateway controller, prior to communication of a message along the pathway. As illustrated, both in the case of multiple hops and in the case of direct connections, one or more intermediate nodes, represented by illustration of an exemplary intermediate node, include a class table and a set of rules, e.g. class rules. In this example, the server communicates a wakeup signal of the appropriate common designator or class, and each intermediate node relays the common designator or class, after verification, towards the destination node. If the class rules are passed as tested by each node, the radios (nodes) will set up a communication link and validate its path against an application's desired path, e.g. using the class path validation module, to create a "network watermarked" link. Once the network watermarked link has been established, information will be transferred.

It will be appreciated that such path validation may be accomplished via the use of wake-up transceivers. Specifically, in a preferred implementation, a plurality of nodes each include a wake-up transceiver configured to retransmit or relay wake-up signals upon receipt with regard to a class to which the wake-up signal may be targeted. Each wake-up transceiver includes components for reading a class targeted by a wake-up signal and comparing it to one or more classes assigned to the node, e.g. stored in a class table at the node. If the targeted class of the wake-up signal is found to match an assigned class of the node, then the wake-up signal is retransmitted or relayed by the wake-up transceiver, and, in at least some implementations, the standards-based radio of the node is awoken by the wake-up transceiver.

In such preferred implementations, in communicating a message between a gateway node and a destination node, via one or more intermediate nodes, a communication pathway is established and validated at the gateway. For example, in communicating a message from a gateway G to node $X_3$, a pathway request is first communicated from a wake-up transceiver of gateway G to a wake-up transceiver of node $X_1$. This pathway request targets a specific class, i.e. includes a class designation which is compared to class designations stored in the class table of node $X_1$. If the class designation of the message is found in the class table, the wake-up transceiver of node $X_1$ retransmits the pathway request to node $X_2$. Prior to, or in, communicating this pathway request, however, path information is preferably appended by node $X_1$ in accordance with rules located at that node.

Upon receipt of the pathway request at node $X_2$, the class designation of this pathway request is compared to class designations stored in the class table of node $X_2$. If the class designation of the message is found in the class table, the wake-up transceiver of node $X_2$ retransmits the pathway request to node $X_3$. Prior to, or in, communicating this pathway request, however, path information is preferably appended by node $X_2$ in accordance with rules located at that node.

Upon receipt of the pathway request at node $X_3$, the class designation of this pathway request is compared to class designations stored in the class table of node $X_3$, and if the class designation of the message is found in the class table, a pathway acknowledgment is communicated back to gateway G via the intermediate nodes $X_1$, $X_2$. Prior to, or in, communicating this pathway acknowledgment, however, path information is preferably appended by node $X_3$ in accordance with rules located at that node. The pathway acknowledgment preferably includes the path information appended by each node, which collectively forms a network watermark. This pathway acknowledgment is preferably communicated via the wake-up transceivers of each node, but, alternatively, may be communicated via standards-based radios of each node.

Upon receipt of the pathway acknowledgment, including the network watermark, at the gateway G, the network watermark is validated by a validation module of gateway G. Upon validation, a message is communicated from gateway G to node $X_3$ along intermediate nodes $X_1$, $X_2$ via the standards-based radios of each node. These standards-based radios were either woken up during communication of the pathway request or pathway acknowledgment, or are woken up sequentially during communication of the message via wake-up signals and wake-up acknowledgments comprising wake-up handshakes as described hereinabove.

It will be appreciated that, similarly, communication may be initiated by a destination node in the form of a request for information from gateway G, i.e. an information request communicated from node $X_3$ to gateway G via the intermediate nodes $X_1$, $X_2$. Prior to, or in, communicating this information request, pathway information is preferably appended by node $X_3$ in accordance with rules located at that node. Pathway information is similarly appended by each intermediate node $X_1$, $X_2$, such that a network watermark is formed. This information request is communicated via the wake-up transceivers of each node until it reaches gateway G.

Upon receipt of the information request, including the network watermark, at the gateway G, the network watermark is validated by a validation module of gateway G. Upon validation, a message is communicated from gateway G to node $X_3$ along intermediate nodes $X_1$, $X_2$ via the standards-based radios of each node. These standards-based radios were either woken up during communication of the information request, or are woken up sequentially during communication of the message via wake-up signals and wake-up acknowledgments comprising wake-up handshakes as described hereinabove.

Node to Node Network Watermark Implementations

Watermarks are not utilized exclusively in communications from a server, such as a gateway controller, to a node, however. In preferred implementations, one or more nodes each include, in addition to a class table and rules, a generation tool and validation module, thus enabling watermark path validation for node to node communications.

Figure 45:
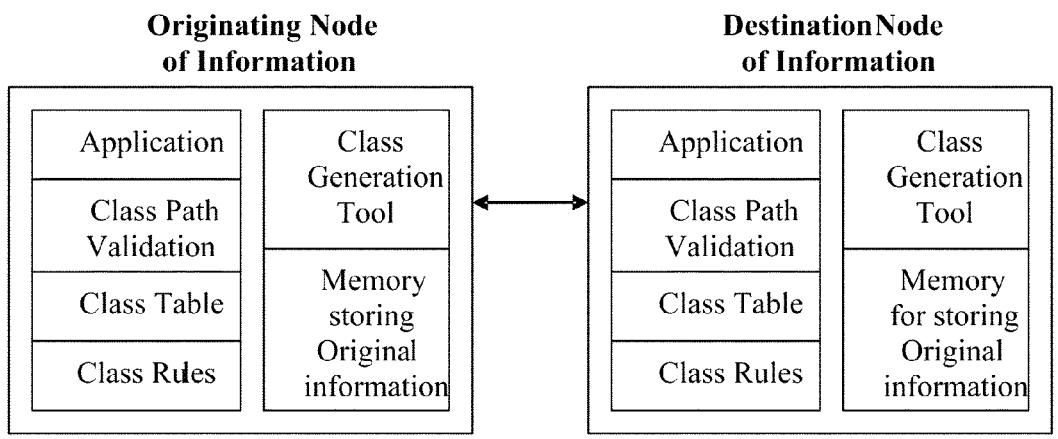
FIG. 45 is a block diagram illustrating the location of relevant information components in a source device and a destination device in a communication network, wherein the source device is another node.

FIG. 45 is a logical diagram illustrating the location of relevant information components in a source device and a destination device in such a preferred implementation where both the source device and destination device are nodes. In a node to node communication scenario, the application on the source and/or destination node must have knowledge of the rules the application must follow to enable an information transfer. For example, an application may require a certain level of security, so that only nodes with particular class identifiers would be allowed to participate. The class path validation software allows for the validation of incoming routes against route scenarios prior to the transfer of data. As each node includes a class table, communications may be initiated from either direction. In a preferred implementation, the class generation tool is complementary to the class path validation tool, as it generates possible paths that will eventually be used in comparisons by the validation tool. Memory is provided at each node for a "store and forward" hopping scenario, although in a direct connect scenario, such memory may not be required as long as the data channel has the capacity to send the information in a timeframe that is sufficient for the application.

Alternative Technology for Network Watermark Implementations

Although described thus far most specifically as being implemented using wake-up transceivers, it will be appreciated that functionality described herein could well be implemented via a variety of means. For example, in an implementation utilizing more traditional computing devices, rather than using a printed circuit board comprising a wake-up transceiver as disclosed hereinabove, a network adapter or network interface card (NIC) having a media access control (MAC) address, which may comprise a printed circuit board, is utilized. In such implementations, rules stored at a node are preferably implemented below the application layer but above the hardware layer, for example at the MAC layer or link layer. Such implementations allow a network watermark to be used in conjunction with both a hardware watermark, i.e. an RF watermark, and a software watermark, i.e. a digital certificate.

Such implementations further allow for verification of a path, for example by a path validation module in accordance with requirements of an application, prior to communication of information.

Notably, however, any software functionality described herein is contemplated for implementation via hardware, e.g. programmable logic. In at least some preferred implementations, implementation in hardware could lower cost and improve processing speed.

Network Watermark Rules

As discussed above, in a preferred implementation, rules are generated at a generation tool and distributed, or assigned, to other nodes. In a preferred implementation, in preparation for communicating information, an originating node generates rules and classes which are then distributed to a plurality of nodes.

Preferably, the rules and classes are distributed to the plurality of nodes via a separate channel, separate network, or other methodology with respect to the pathway request. For example, classes and rules can be broadcast as encrypted and decrypted when received, thus adding to security. Multiple algorithms can be used, and a class identifier can be used to select a correct decryption algorithm.

Following distribution of such classes and rules, a pathway request is communicated from the originating node to a destination node via some or all of the plurality of nodes. As the pathway request travels along the nodes, a network watermark is constructed using the distributed rules. This network watermark is then either validated at the destination node, or a pathway acknowledgment including this network watermark is communicated back to the originating node, and the network watermark is validated at the originating node.

Alternatively, an originating node may receive an information request from the destination node, and then generate and distribute rules and classes to the plurality of nodes. As the information request travels along the nodes, a network watermark is constructed using the distributed rules. This network watermark is then validated at the originating node.

Either way, upon validation of the network watermark, i.e., validation of a communication pathway, information is communicated via that communication pathway.

Use of such a network watermark improves the ability of an owner of information to verify that the information is sent to the "right" destination and read by the "right" party. The network watermark is a temporary mechanism that enables secure transfer of data over a network. The network watermark is valid for the duration of the link, but a historical record of the watermark can be used to certify the copy of the information as authentic, since the process can be verified by algorithms on both sides of the communication and verified during the transfer. Notably, a date and time can be included in the watermark so unique identifiers can be created. Network watermarks can be controlled using a database. Historical data pertaining to network watermarks can be stored in a database.

Thus far herein, relatively simple rules have been described for purposes of clarity. It will be appreciated, however, that more complicated rules may well implemented at each node, either in hardware or software.

In a preferred implementation, rather than, or in addition to, performing a simple handshake in which a class designation is checked against a class table of a node, a specific piece of information (hereinafter "passcode") is included in a handshake request communicated from a transmitting node to a receiving node. Rules at the receiving node include a function which takes as an input such a passcode, and returns as an output a derivative passcode. The received passcode is input into the function, and the output derivative passcode is passed back in a handshake acknowledgment to the transmitting node. Rules at the transmitting node include a reverse lookup algorithm, or function, that confirms that the received derivative function is proper. Upon such confirmation, a communication link—now verified—is established with the receiving node.

It will be appreciated that such passcodes, i.e., an original passcode and one or more derivative passcodes, can together form a network watermark that can be used to validate an overall pathway for a message.

Alternatively or additionally, passcodes may include network information that could be validated at a receiving server. For example, each node may append a passcode comprising its MAC address and a timestamp. Alternatively, rather than including its entire MAC address, only the last three digits of its MAC address may be included. It will be appreciated that inclusion of a timestamp provides for unique passcodes, and thus guarantees a unique network watermark for each message communication.

In an interne scenario, a network can verify passcode information of a pathway of a received request against trusted server lists and rules on server IP addresses. The passcode representing the pathway the data was sent can be validated with knowledge of rules provided by an application (and preferably distributed to nodes along the pathway), thereby creating a link between the route the data was sent and the rules provided by the application.

In preferred implementations, rules are distributed to nodes such that a particular sequence is embodied by a network watermark representing a certain pathway. For example, a network watermark may comprise a line of text, such as a poem, where each node in a pathway is configured to write, sequentially, "All", "the", "world's", "a", and "stage". Alternatively, a network watermark may comprise a pseudorandom noise/number (PN) sequence or a Markov chain, with each node in a pathway configured to write the next number in the sequence or chain. Other sequences also may be used such as, for example, the Fibonacci sequence, with each node inserting the value of the nth member of the sequence, wherein n represents the number of hops that have occurred between the originating node and such node.

It will be appreciated then, that, although in some implementations a network watermark may include, or even be formed entirely of, an identification of nodes along a pathway the watermark corresponds to, such that the pathway can be reconstructed from the watermark itself, in other implementations, such as, for example, implementations utilizing a PN sequence or a Markov chain, the pathway a network watermark corresponds to cannot be reconstructed from the network watermark itself, as the network watermark does not include any such identifications of nodes along that pathway. Nevertheless, despite this distinction, both implementations can be characterized as utilizing network watermarks that are verifiable pathways of networked nodes, in that both provide a method of validating a pathway, even if, in some implementations, the nodes of that pathway are not explicitly identified or otherwise revealed by the network watermark itself.

As described hereinabove, rules at a node preferably include multiple algorithms for generating a network watermark. An algorithm is preferably selected based on some parameter such as, for example, a class designation, as described hereinabove.

Thwarting Network Attacks

Figure 40:
FIG. 40 is a schematic diagram illustrating network communication using deterministic hopping over trusted nodes.
Figure 41:
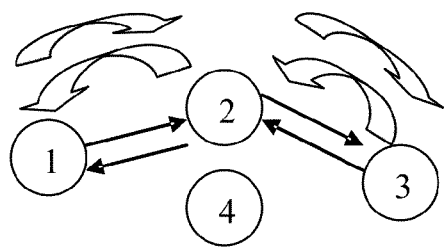
FIG. 41 is a schematic diagram illustrating network communication using non-deterministic hopping over trusted nodes.
Figure 42:
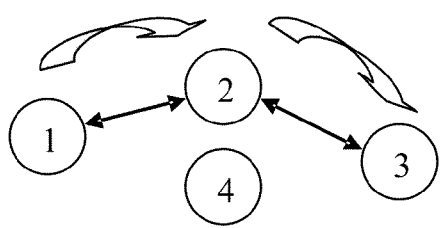
FIG. 42 is a schematic diagram illustrating network communication using non-deterministic "direct connect" over trusted nodes.

FIGS. 40-42 are schematic diagrams respectively illustrating network communication using deterministic hopping over trusted nodes, network communication using non-deterministic hopping over trusted nodes, and network communication using non-deterministic "direct connect" over trusted nodes. For connections, the network can setup deterministic hops when a pathway is known, find a pathway using non-deterministic hopping, or can use direct connect if a file transfer, voice or video is required. In all cases, the classes, or passcodes, used to enable the links are controlled and allowed by the application such that the appropriate level of security is maintained.

Utilization of network watermarks hinders several common attacks on ad-hoc networks or MANets. In the "Sybil" attack, an attacking radio generally presents one or more identities to a radio that is attempting to communicate. In general, a server has the ability to choose unique common identifiers on a radio path of choice, thereby making it extremely difficult for the Sybil radio to know which radio class to impersonate. Further, the server can also change the class, or a common designation, to correspond to other common identifiers stored in the radios to provide alternative paths, and improve security. If a class identifier has not been used recently, the Sybil attack radio would have no way to know which radio to try to impersonate. Further, wake-up components of the radio network can listen to invalid transmissions and alert the server that the network is being attacked, for example via a report to a monitoring server as described hereinabove. The classes the Sybil attack radio is using can be recorded and compared at a server so that compromised classes can be disabled.

In non-deterministic hopping or direct connect scenarios, a path back to a destination is verified by a server, and thus an attacking radio would need to know both the information used to form a network watermark, for example a MAC address, and the class identifiers used to propagate a request, as well as the class designation, or identifier, that the server would use to return the information back to a node requesting information, in order to successfully infiltrate the network. Since the server would be able to select this class and the class would preferably not have been broadcast, it would be extremely difficult for the Sybil attack radio to try to assume such an identity. The Sybil attack can thus be beat via the use of multiple classes stored in nodes when each class is used infrequently enough so that the Sybil attack radio must be present for a long period of time to see multiple uses of the same class. The stolen identity attack has the same issues as the Sybil attack scenario. As long as the server uses different class identifiers in sending the information back to the initiating node, the stolen identity attack has the previous information and not the current information. Changing the class information periodically will also improve security.

In an invisible node attack, an attacking node attempts to insert itself into a communication pathway and intercept data. In preferred class-based wake-up networks, pathways are closely controlled so any node that attempts to insert itself will not be answered. Even were it possible for a node to answer a wake-up signal, analysis of pathway data, i.e. a network watermark, allows illegal MAC addresses to be blocked. Further, when sending the information back down to the node, an invisible node would need to have knowledge of new class identifiers created by the server. Since such class identifiers would not have been seen previously, it would be very difficult to remain in the network.

In a Rush attack, many nodes are brought together to confuse multi-cast and overwhelm routing. However, preferred network do not communicate with other nodes unless an event occurs. If a network watermark is not present, the radio network will ignore the radios in such a rush attack. Changes in activity can be recorded and sent to the server so that the attacks can be recognized and addressed.

In a Blackhole or Jellyfish attack, the nodes either never send the packets onward or significantly delay them. These nodes are left out of a network watermarked communication chain.

CONCLUSION

In view of the foregoing, use of a "network watermark" is believed to provide many advantages, including, but not limited to, providing verification of validity of user before the information is sent; preserving and complementing the value provided by digital watermarking and/or the value provided by verifying the hardware with techniques such as RF fingerprinting or RF watermarking; providing a mechanism to defeat common network attacks; providing a link to the application so varying levels of security can be achieved; providing a mechanism for detecting attacks; providing a mechanism for determining the nature and origin of an attack; providing a means to react to an attack (including rerouting and/or analysis or other intervention); providing flexibility to recover the network from an attack by modifying the class tables, algorithms and source programs; enabling records to be kept for each communication link, thereby making each network watermark traceable and unique and aiding in after-action analysis; creating a verifiable relationship between the MAC/link layer and the data layer that makes it difficult for typical attacks to penetrate; and supporting mobility.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation. Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for network communications over a communications path comprising a network of nodes between a first end node and a second end node, the method comprising the steps of:
    (a) by the first end node, sending an outgoing communication including an identification of the second end node to an immediately succeeding node in the communications path;
    (b) by each of one or more respective intermediate nodes between the first end node and the second end node in the communications path, performing the steps of,
        (i) receiving, by the respective intermediate node, an incoming intermediate communication from an immediately preceding node, the incoming intermediate communication including path data,
        (ii) verifying the incoming intermediate communication that is received by the respective intermediate node from the immediately preceding node, and
        (iii) upon the successful verification of the incoming intermediate communication from the immediately preceding node by the respective intermediate node, sending by the respective intermediate node an outgoing intermediate communication to a respective immediately succeeding node, the outgoing intermediate communication including path data that at least identifies a network communications path from the first end node to the respective intermediate node; and
    (c) by the second end node performing the steps of,
        (i) receiving an incoming communication from the immediately preceding node, the incoming communication including path data that at least identifies a network communications path from the first end node to the immediately preceding node,
        (ii) verifying the incoming communication that is received from the immediately preceding node, and
        (iii) validating the communications path of nodes between the first end node and the second end node.

2. The method of claim 1, further comprising storing the communications path in a database for later reference.

3. The method of claim 1, wherein the path data that is included in a communication sent by a respective intermediate node identifies the network communications path from the first end node to the respective intermediate node by identifying a sequence of unique identifiers (UIDs) of the nodes of the communications path.

4. The network communications method of claim 3, wherein the UIDs are MAC addresses.

5. The method of claim 4, wherein the step of validating, by the second end node, the communications path through the network of nodes between the first end node and the second end node includes checking the UIDs of the nodes identified by the path data against valid UIDs of known nodes in order to confirm that the UIDs identified by the path data match valid UIDs.

6. The method of claim 1, wherein the path data of a communication that is sent by a node, to an immediately succeeding node in the communications path through the network of nodes, includes a date and time of the communication.

7. The method of claim 1, further comprising validating, by each respective intermediate node, the communications path of nodes between the first end node and the respective intermediate node by checking the UIDs of the nodes identified in the communications path in order to confirm that the UIDs identified in the communications path match valid UIDs.

8. The method of claim 1, wherein the network communications comprise wireless network communications.

9. The method of claim 1, wherein the communication received by each respective intermediate node in the network communications path between the first end node and the second end node includes path data that identifies a network communications path from the first end node to the second end node.

10. The method of claim 1, wherein the communication received by each respective intermediate node in the network communications path between the first end node and the second end node includes path data that identifies a network communications path from the first end node to the second end node, and wherein the step by each respective intermediate node of sending a communication to an immediately succeeding node comprises sending, by the respective intermediate node, the communication to the node identified as coming next after the respective intermediate node in the network communications path identified by the path data.

11. A method for network communications over a communications path comprising a network of nodes between a first end node and a second end node, the method comprising the steps of:
    (a) by the first end node, sending an outgoing communication including an identification of the second end node to an immediately succeeding node in the communications path;
    (b) by each of one or more respective intermediate nodes between the first end node and the second end node in the communications path, performing the steps of, (i) receiving, by the respective intermediate node, an incoming intermediate communication from an immediately preceding node, the incoming intermediate communication including path data,
(ii) generating, based on data contained in the incoming intermediate communication, a result of a function;
(iii) verifying, based on the generated result of the function, the incoming intermediate communication that is received by the respective intermediate node from the immediately preceding node, and
(iii) upon the successful verification of the incoming intermediate communication from the immediately preceding node by the respective intermediate node, sending by the respective intermediate node an outgoing intermediate communication to a respective immediately succeeding node, the outgoing intermediate communication including data for verification of the outgoing intermediate communication; and
(c) by the second end node performing the steps of,
(i) receiving an incoming communication from the immediately preceding node,
(ii) generating, based on data contained in the incoming intermediate communication, a result of a function;
(iii) verifying, based on the generated result of the function, the incoming communication that is received from the immediately preceding node, and
(iii) validating the communications path of nodes between the first end node and the second end node.

12. The method of claim 11, wherein a result of the function included in a communication is unique to the specific instance of sending the communication by the node to the immediately succeeding node.

13. The method of claim 11, wherein the network communications comprise wireless network communications.

14. The method of claim 11, wherein the communication received by each respective intermediate node in the network communications path between the first end node and the second end node includes path data that identifies a network communications path from the first end node to the second end node.

15. The method of claim 11, wherein the communication received by each respective intermediate node in the network communications path between the first end node and the second end node includes path data that identifies a network communications path from the first end node to the second end node, and wherein the step by each respective intermediate node of sending a communication to an immediately succeeding node comprises sending, by the respective intermediate node, the communication to the node identified as coming next after the respective intermediate node in the network communications path identified by the path data.

16. A method for network communications over a communications path comprising a network of nodes between a first end node and a second end node, the method comprising the steps of:
(a) by the first end node, sending an outgoing communication including an identification of the second end node to an immediately succeeding node in the communications path;
(b) by each of one or more respective intermediate nodes between the first end node and the second end node in the communications path, performing the steps of,
(i) receiving, by the respective intermediate node, an incoming intermediate communication from an immediately preceding node, the incoming intermediate communication including path data,
(ii) verifying the incoming intermediate communication that is received by the respective intermediate node from the immediately preceding node, and
(iii) upon the successful verification of the incoming intermediate communication from the immediately preceding node by the respective intermediate node, sending by the respective intermediate node an outgoing intermediate communication to a respective immediately succeeding node, the outgoing intermediate communication including path data that at least identifies a network communications path from the first end node to the respective intermediate node; and
(c) by the second end node performing the steps of,
(i) receiving an incoming communication from the immediately preceding node, the incoming communication including path data that at least identifies a network communications path from the first end node to the immediately preceding node,
(ii) verifying the incoming communication that is received from the immediately preceding node, and
(iii) validating the communications path of nodes between the first end node and the second end node;
(iv) wherein the communication received by the second end node represents a request for the transfer of information to the first end node;
(d) thereafter, in response to the request for the transfer of information, establishing communication links between each of the nodes of the verifiable communications path and transferring the information from the second end node to the first end node of the request over the established communication links.

17. The method of claim 16, wherein the communication links are concurrently maintained between all adjacent nodes of the communications path during the transfer of the information.

18. The method of claim 16, wherein each communication link is established between adjacent nodes in the verifiable communications path as the information is transferred between the adjacent nodes such that the information hops between nodes in being transferred from the second end node to the origination node.

19. The method of claim 16, wherein the communication received by the second end node represents a request for the transfer of information to the first end node for use by a specific application program, and wherein the step of validating, by the second end node, the communications path through the network of nodes between the first end node and the second end node includes checking the UIDs of the nodes identified by the path data against information maintained for valid UIDs of known nodes in order to confirm that the information maintained for each node identified by the path data matches criteria specified by the specific application program.

20. The method of claim 16, wherein the communication received by the second end node represents a request for the transfer of information to the first end node that will be used by a specific application program, and wherein the step of validating, by the second end node, the communications path through the network of nodes between the first end node and the second end node includes checking the UIDs of the nodes identified by the path data against security levels that are maintained for valid UIDs of known nodes in order to confirm that the security levels of each node identified by the path data matches a required security level specified by the specific application program.

* * * * *